United States Patent
Tarng et al.

(10) Patent No.: US 9,855,510 B2
(45) Date of Patent: Jan. 2, 2018

(54) DISCLUB GOLF AND PHONEFLY: XPHONE WITH SFDPCC AND DUAL-PHONE-WATCH PAIR SMART FLYING DISC PHONE FOR CLOUD COMPUTATION

(71) Applicants: Min Ming Tarng, San Jose, CA (US); Mei-Jech Lin, San Jose, CA (US); Eric Yu-Shiao Tarng, San Jose, CA (US); Alfred Yu-Chi Tarng, San Jose, CA (US); Angela Yu-Shiu Tarng, San Jose, CA (US); Huang-Chang Tarng, San Jose, CA (US)

(72) Inventors: Min Ming Tarng, San Jose, CA (US); Mei-Jech Lin, San Jose, CA (US); Eric Yu-Shiao Tarng, San Jose, CA (US); Alfred Yu-Chi Tarng, San Jose, CA (US); Angela Yu-Shiu Tarng, San Jose, CA (US); Huang-Chang Tarng, San Jose, CA (US)

(73) Assignee: TANG SYSTEM, San Jose, CA (US)

( * ) Notice: Subject to any disclaimer, the term of this patent is extended or adjusted under 35 U.S.C. 154(b) by 57 days.

(21) Appl. No.: 14/541,152

(22) Filed: Nov. 14, 2014

(65) Prior Publication Data

US 2016/0136532 A1    May 19, 2016

(51) Int. Cl.
*A63B 67/00*    (2006.01)
*A63H 27/00*    (2006.01)
(Continued)

(52) U.S. Cl.
CPC ............. *A63H 27/00* (2013.01); *A63H 33/18* (2013.01); *H04B 7/26* (2013.01); *H04M 1/72527* (2013.01); *H04M 1/04* (2013.01)

(58) Field of Classification Search
None
See application file for complete search history.

(56) References Cited

U.S. PATENT DOCUMENTS 3,724,122 A * 4/1973 Gillespie, Sr. ......... A63H 33/18
                                                          446/46
4,297,809 A * 11/1981 Branson ................. A63H 33/18
                                                         446/189

(Continued)

*Primary Examiner* — Kenny Lin
(74) *Attorney, Agent, or Firm* — Tang System

(57) ABSTRACT

"Let the Bullet fly for a while, Let the Phone Fly, Phonefly!" The carrier of the Phonefly xPhone is the disclub golf having the cam lock. The next generation Phonefly xPhone is the dual-Phone-Watch pair having the ultra-long flying capabilities with cam lock and the remote monitoring/watching capability. Due to the disclub golfrisbee, golf disc, having no impact force as the golf ball does, the disclub golf having the cam lock becomes the practical vehicle to carry the Phonefly xPhone to far end and monitoring with Watch. The complete set of Phonefly xPhone ecosystem includes the disclub, golfrisbee/disc/golfring, dual-phone-watch, disclub trolley, disclub retriever, disc-ball hybrid flagpole, disc -ball hybrid harvest machine and disc-ball hybrid vending machine, etc. The Phonefly xPhone is the pairs of smart phone sPhone, smart watch, game monitor and game controller, combining with disclub golf to have the extra dimension of freedom to have the remote access, control and monitoring of far end activities. It bridges the virtual world with the reality world. Accordingly, the dual-Phone-Watch pair of the xPhone has the new functions to perform the remote access, remote control, remote surveillance and monitoring of far end activities. It is the practical application of the disclub golf technology having the cam lock with golf disc, golfrisbee. There are versatile communication protocols between the xPhone and watch/monitor that it becomes the next generation Phonefly xPhone.

3 Claims, 74 Drawing Sheets

(51) Int. Cl.
  *H04M 1/725* (2006.01)
  *H04B 7/26* (2006.01)
  *A63H 33/18* (2006.01)
  *H04M 1/04* (2006.01)

(56) References Cited

U.S. PATENT DOCUMENTS

| | | | | |
|---|---|---|---|---|
| 5,078,637 | A * | 1/1992 | McFarland | A63H 33/18 446/46 |
| 5,360,363 | A * | 11/1994 | Levin | A63H 33/18 446/236 |
| 6,193,620 | B1 * | 2/2001 | Tarng | A63B 67/00 473/465 |
| 7,101,293 | B2 * | 9/2006 | Tarng | A63B 59/20 273/400 |
| 7,794,341 | B2 * | 9/2010 | Tarng | A63B 43/02 273/400 |
| 7,857,718 | B2 * | 12/2010 | Tarng | A63B 63/00 473/465 |
| 2003/0045200 | A1 * | 3/2003 | Tarng | A63B 65/10 446/46 |
| 2003/0091383 | A1 * | 5/2003 | Conway | H01R 13/622 403/348 |
| 2005/0101411 | A1 * | 5/2005 | Stiller | A63B 24/0021 473/353 |
| 2006/0073758 | A1 * | 4/2006 | Goodwin | A63H 33/18 446/48 |
| 2006/0144994 | A1 * | 7/2006 | Spirov | B60V 1/06 244/62 |
| 2010/0116007 | A1 * | 5/2010 | Thimmappa | E05B 9/086 70/91 |
| 2010/0144233 | A1 * | 6/2010 | Scarborough | A63H 33/18 446/46 |
| 2010/0277617 | A1 * | 11/2010 | Hollinger | H04N 5/2252 348/231.99 |
| 2012/0009007 | A1 * | 1/2012 | Fassbender | B60N 2/2356 403/83 |
| 2013/0068882 | A1 * | 3/2013 | Dumas | B64C 5/12 244/82 |
| 2013/0153706 | A1 * | 6/2013 | Lindmark | B63B 1/041 244/2 |
| 2013/0192552 | A1 * | 8/2013 | Niiro | F01L 1/34 123/90.17 |
| 2013/0250047 | A1 * | 9/2013 | Hollinger | H04N 5/2252 348/36 |
| 2014/0049601 | A1 * | 2/2014 | Pfeil | H04N 5/23238 348/36 |
| 2014/0128171 | A1 * | 5/2014 | Anderson | G01S 19/19 473/199 |
| 2015/0038046 | A1 * | 2/2015 | Lindberg | A63H 33/18 446/46 |

* cited by examiner

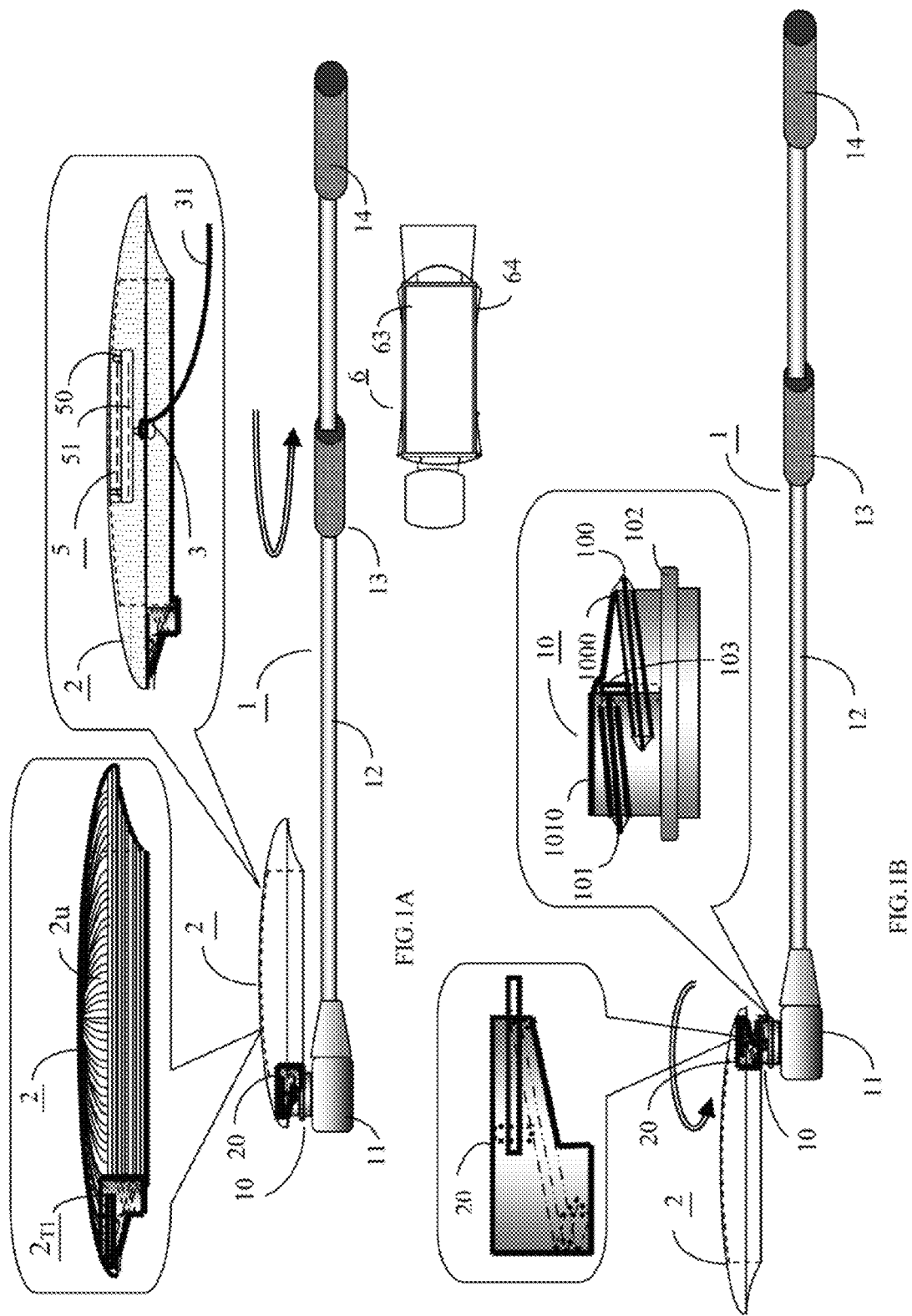

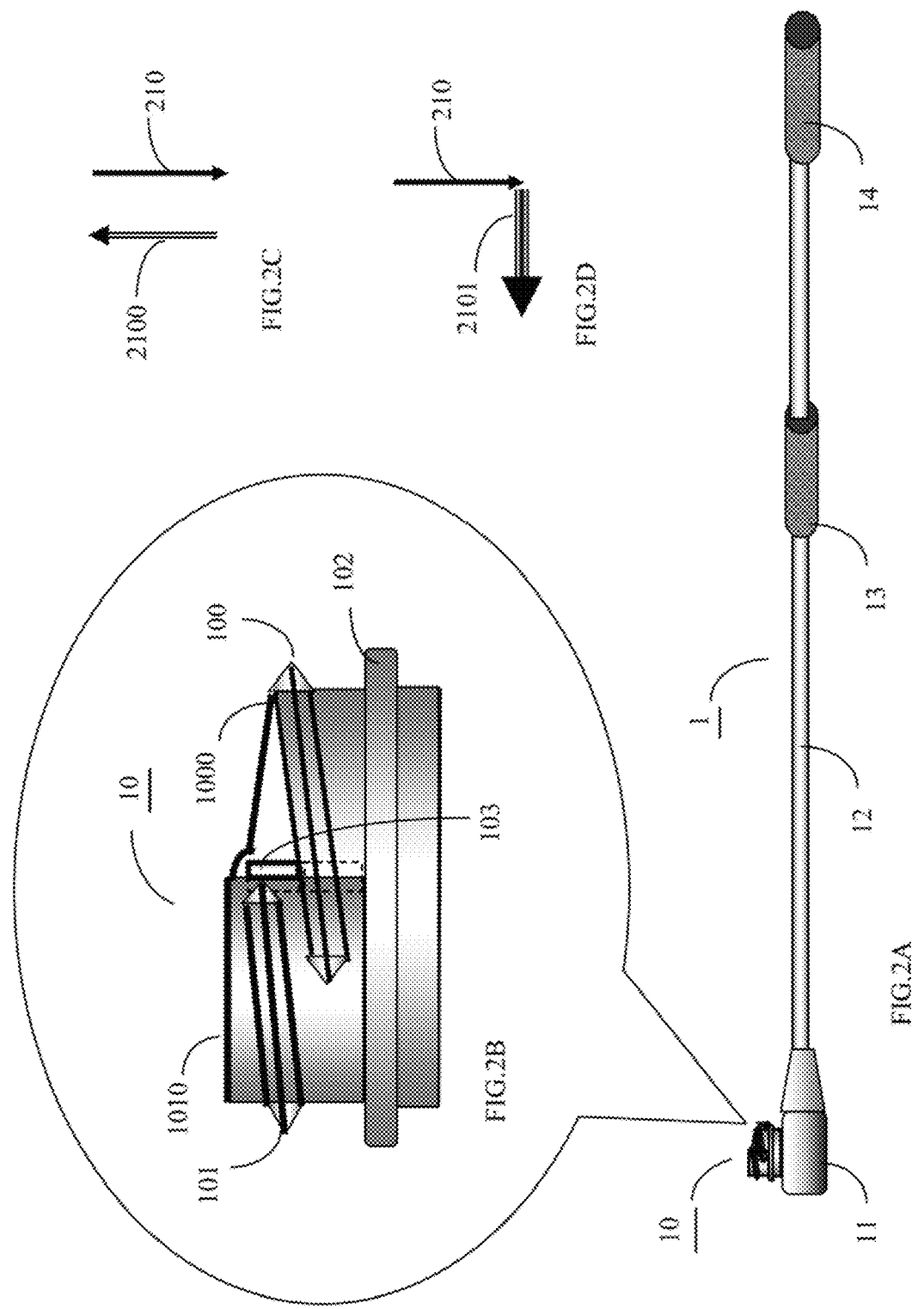

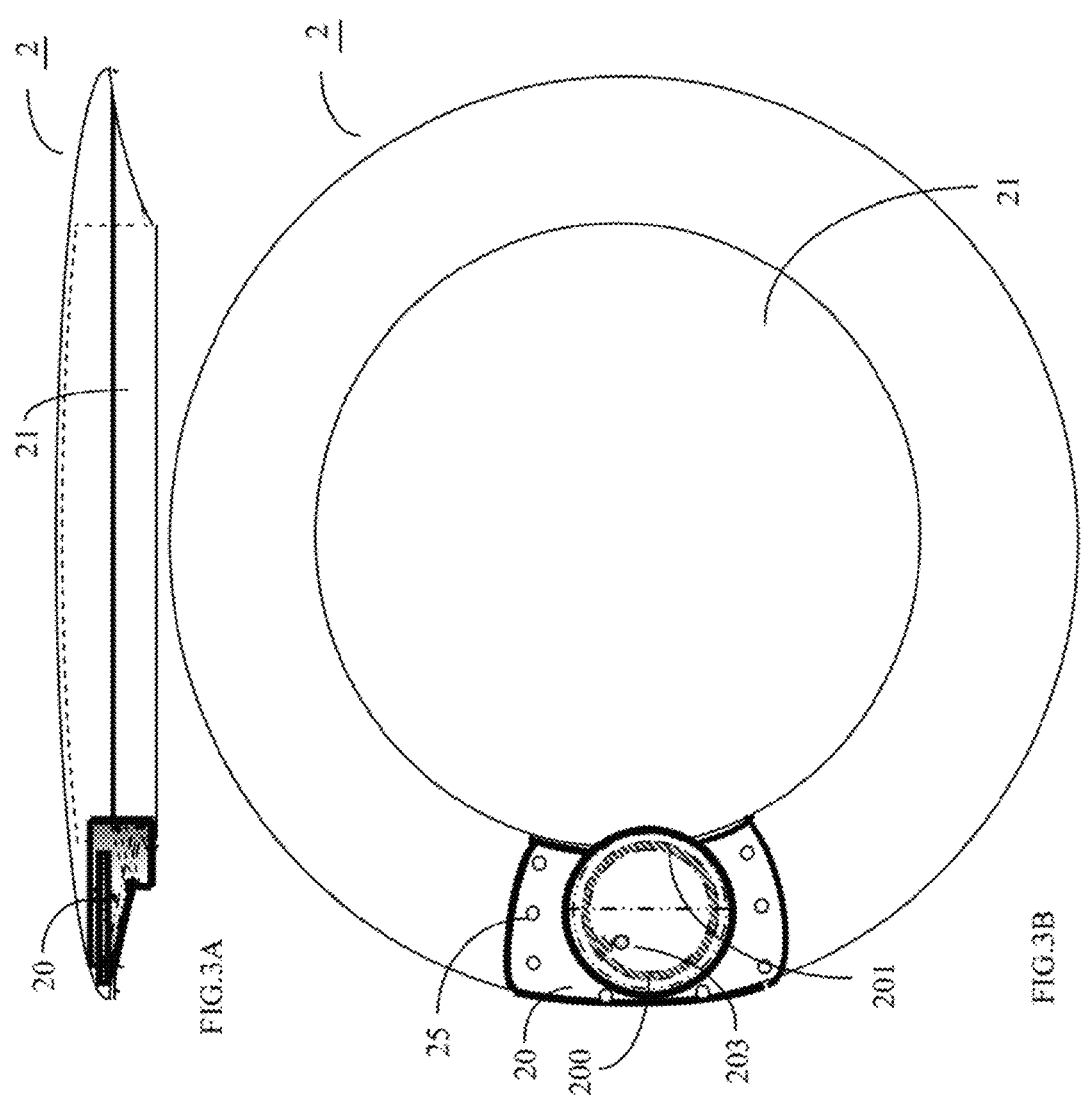

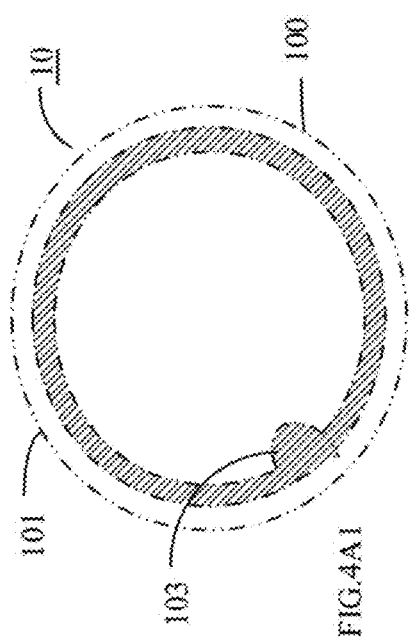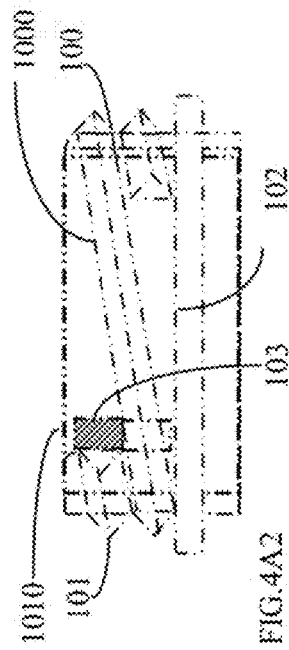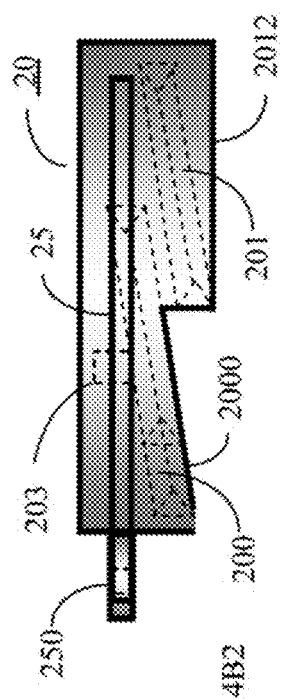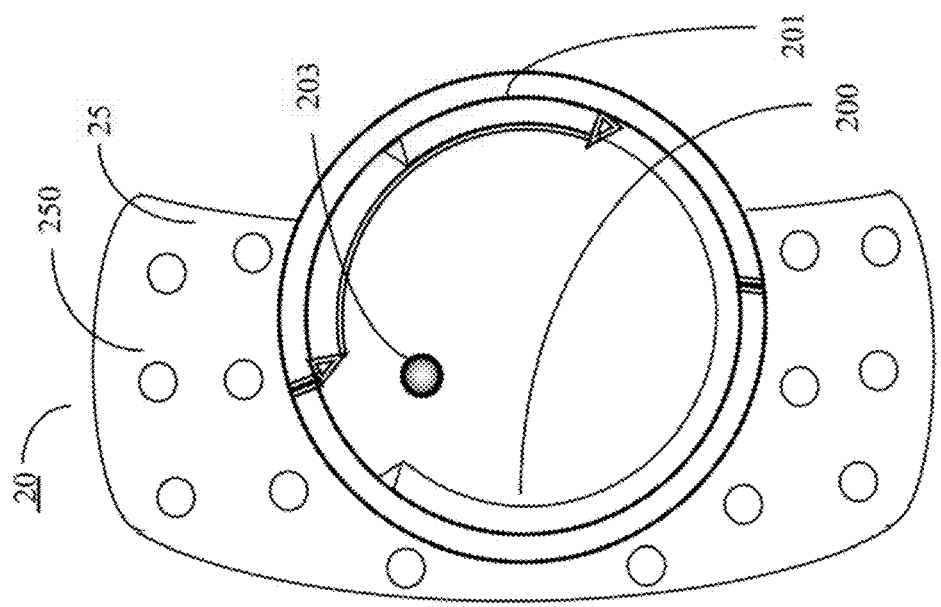

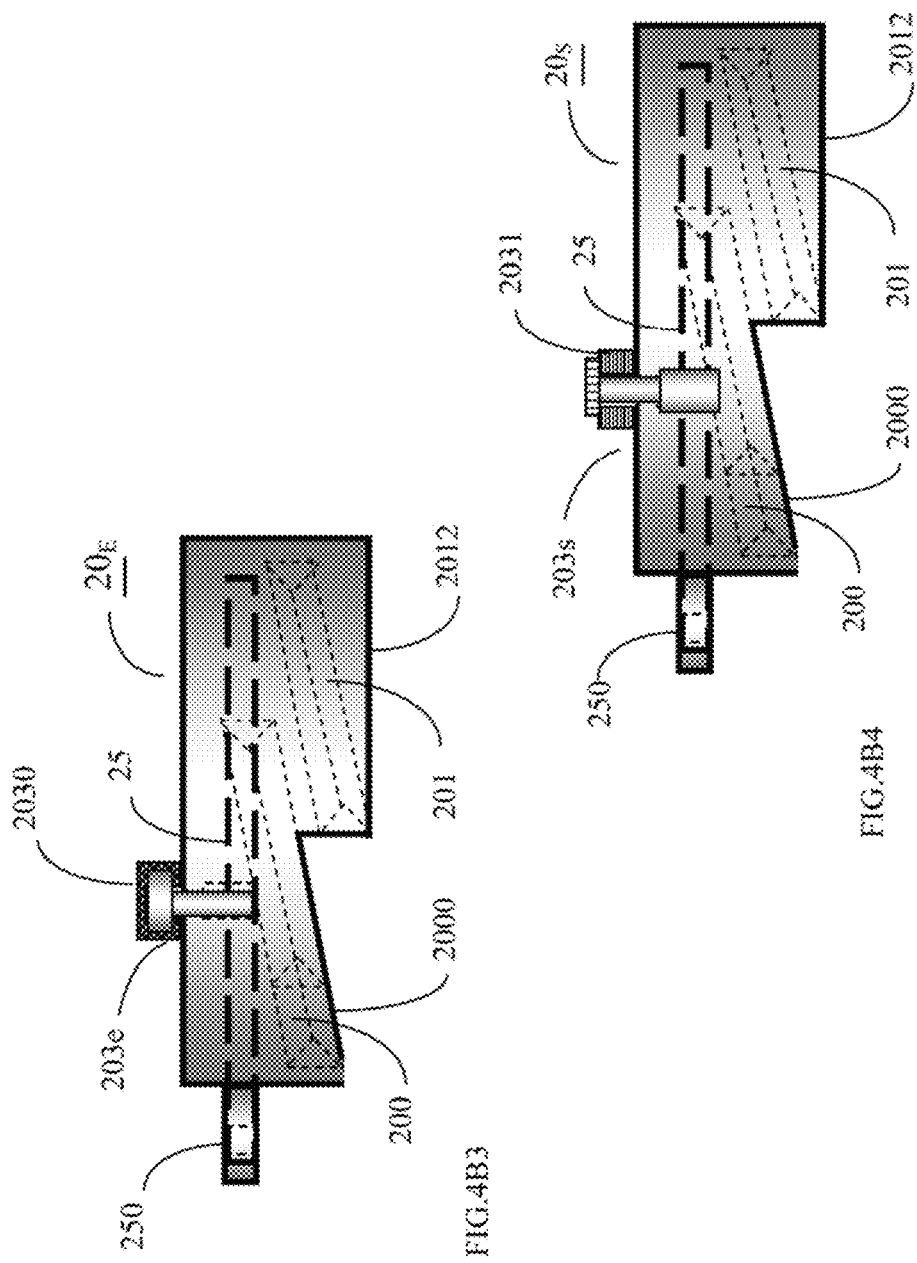

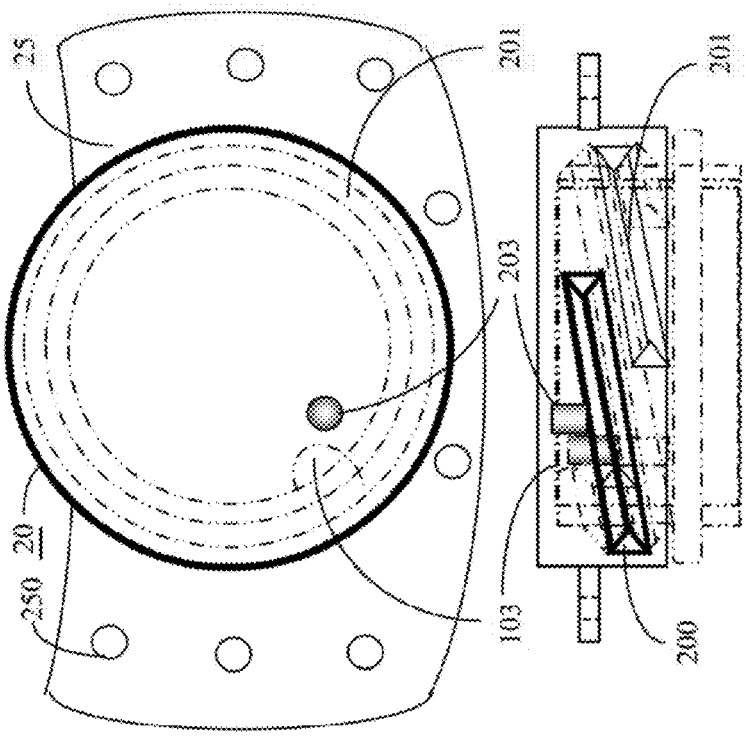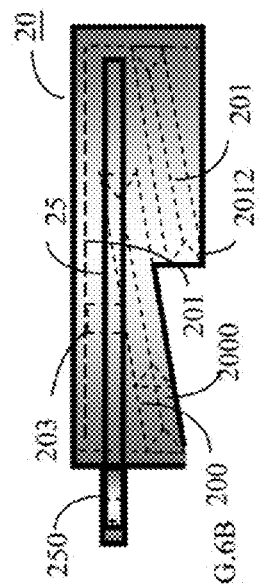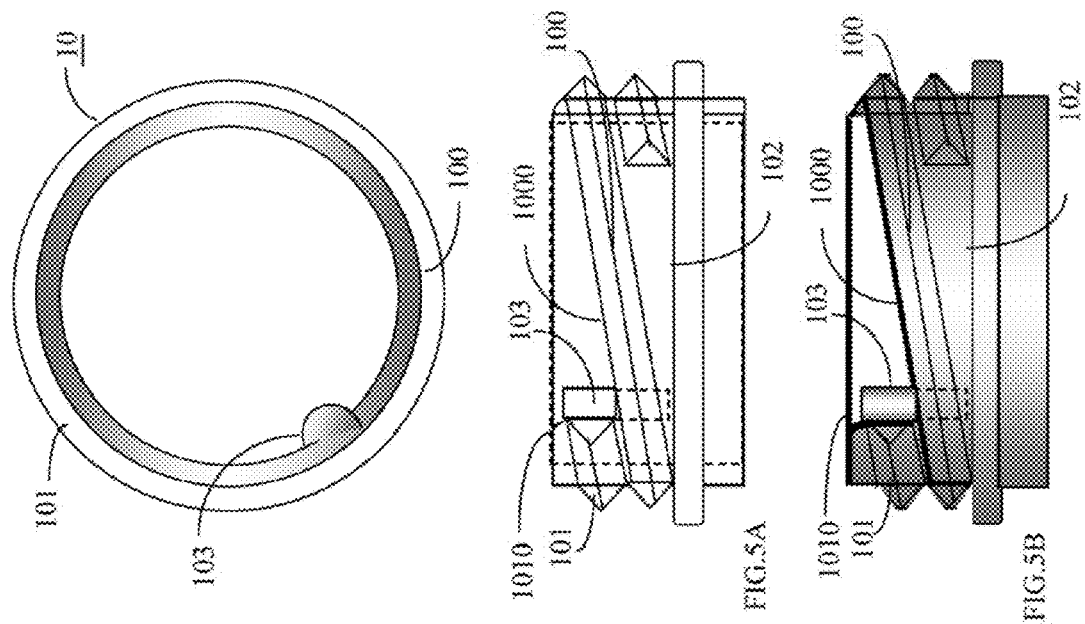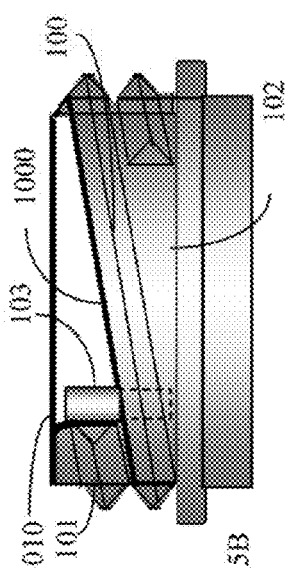

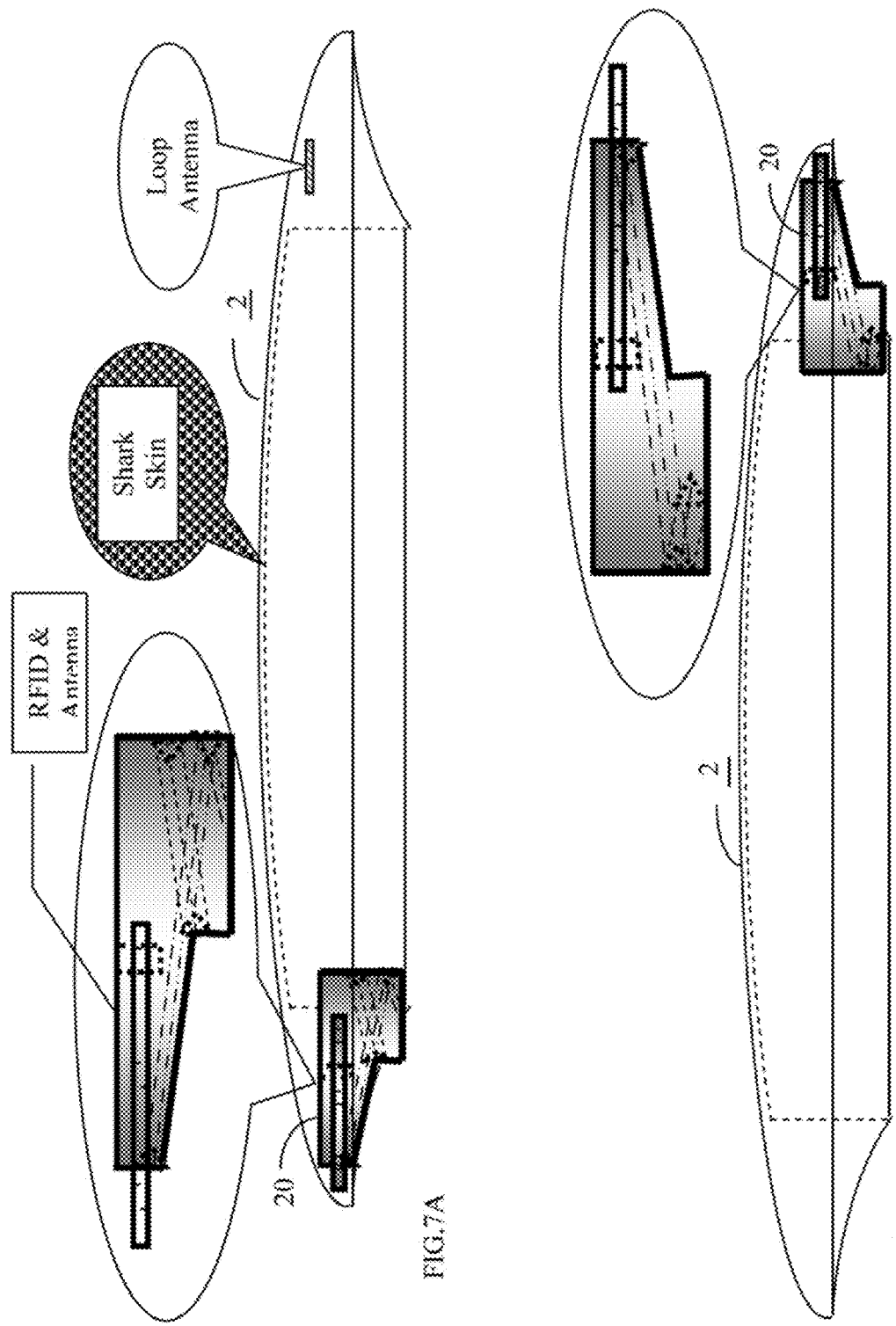

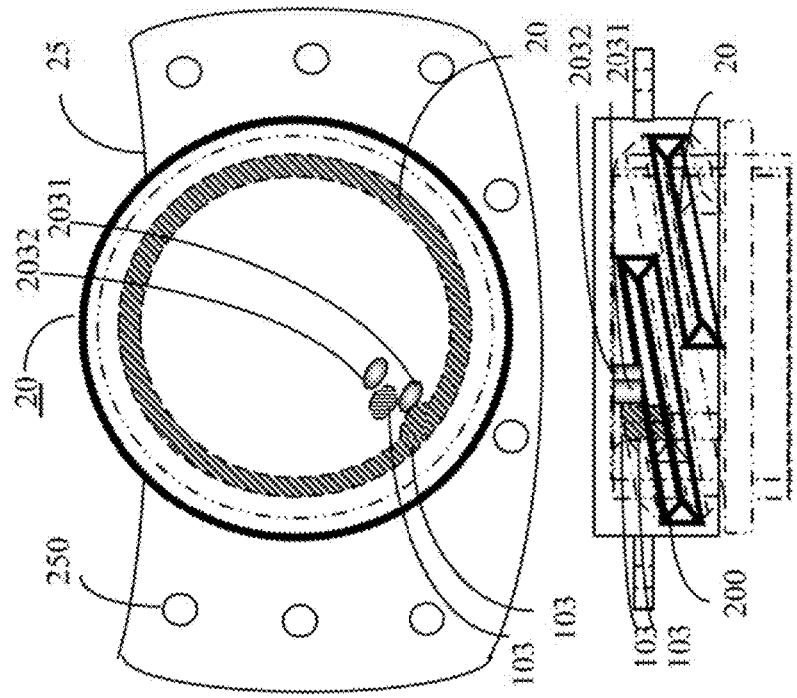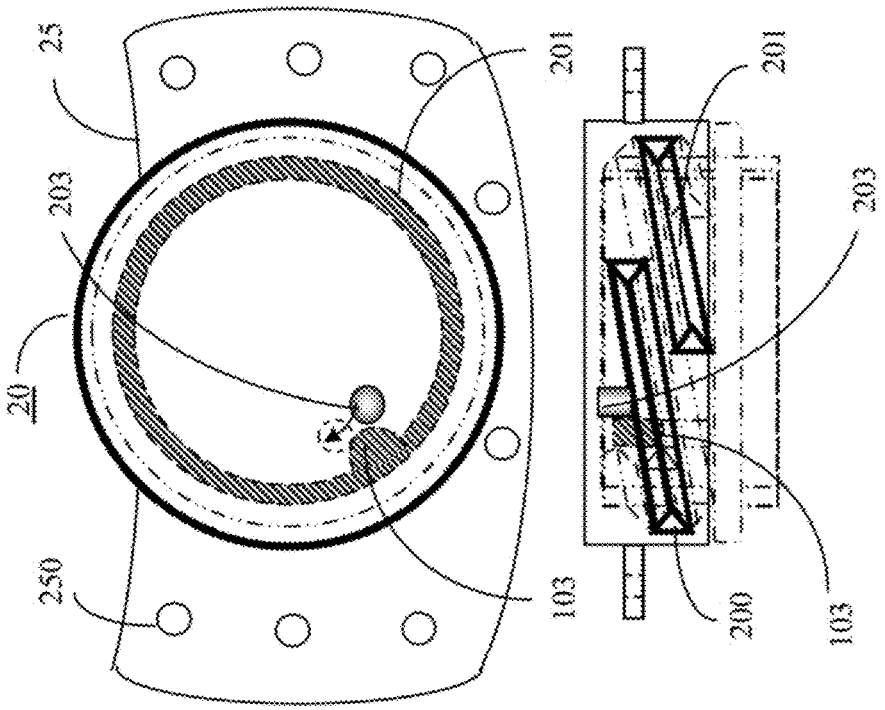

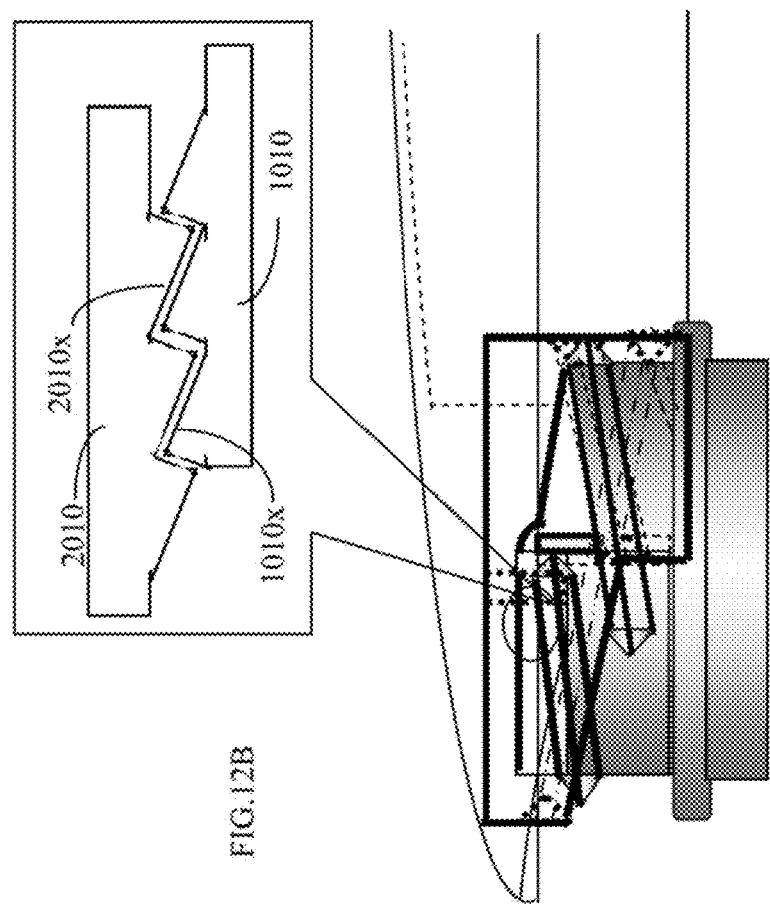

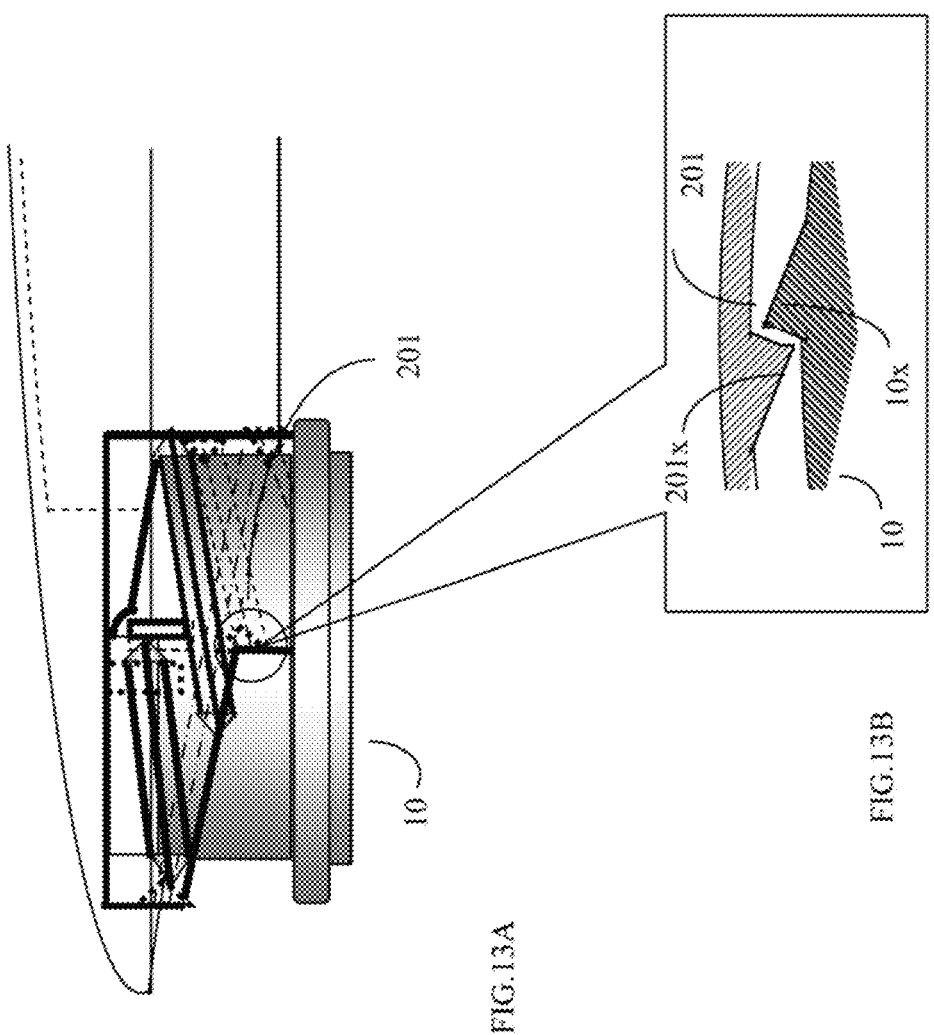

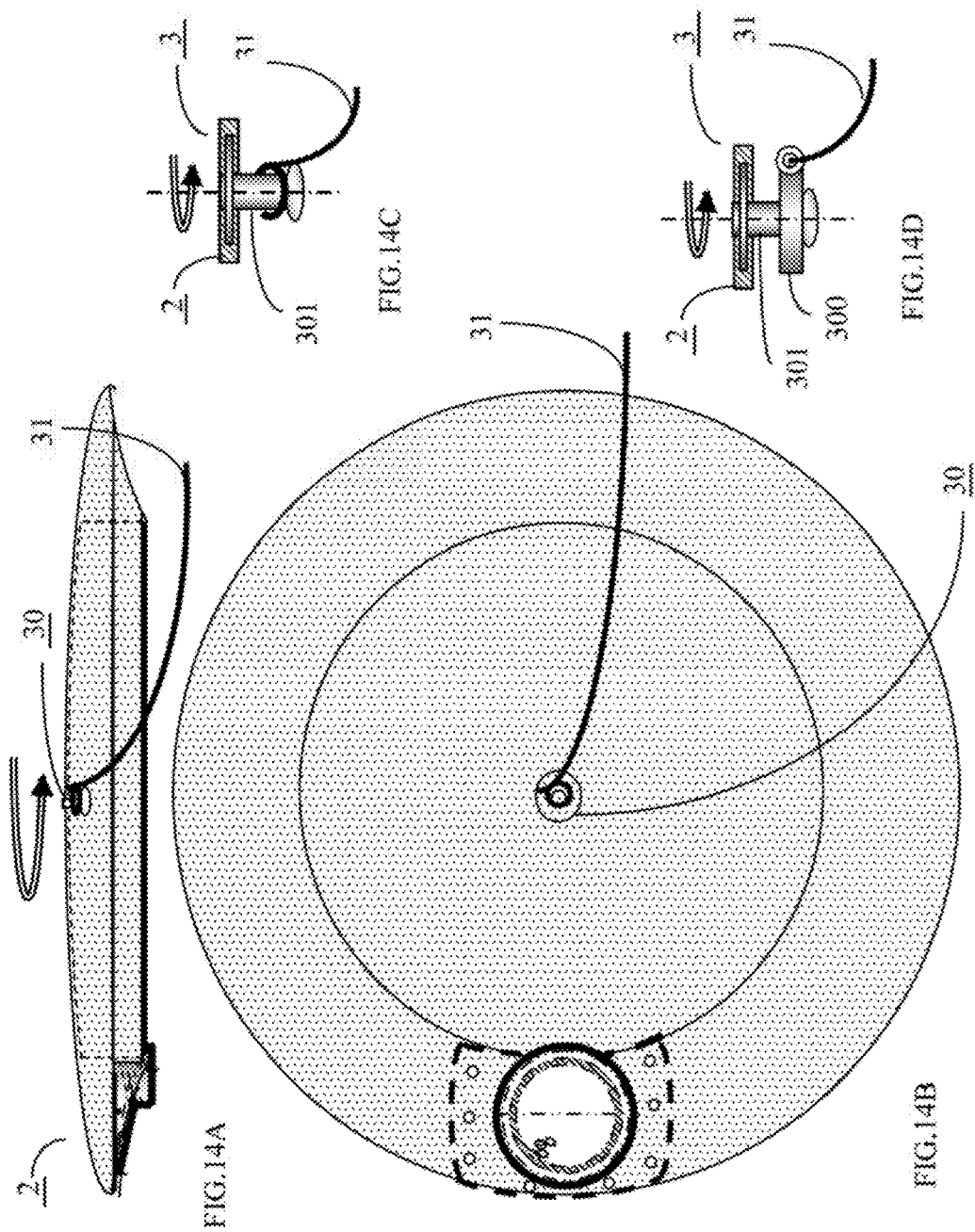

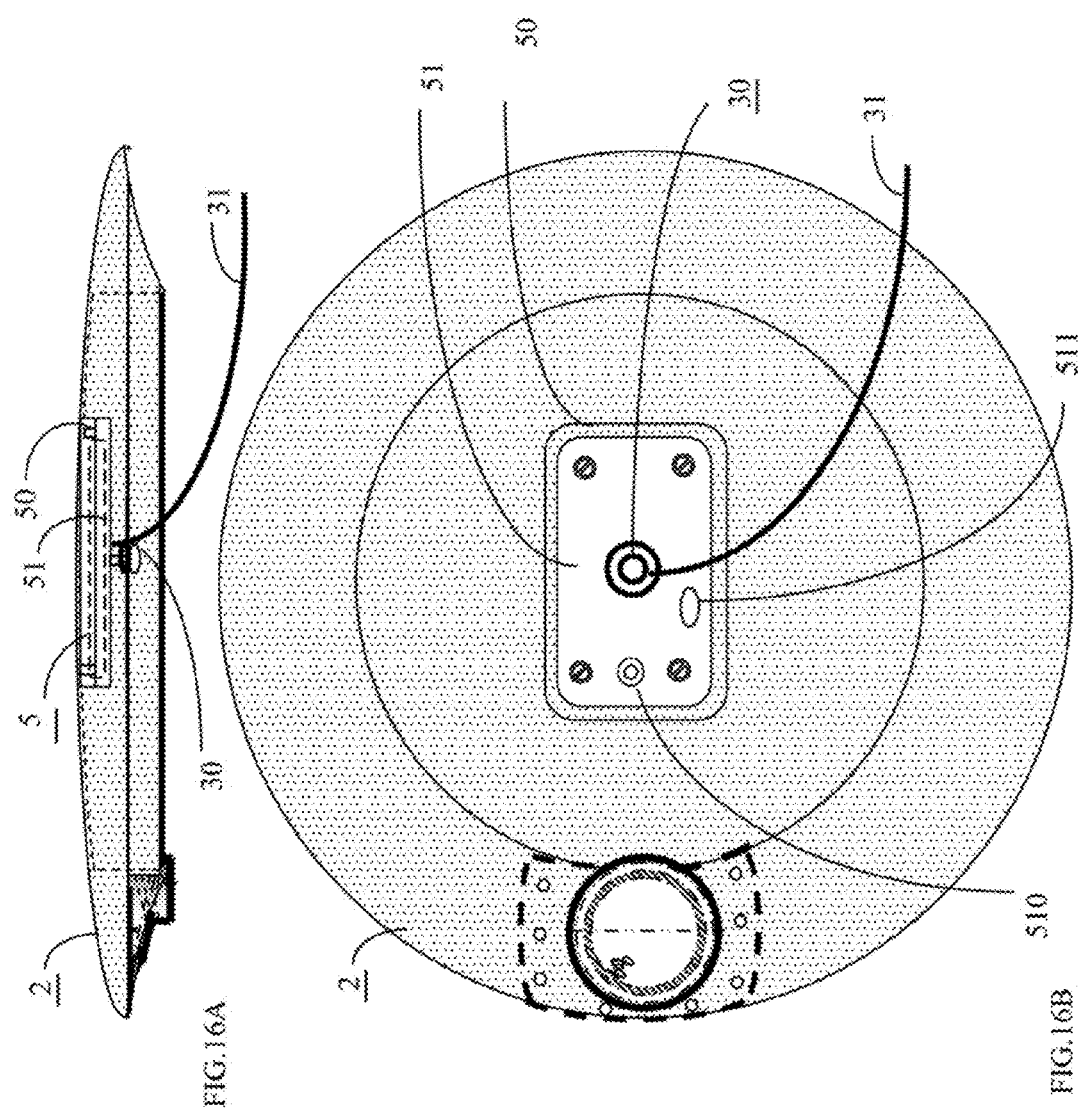

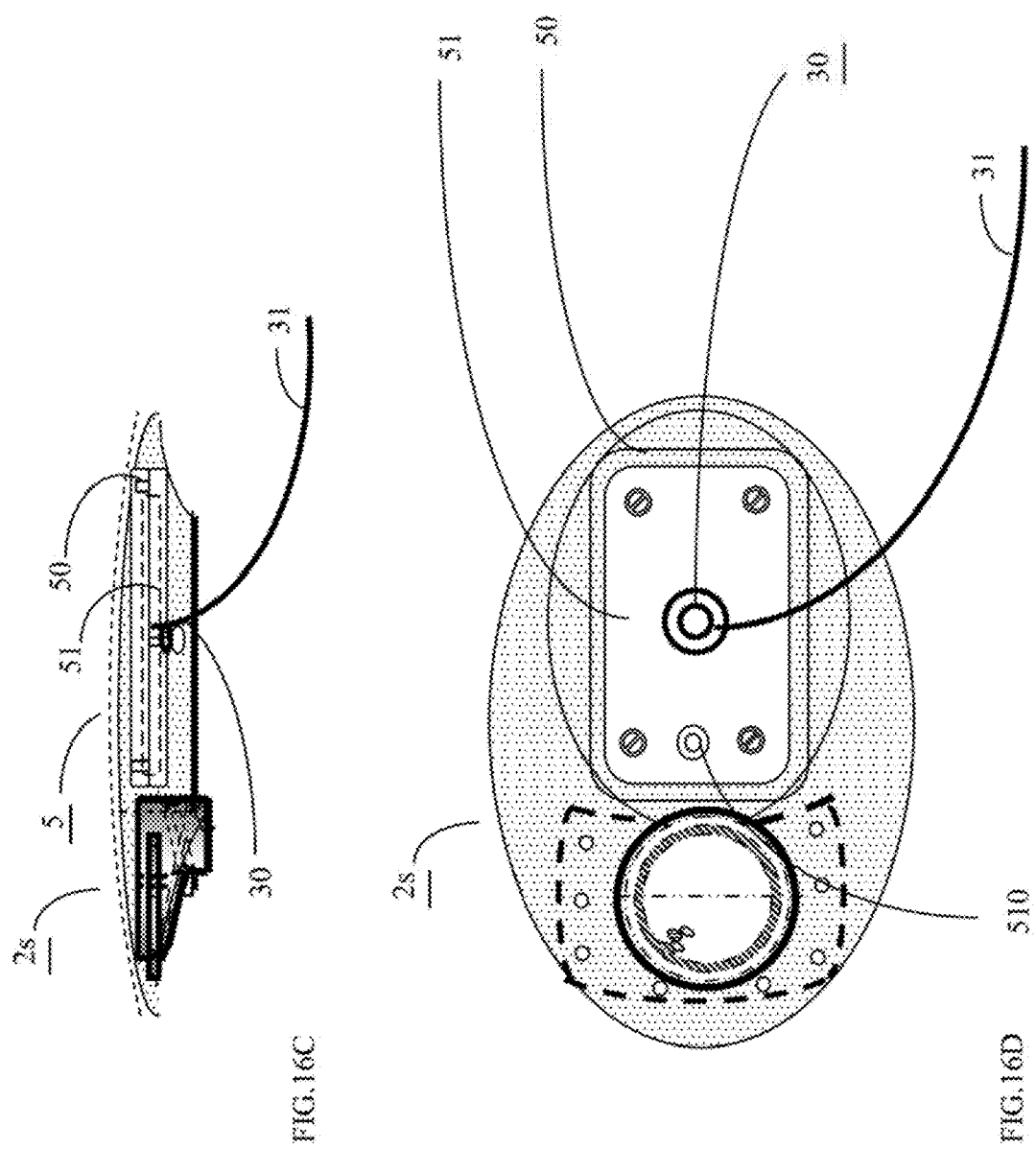

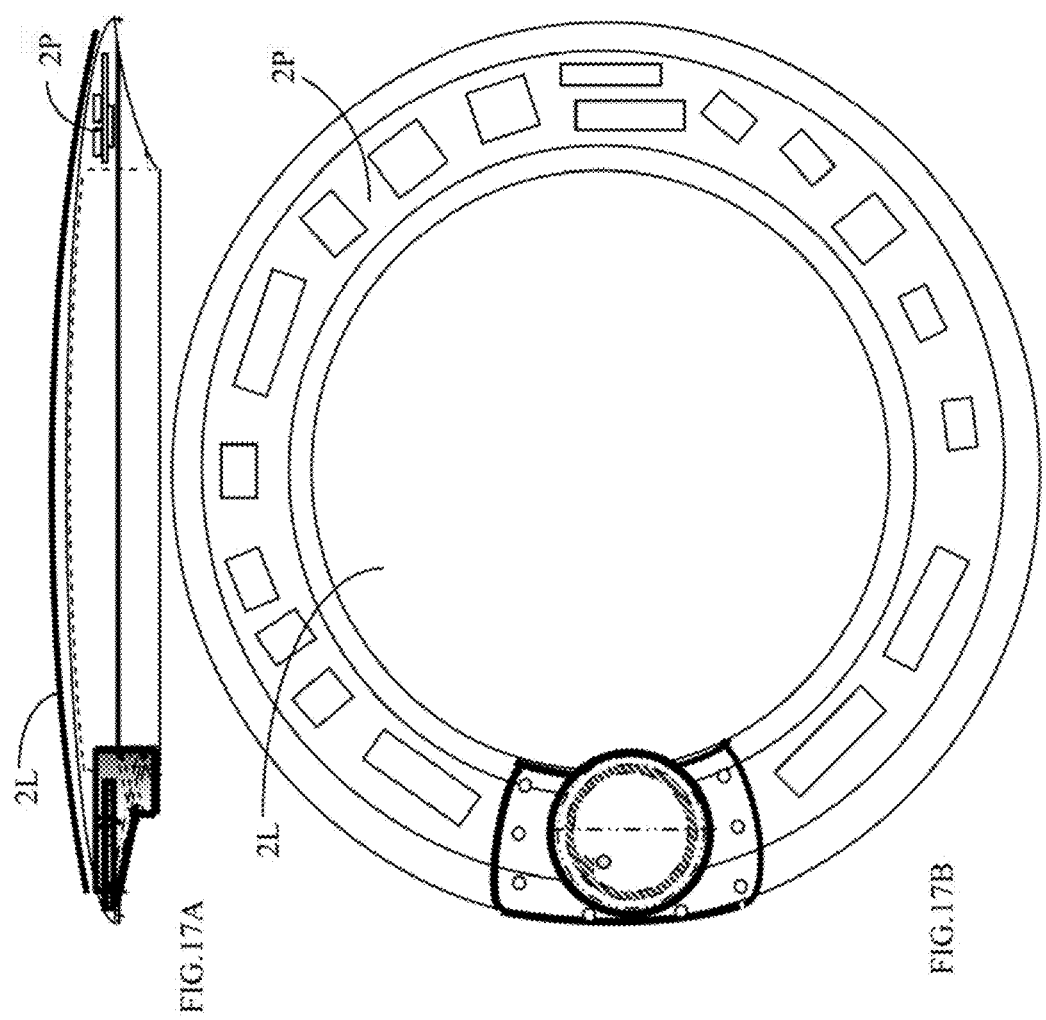

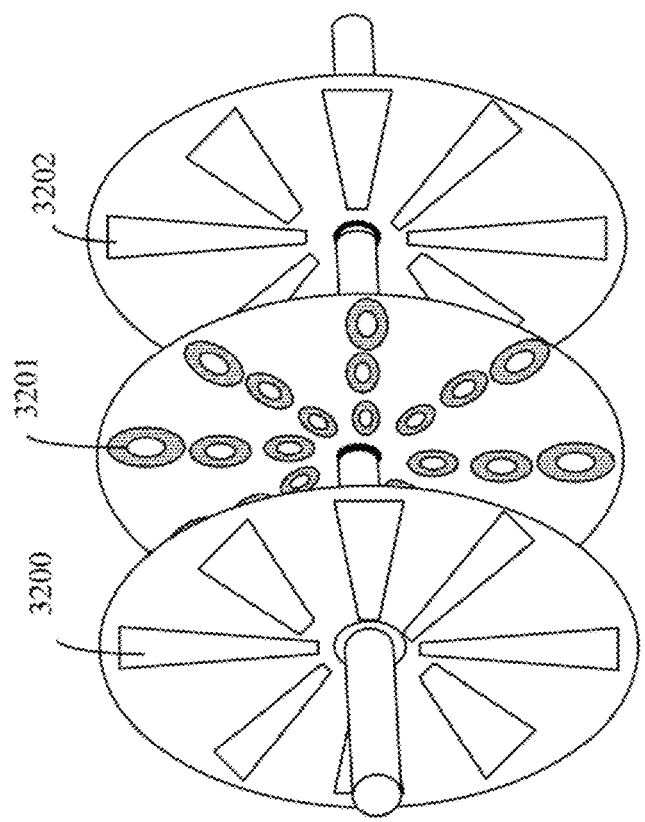
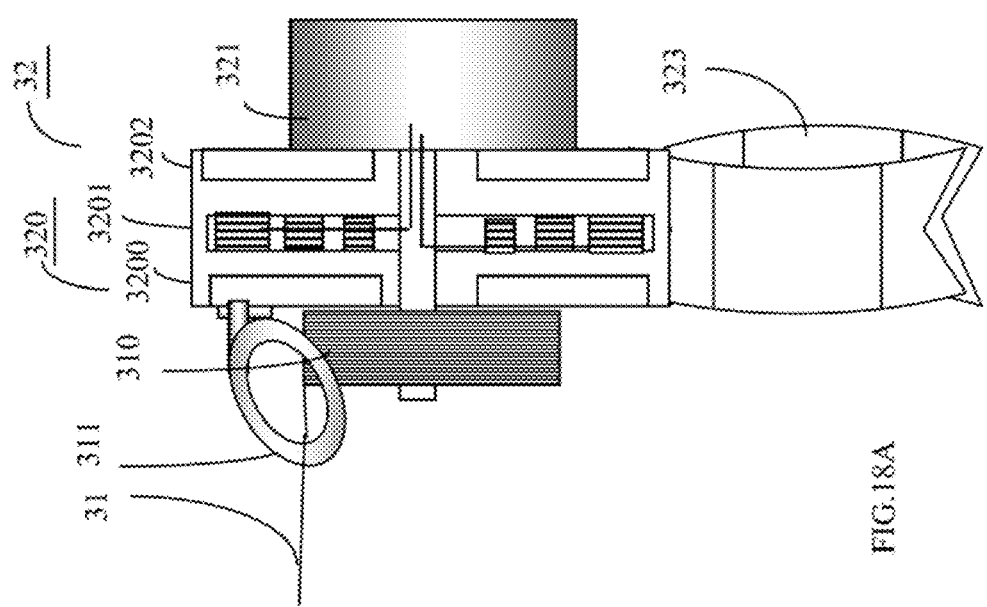
FIG.18B
FIG.18A

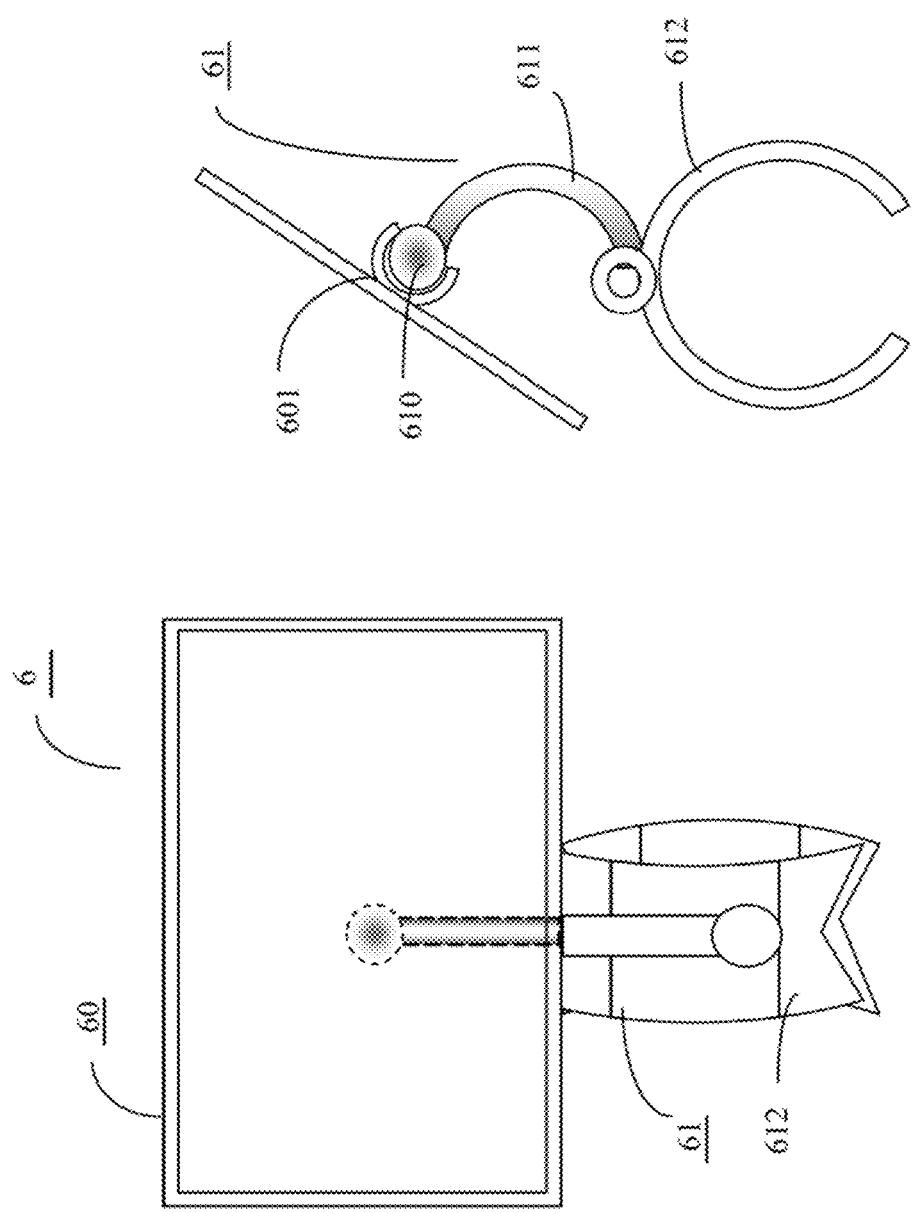

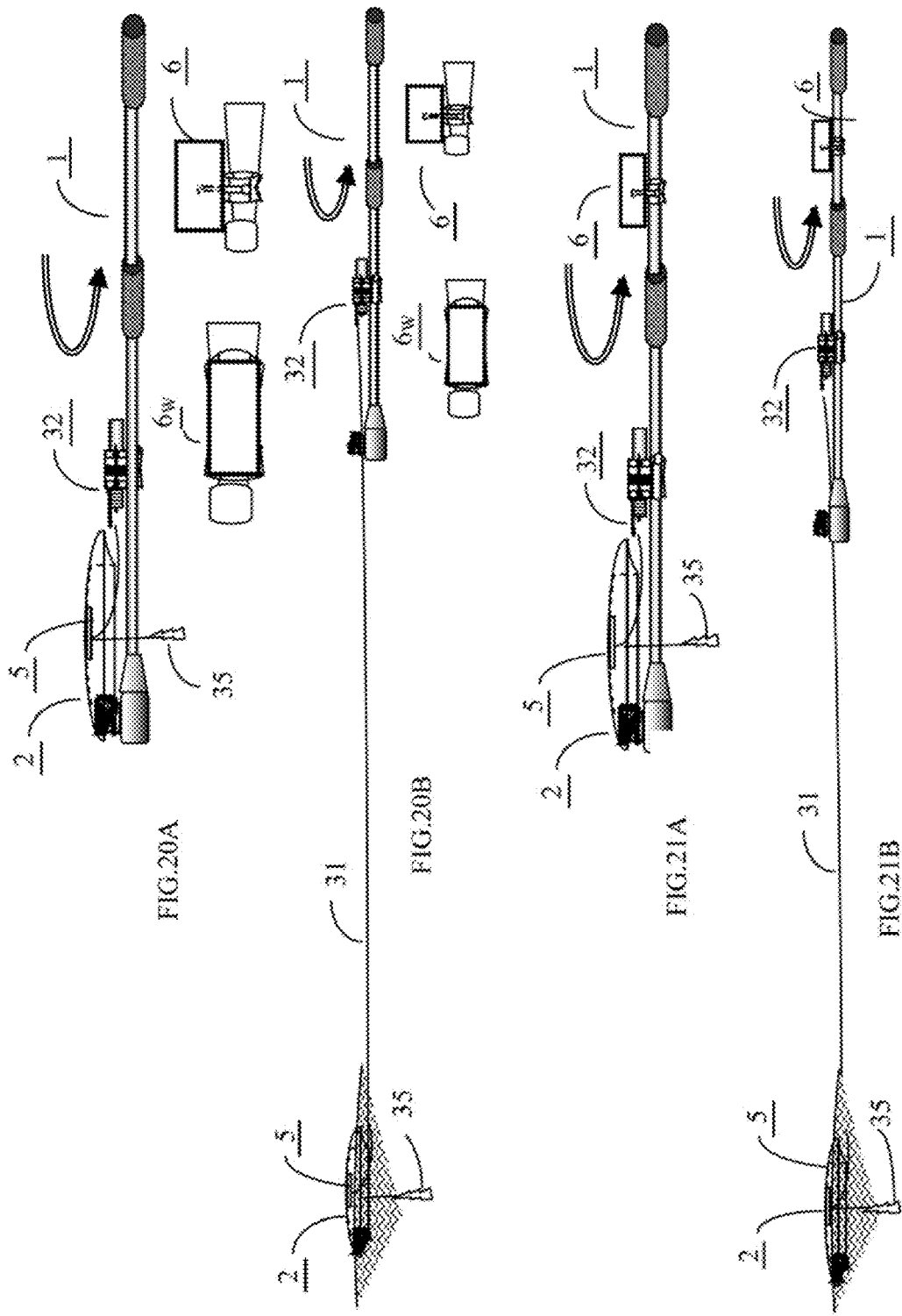

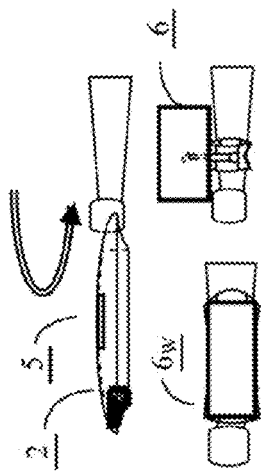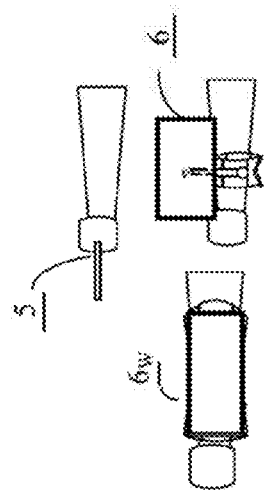
FIG. 22A
FIG. 23A
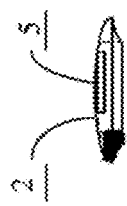
FIG. 22B
FIG. 23B

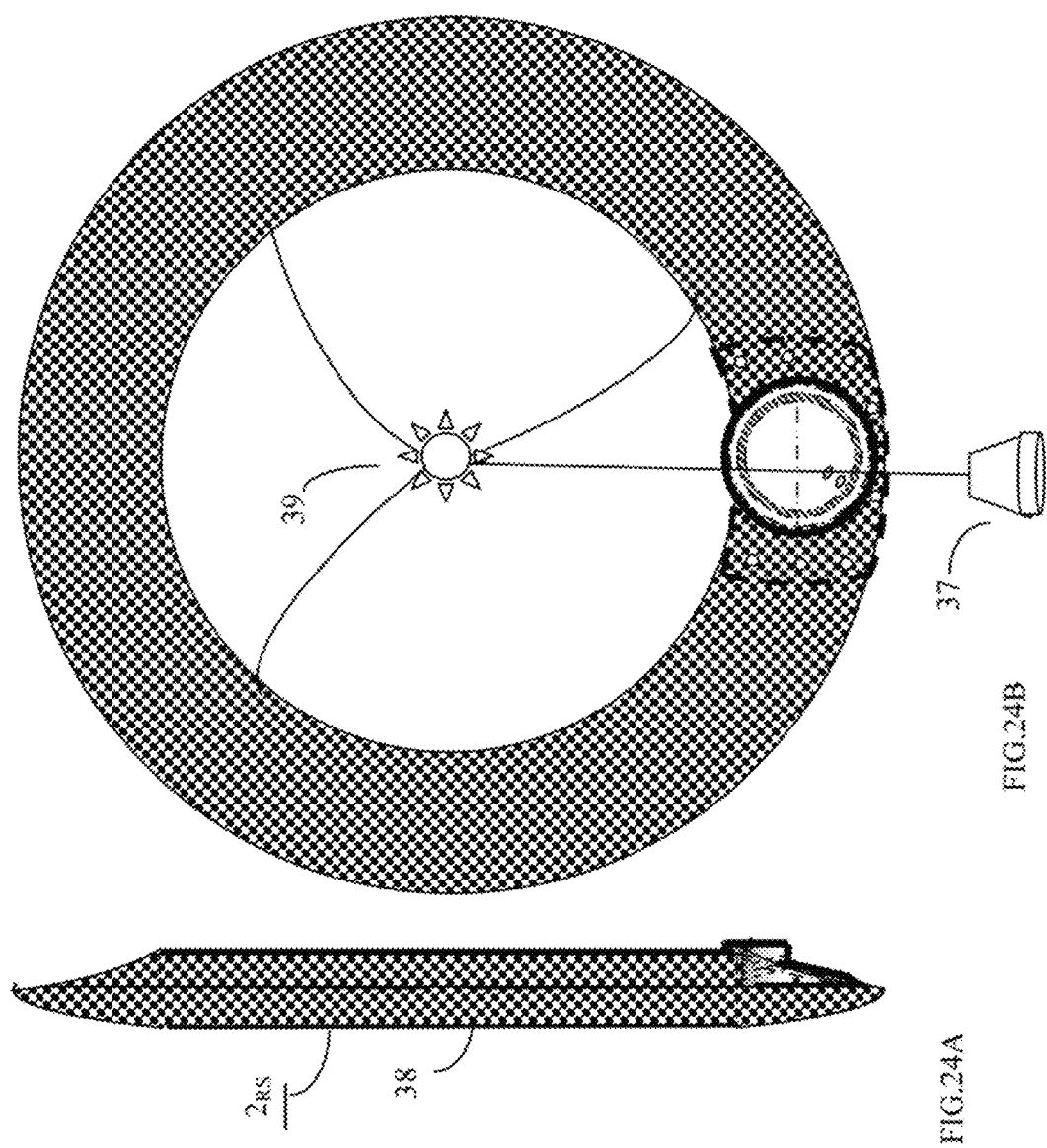

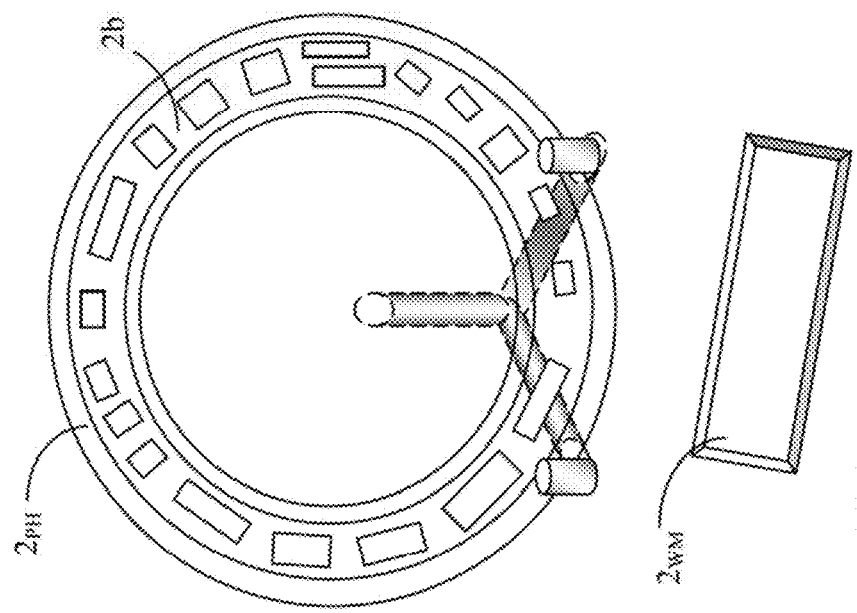
FIG.25C
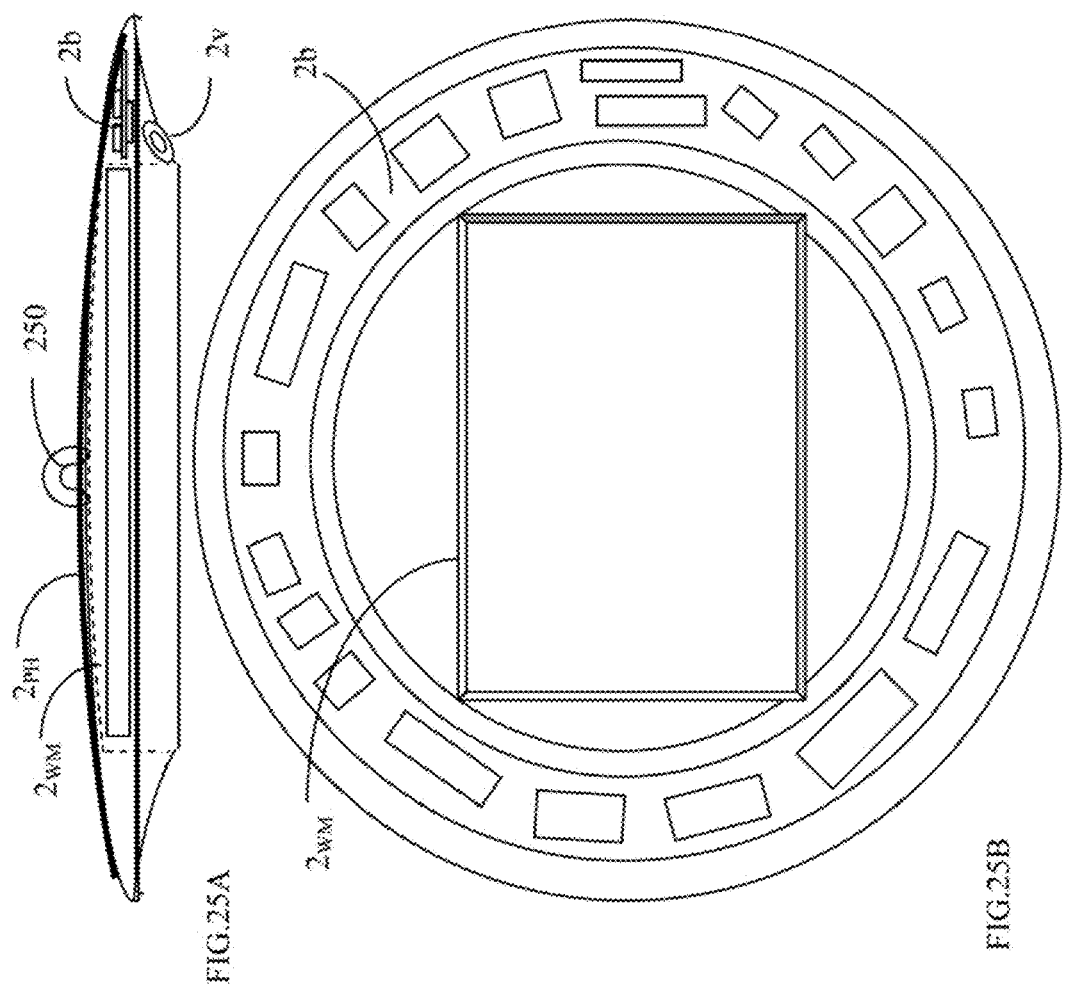
FIG.25A
FIG.25B

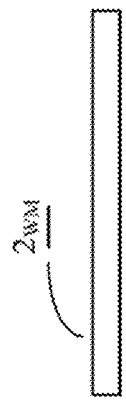
FIG.25A2
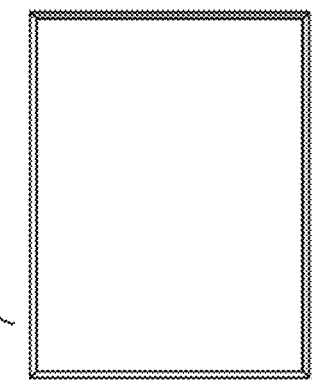
FIG.25B2
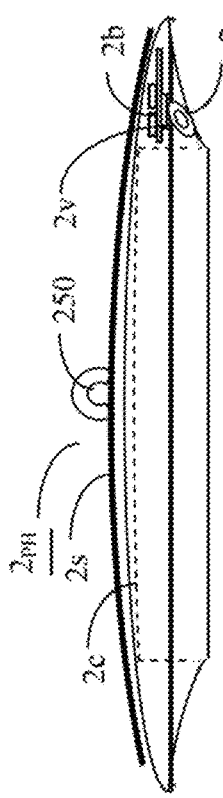
FIG.25A1
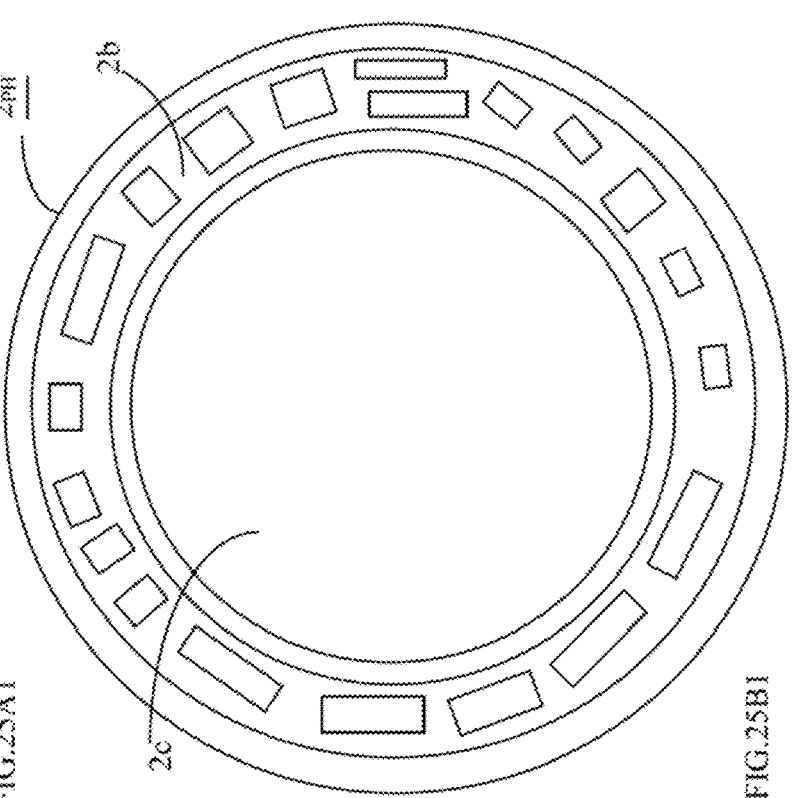
FIG.25B1

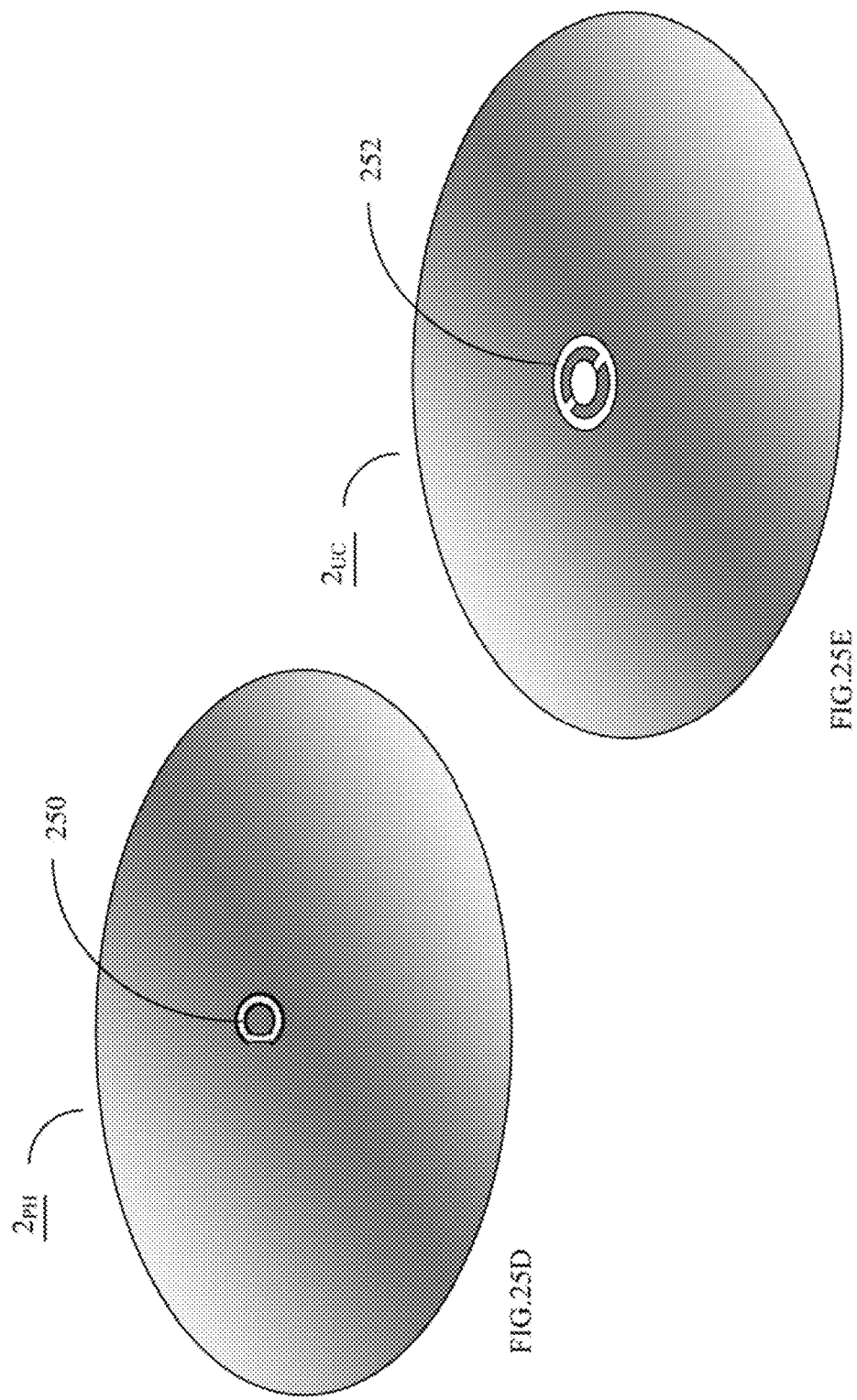

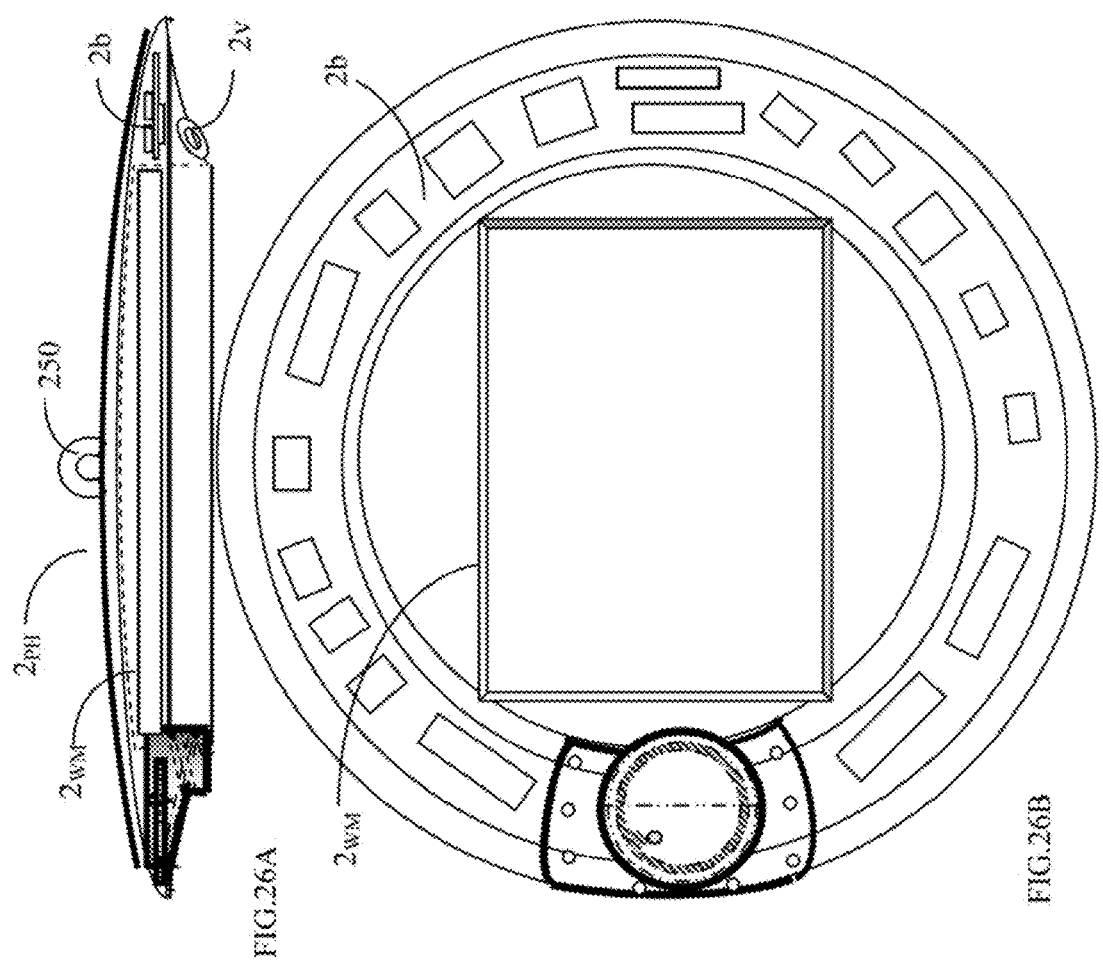

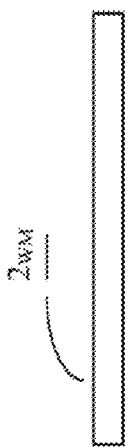
FIG.26A2
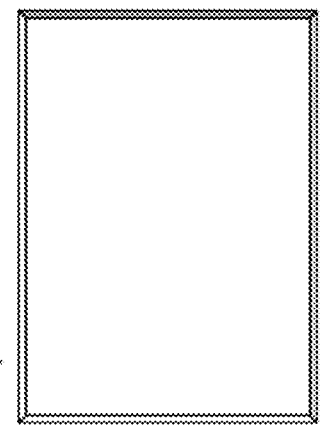
FIG.26B2
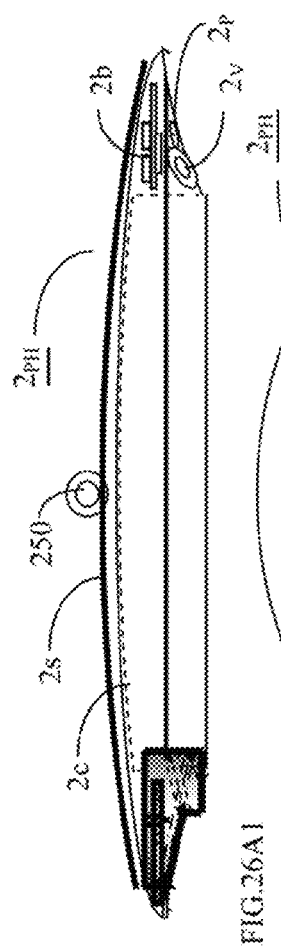
FIG.26A1
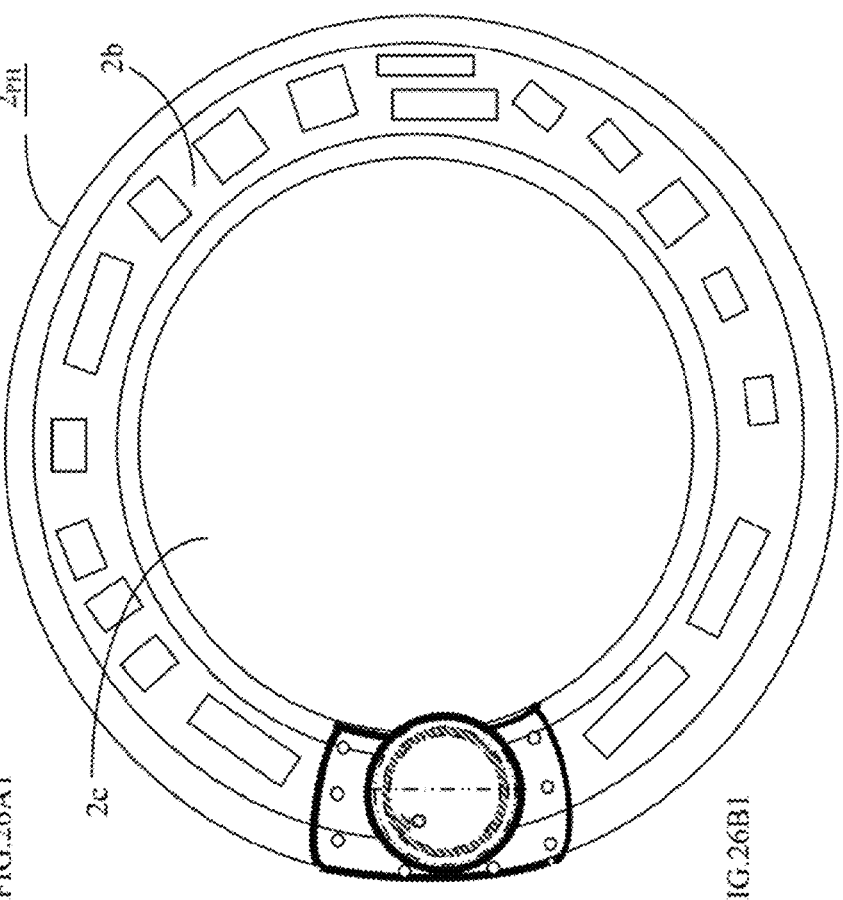
FIG.26B1

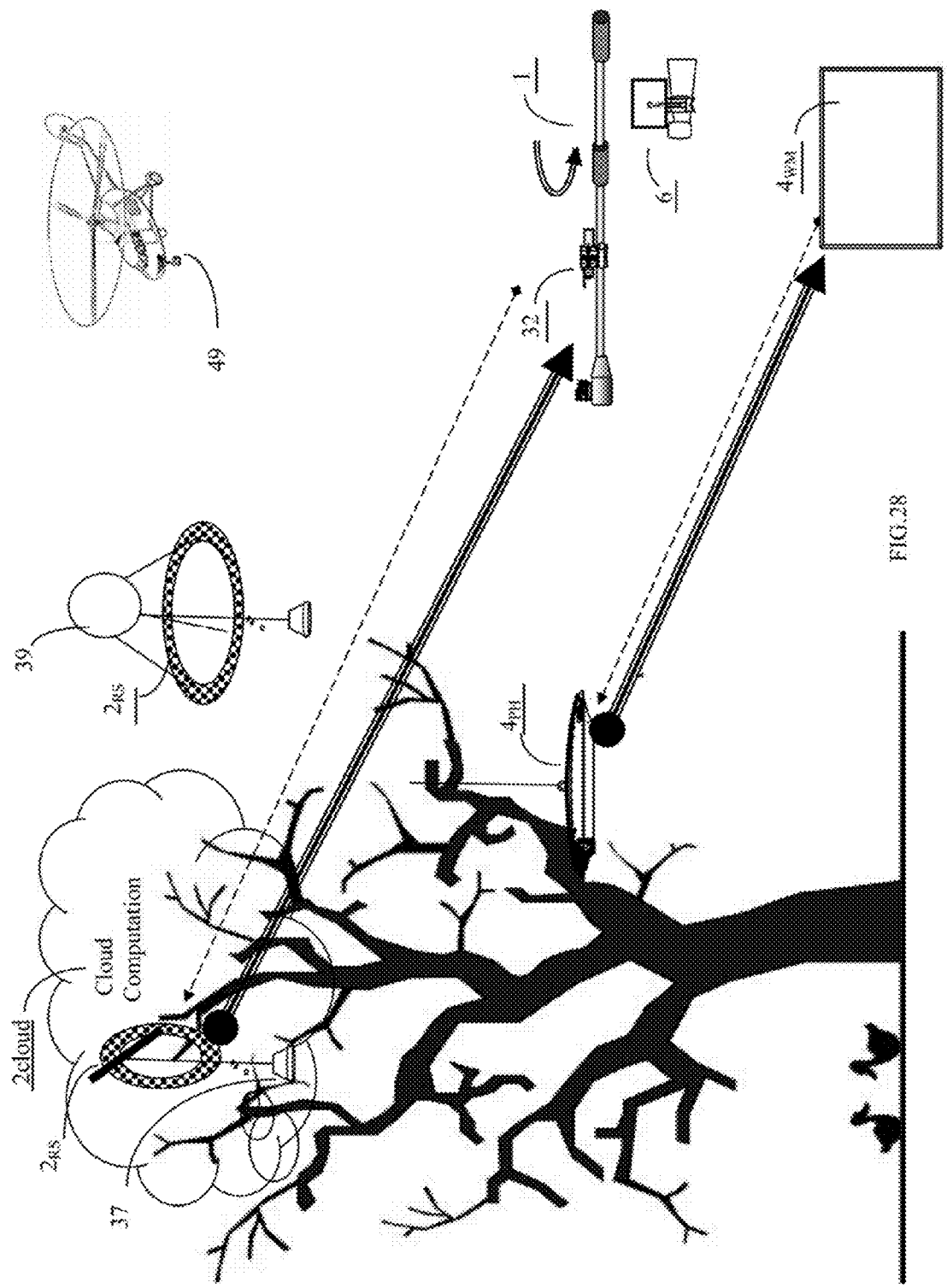

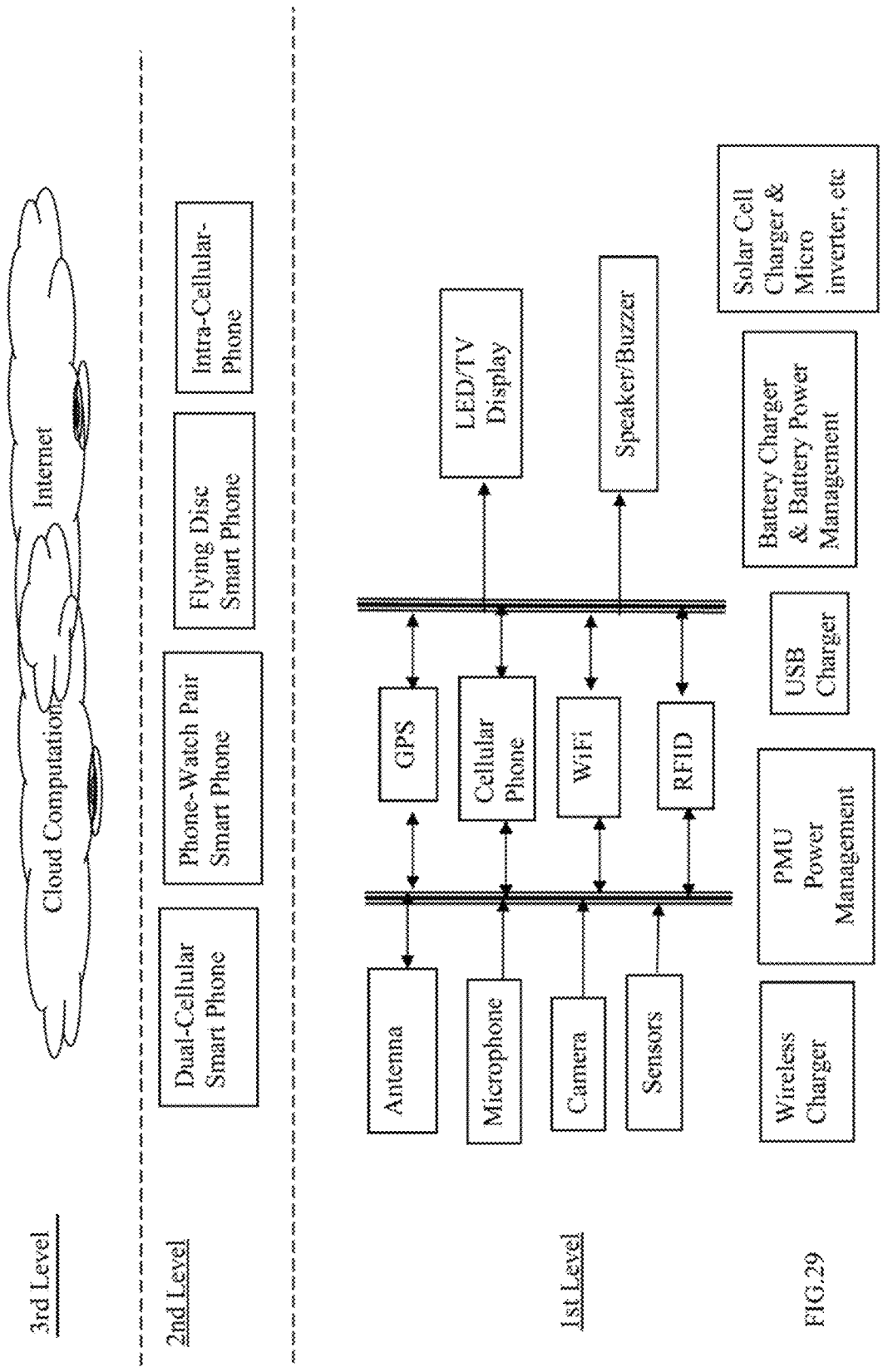

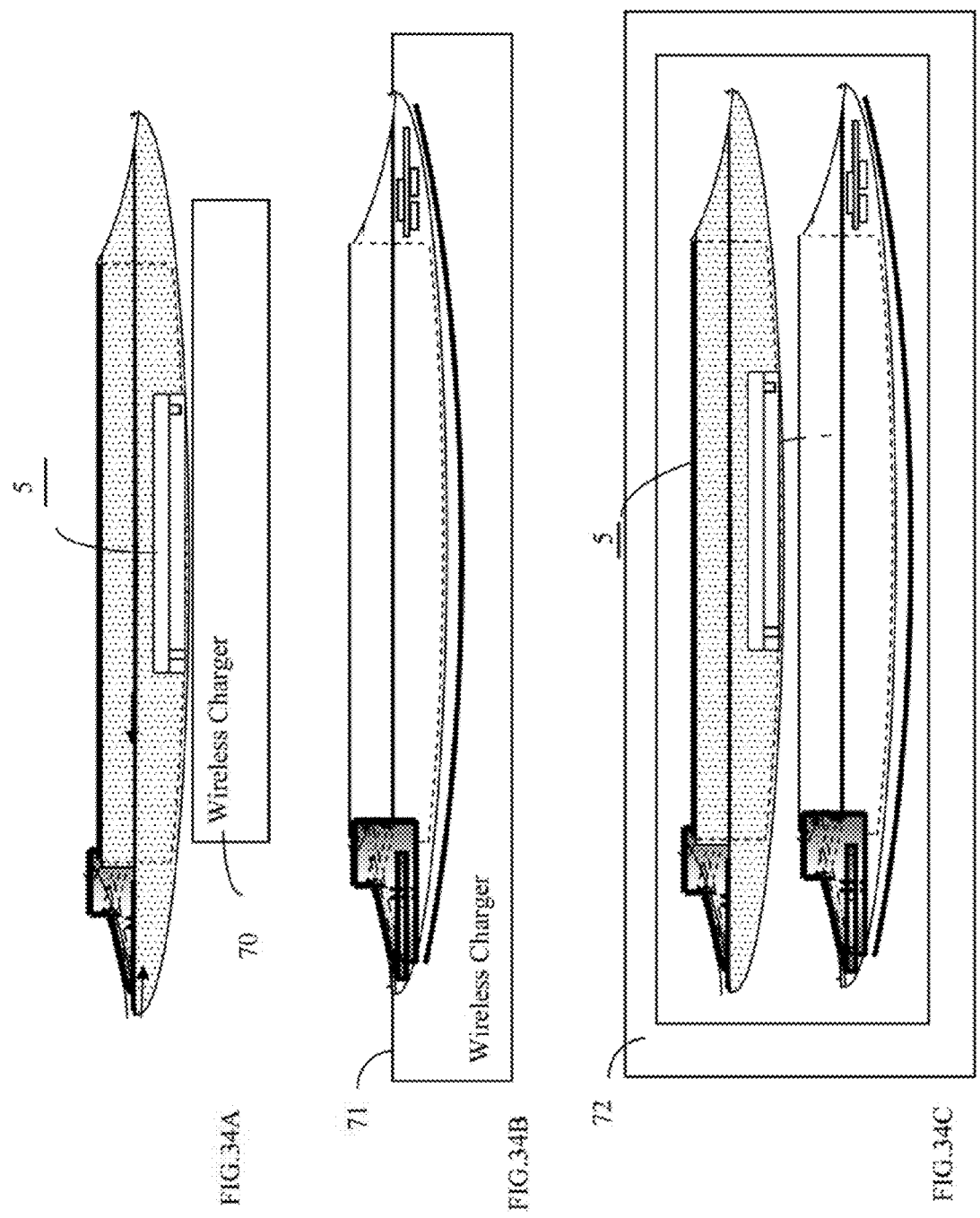

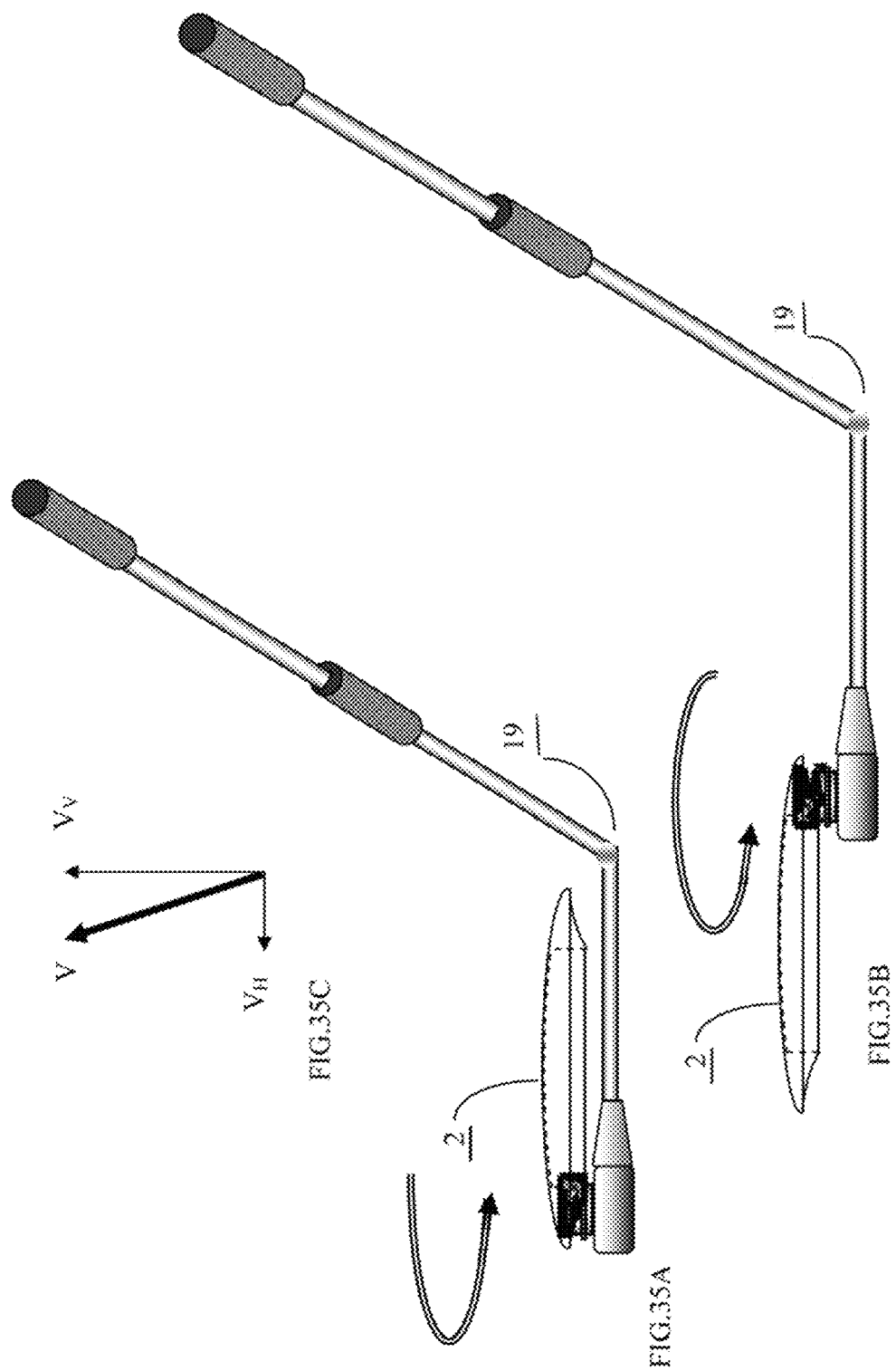

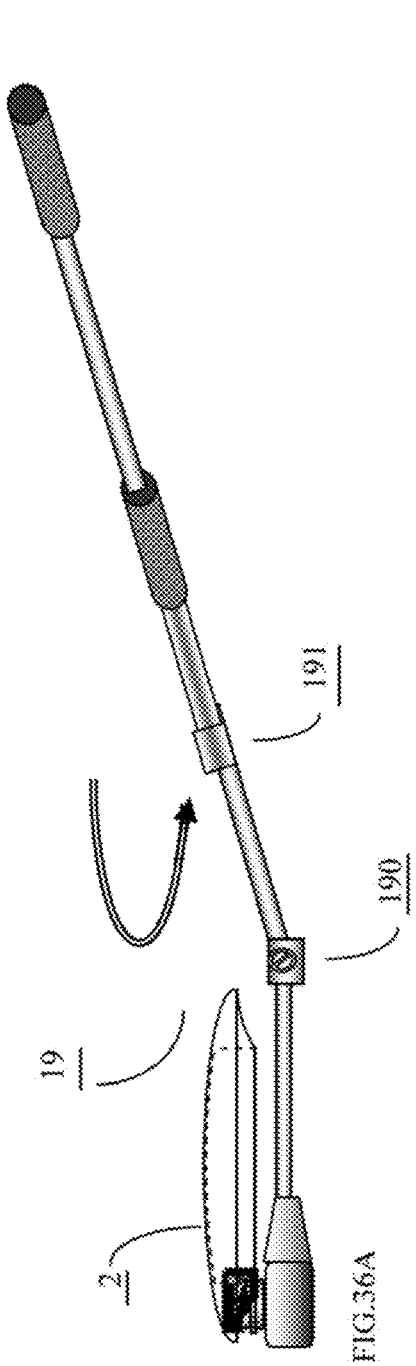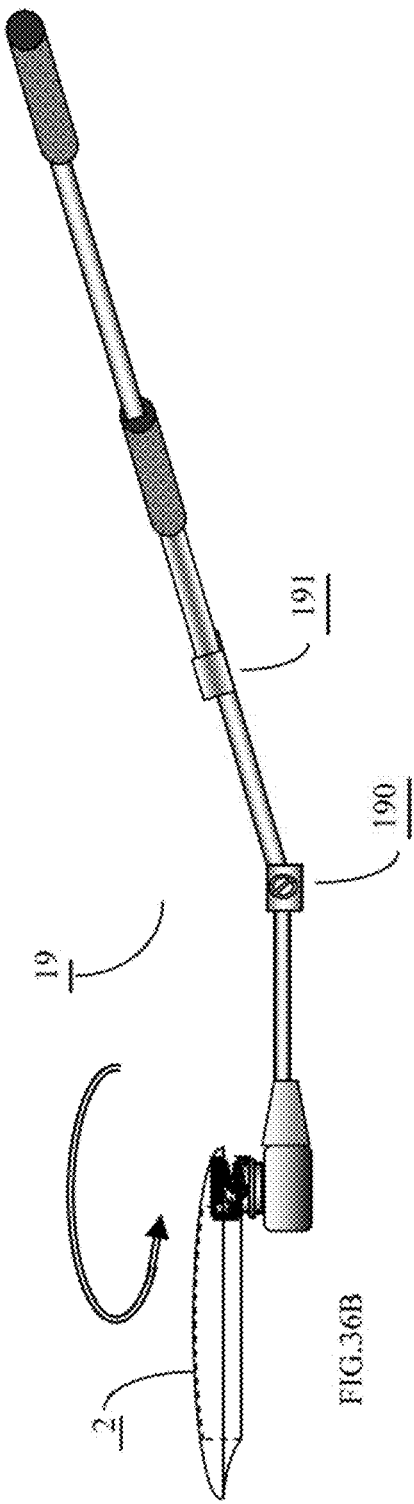
FIG. 36A
FIG. 36B

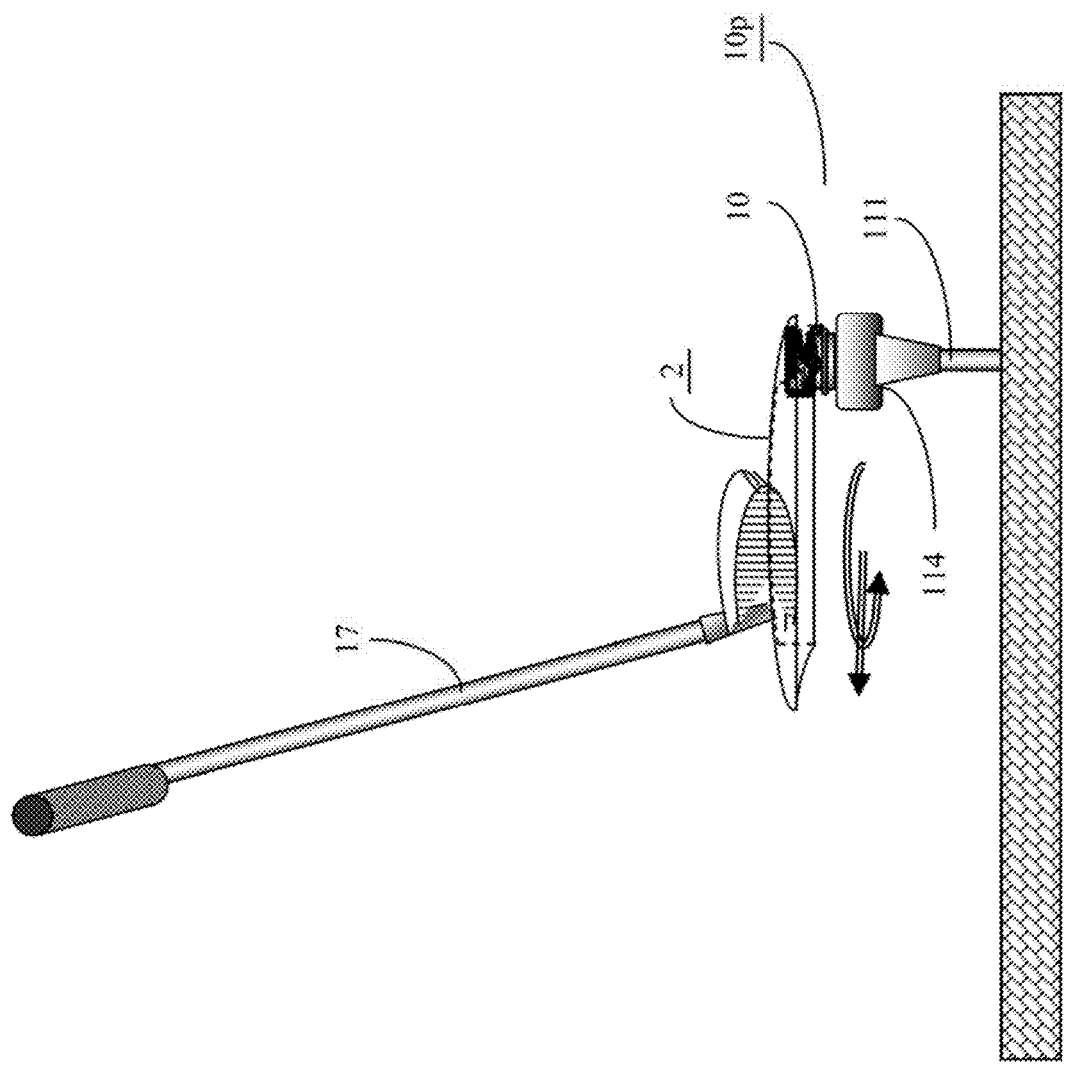

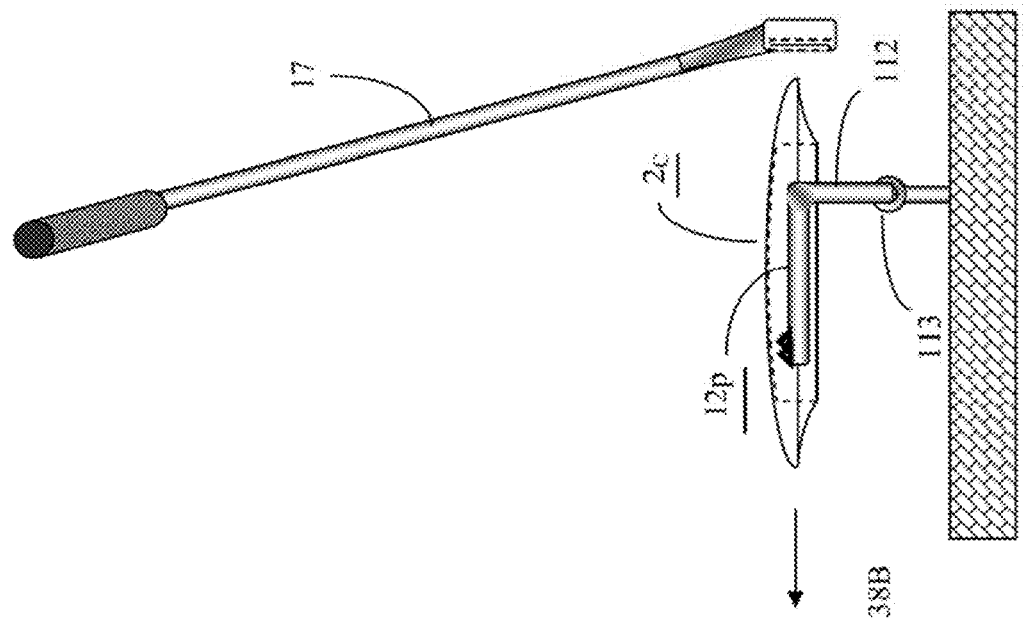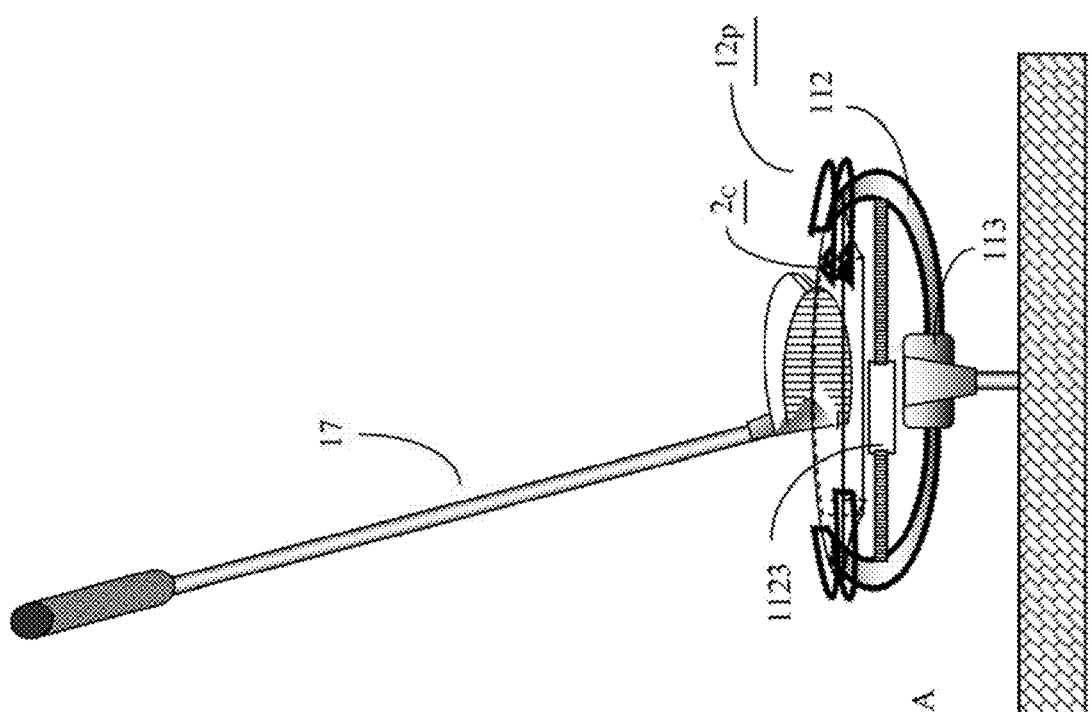

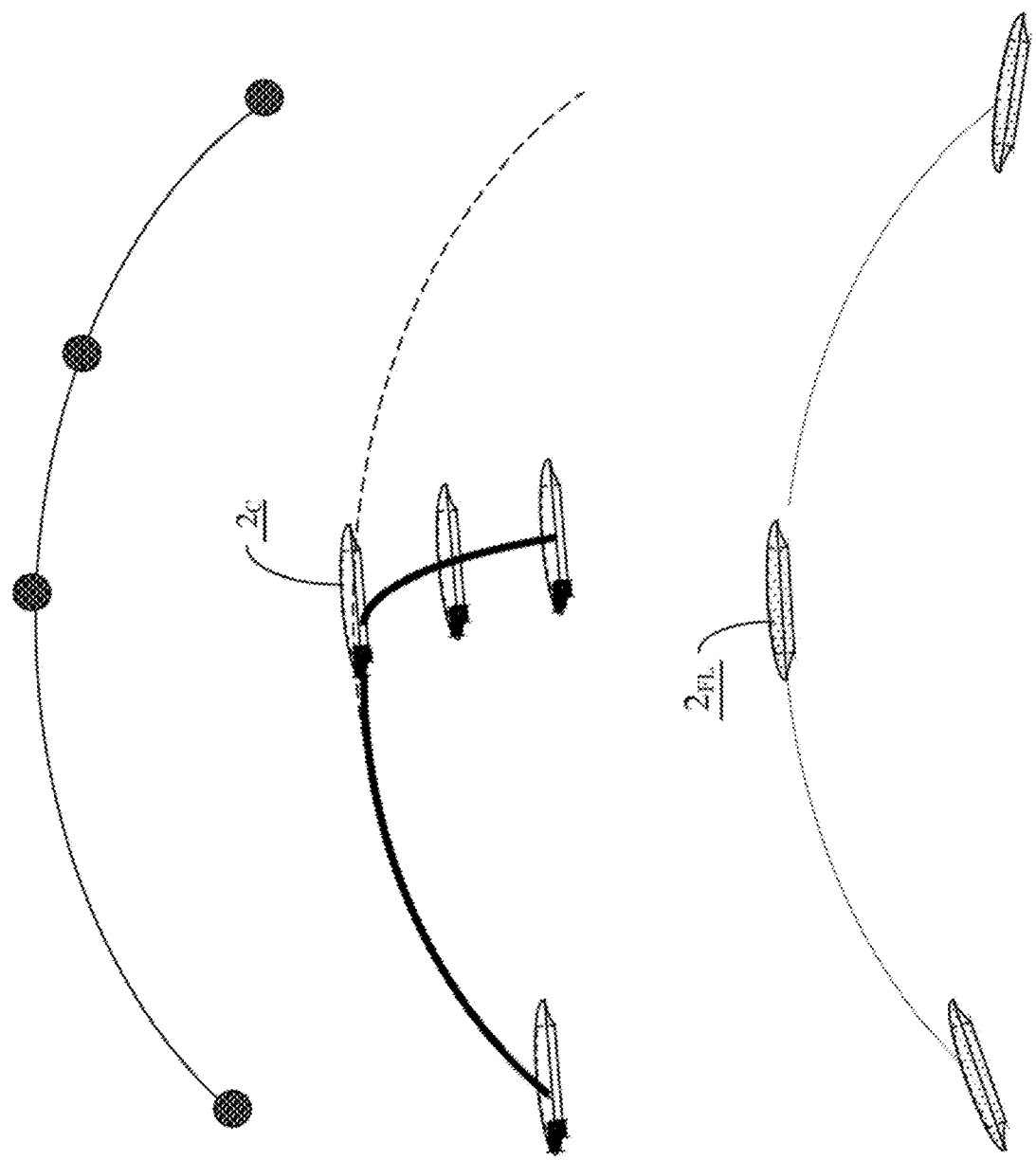

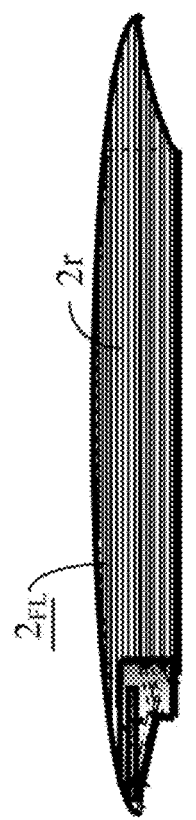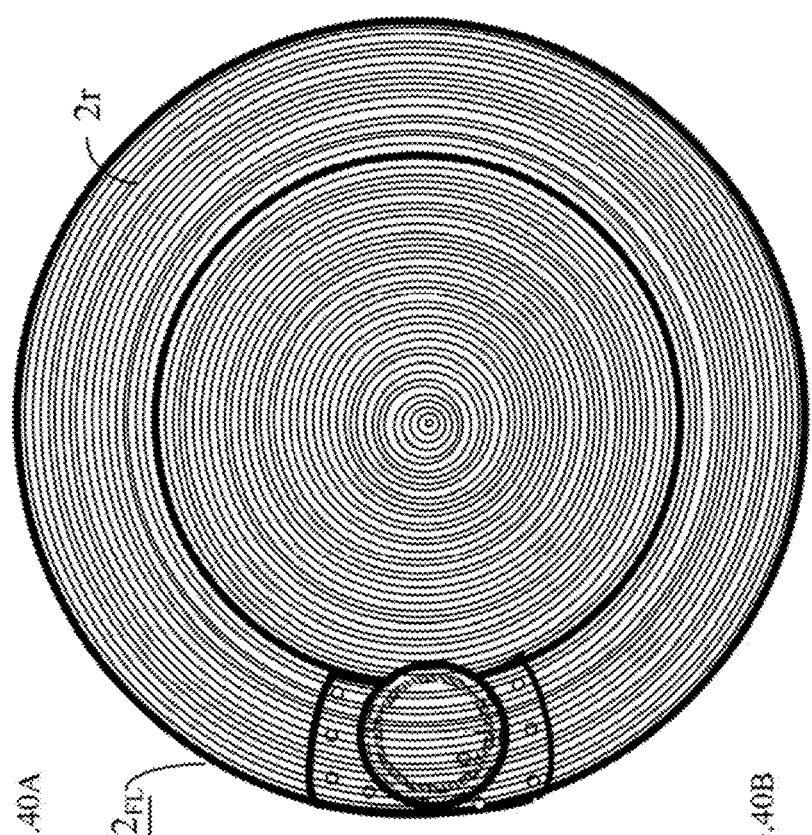
FIG. 40A
FIG. 40B

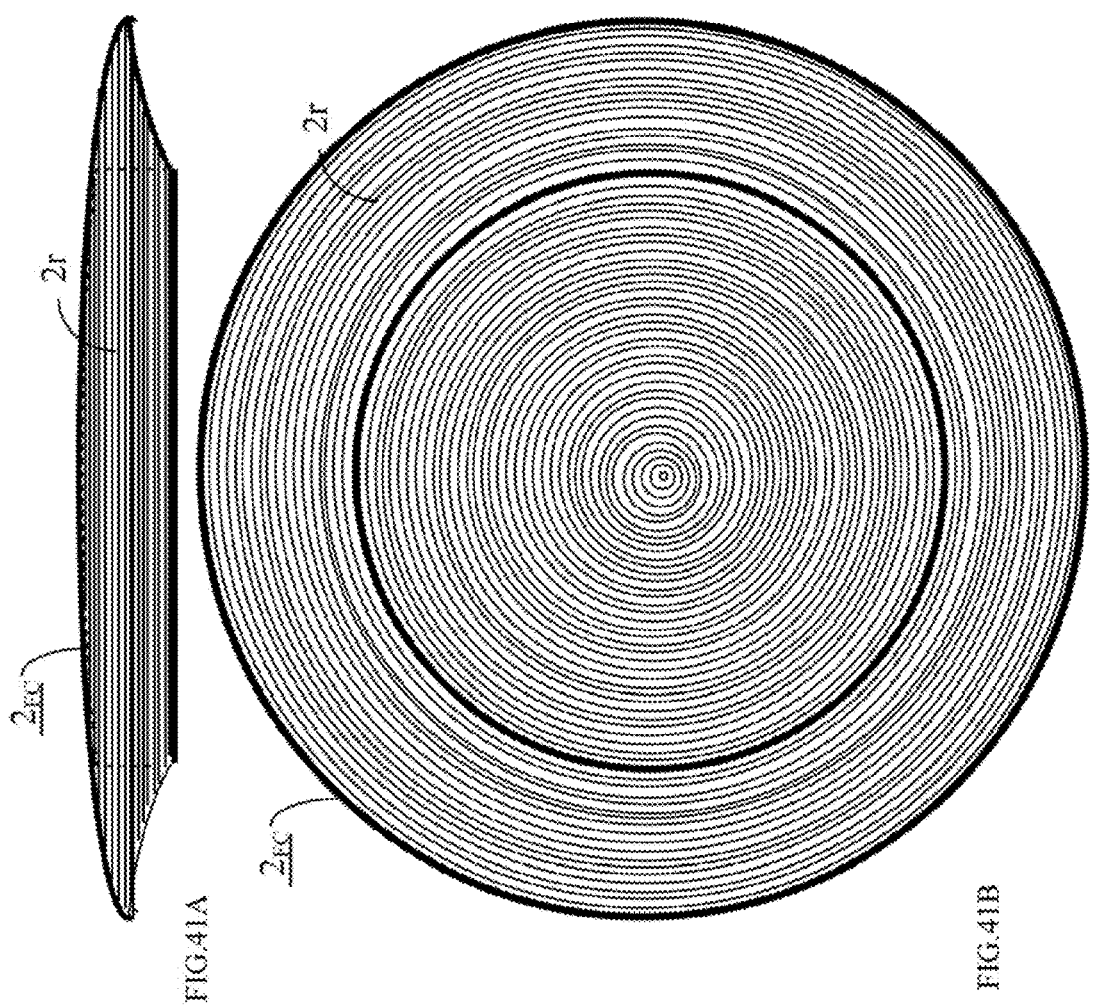

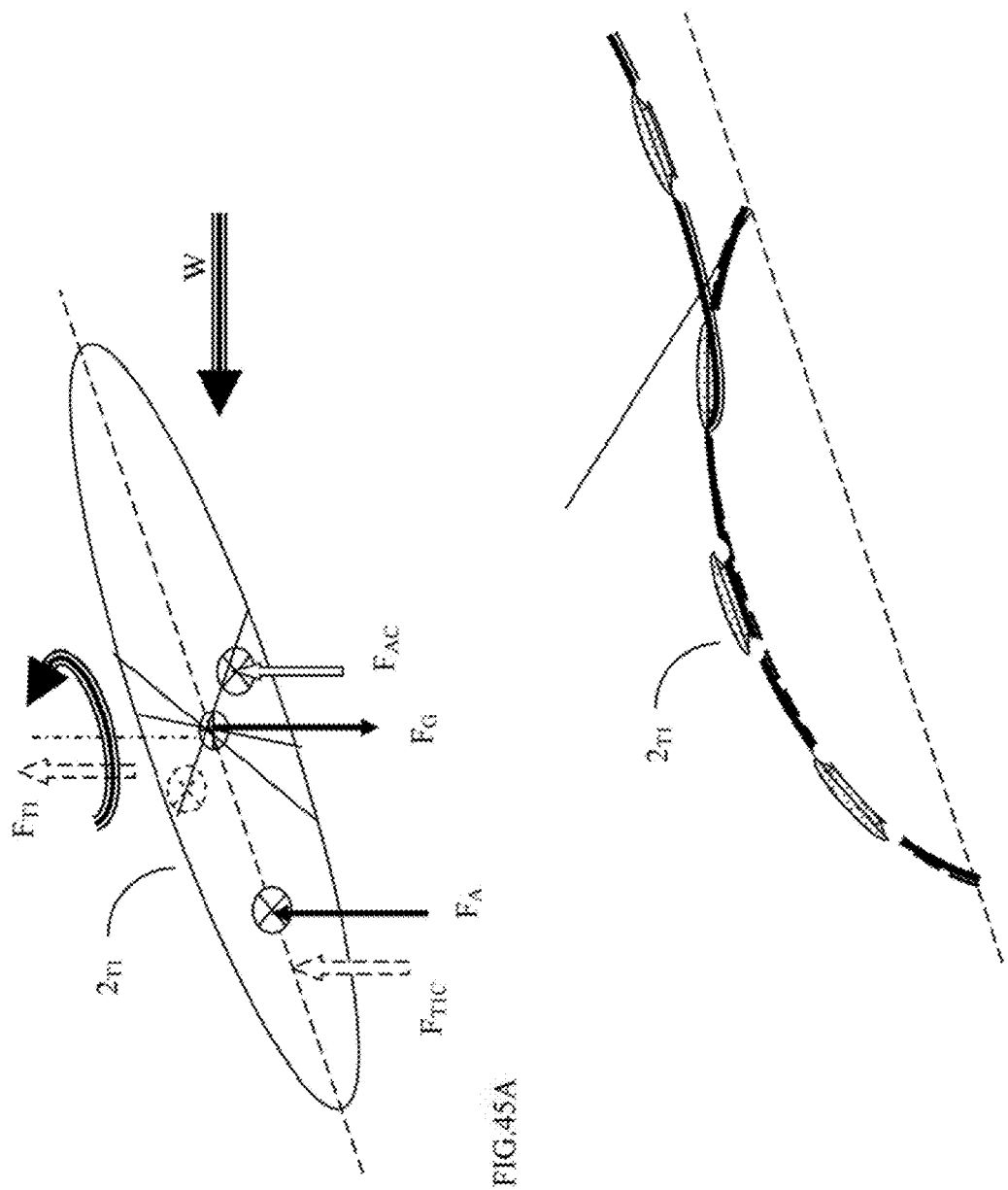

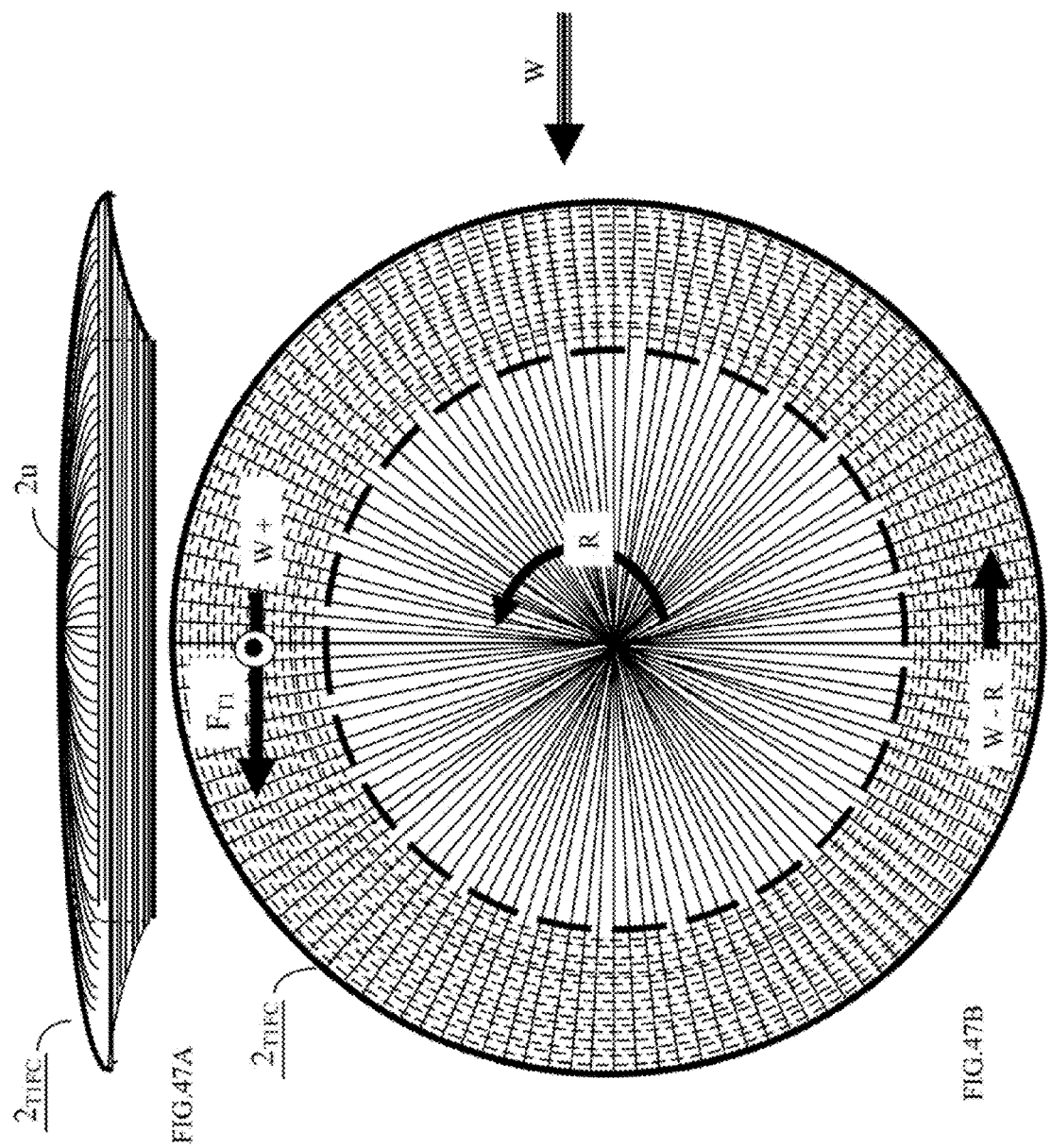

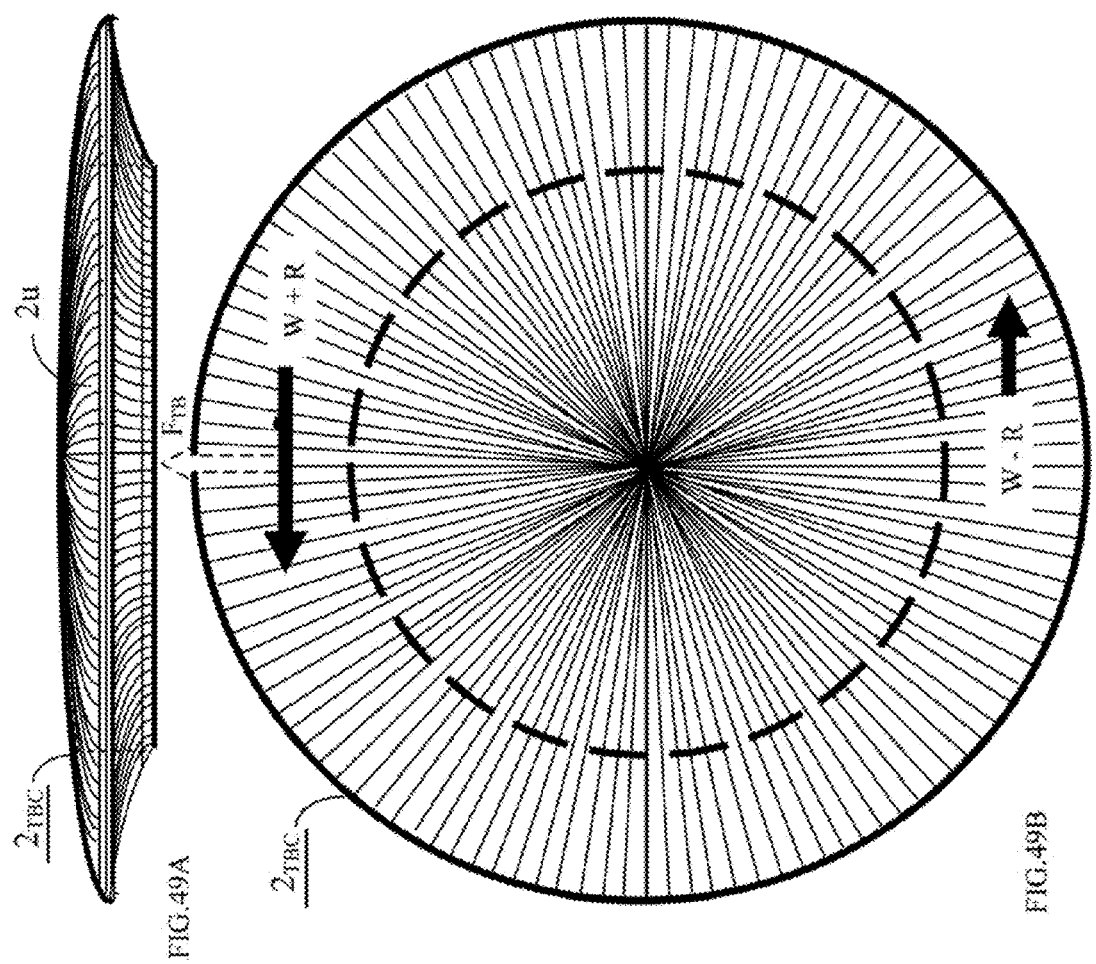

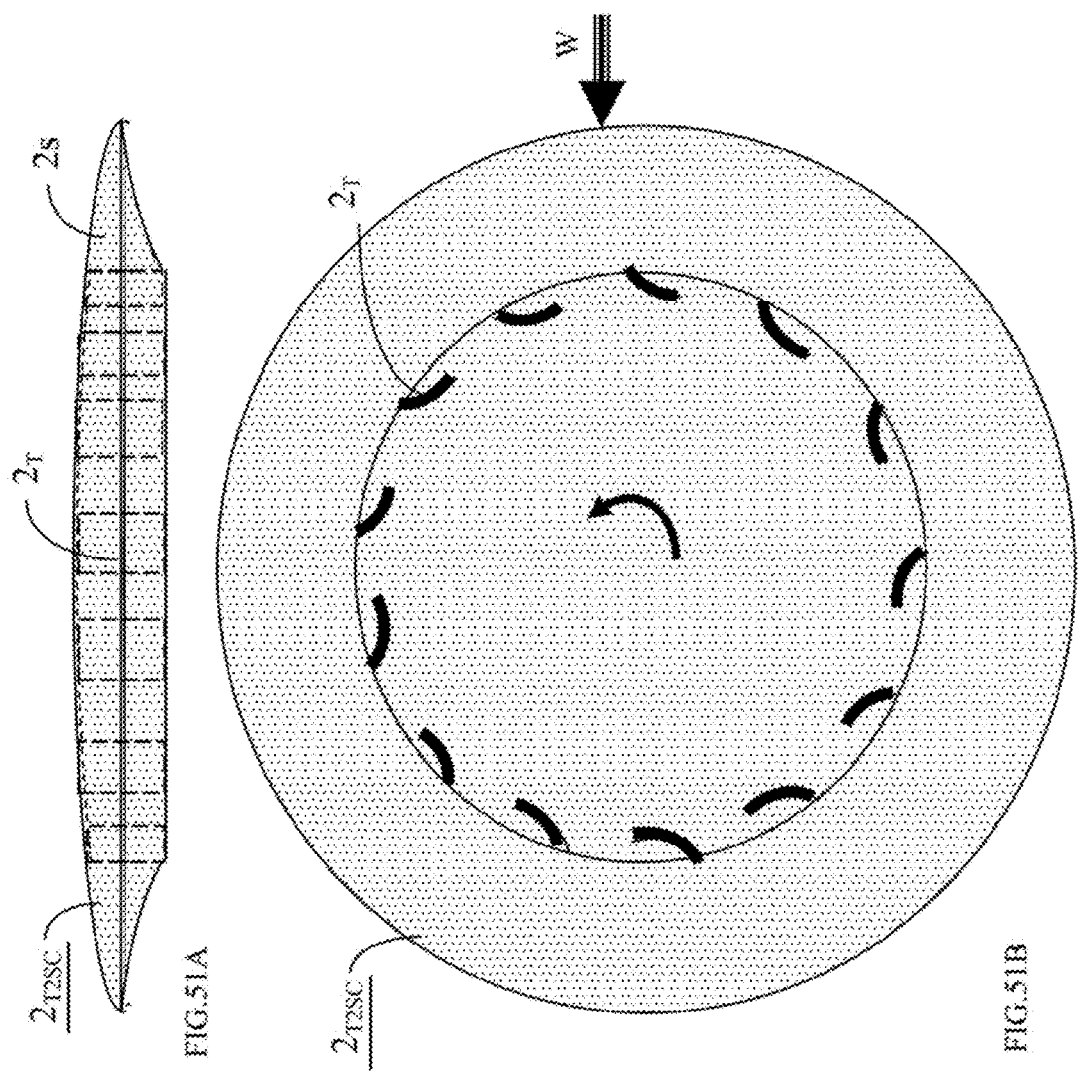

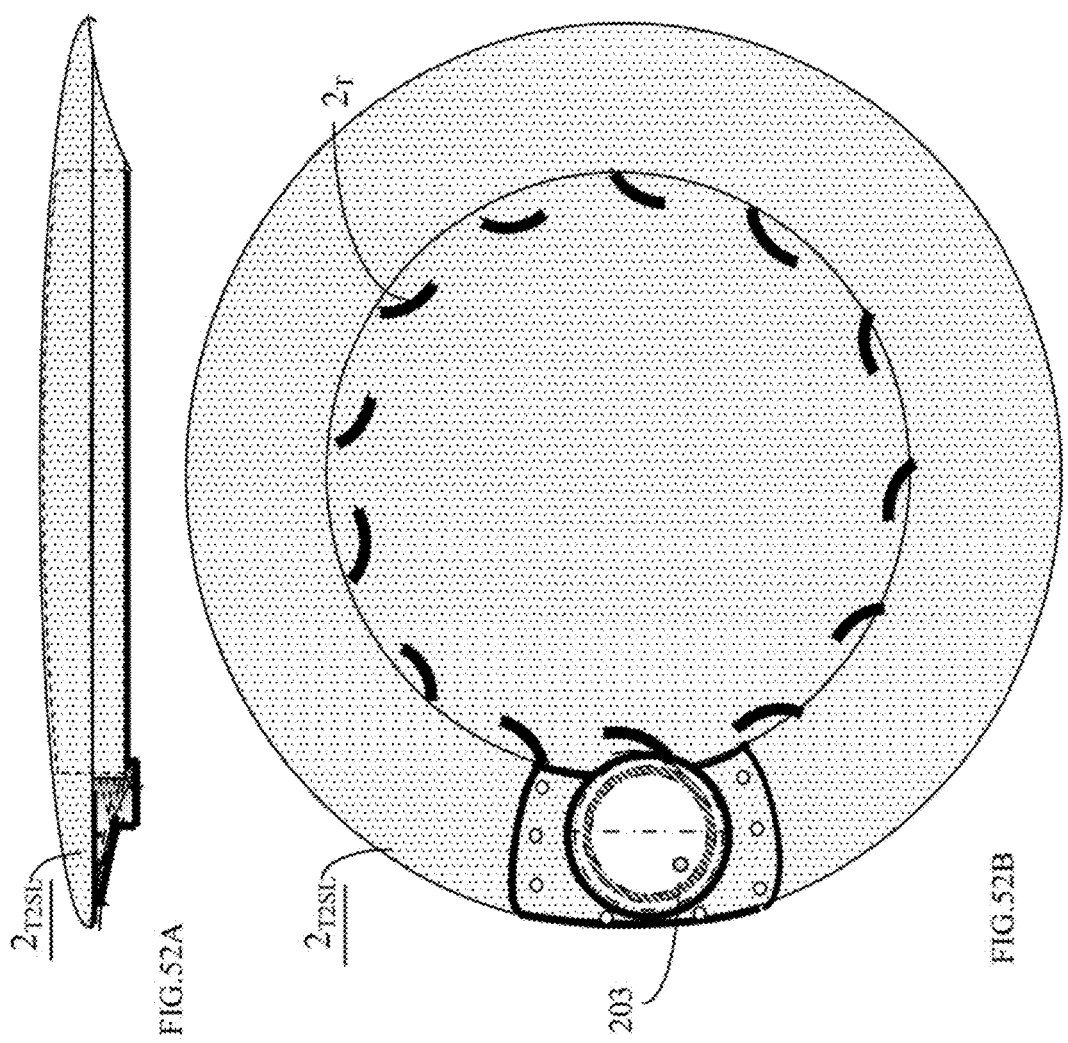

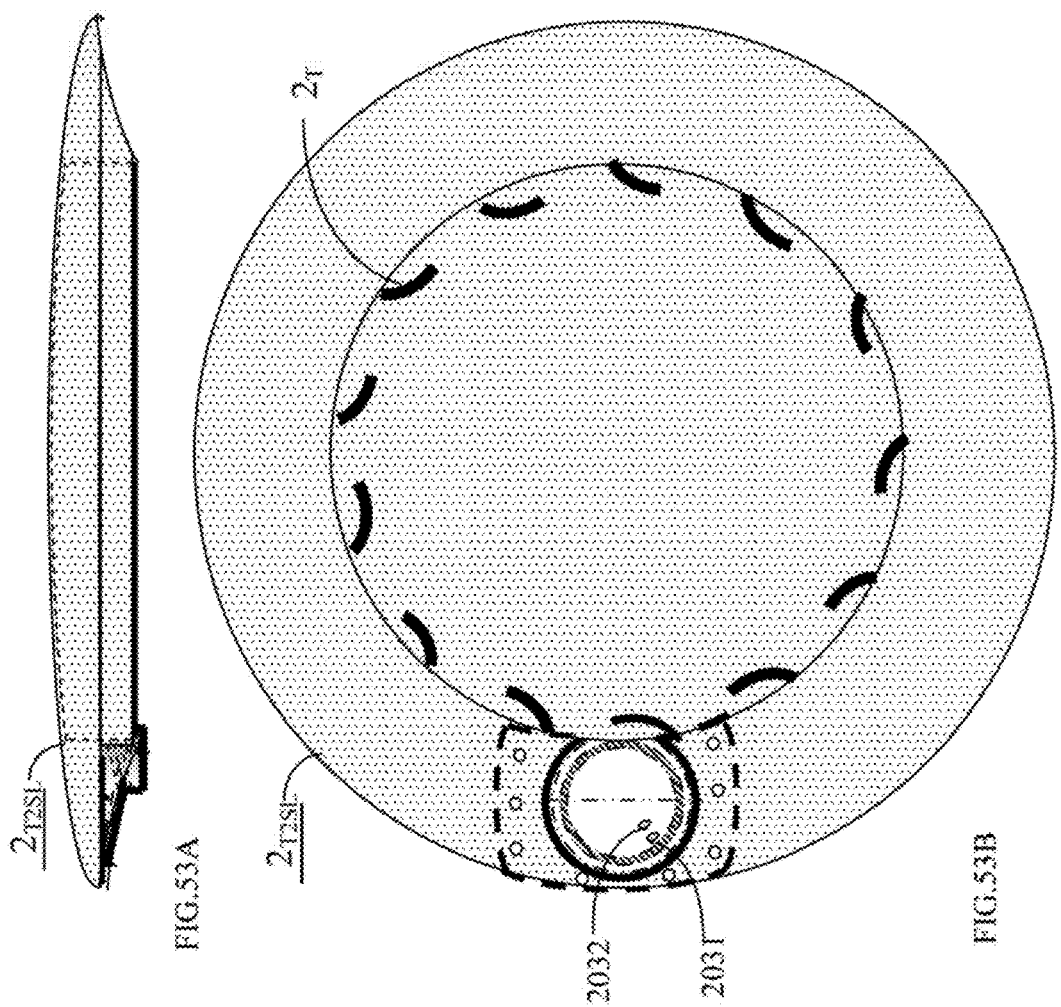

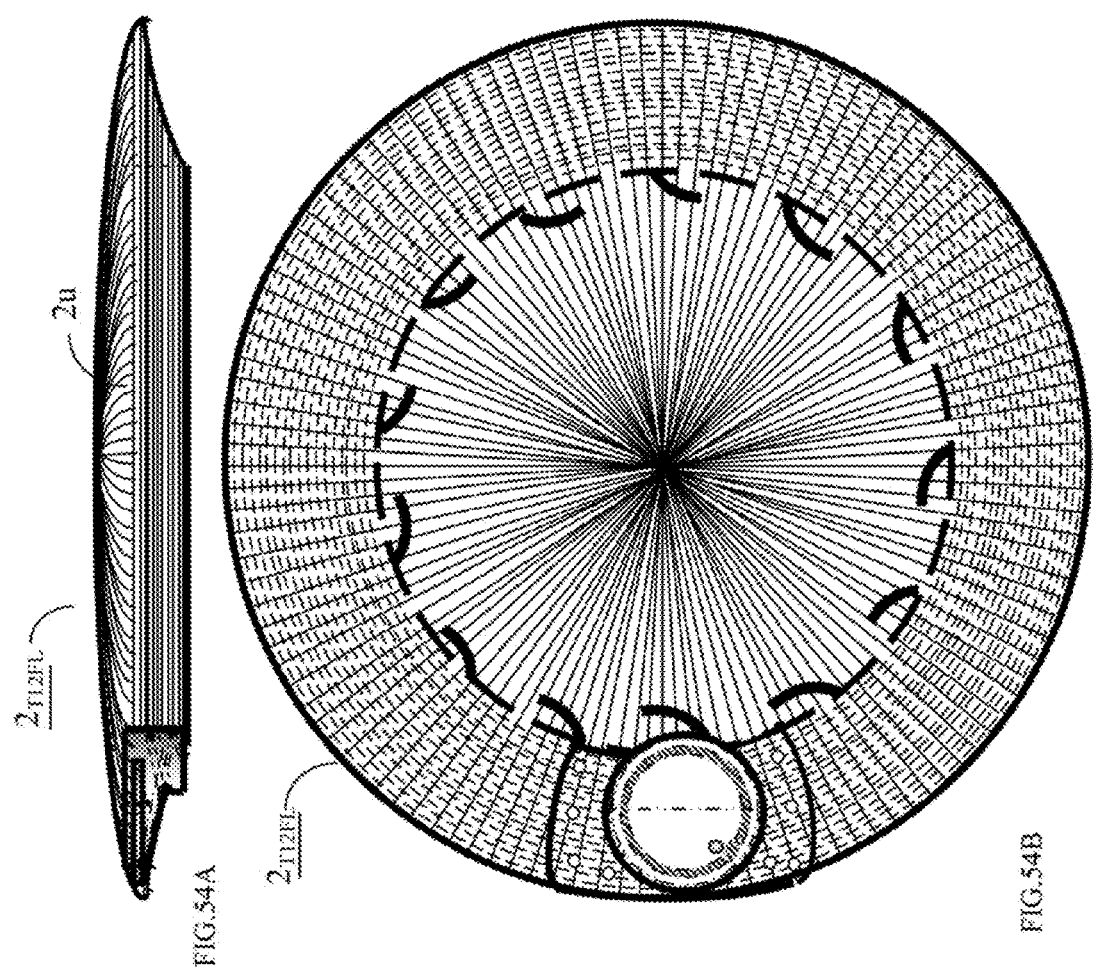

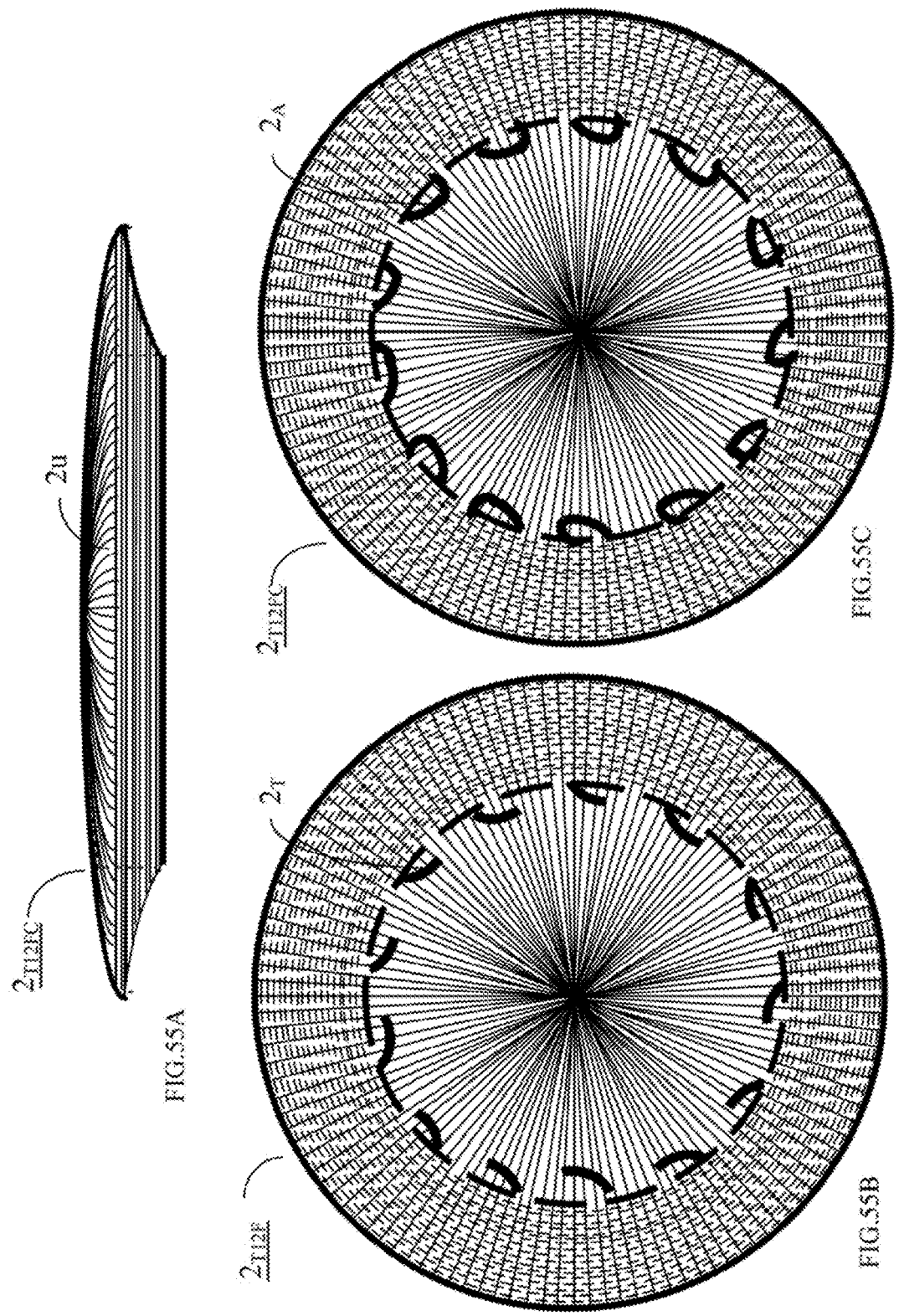

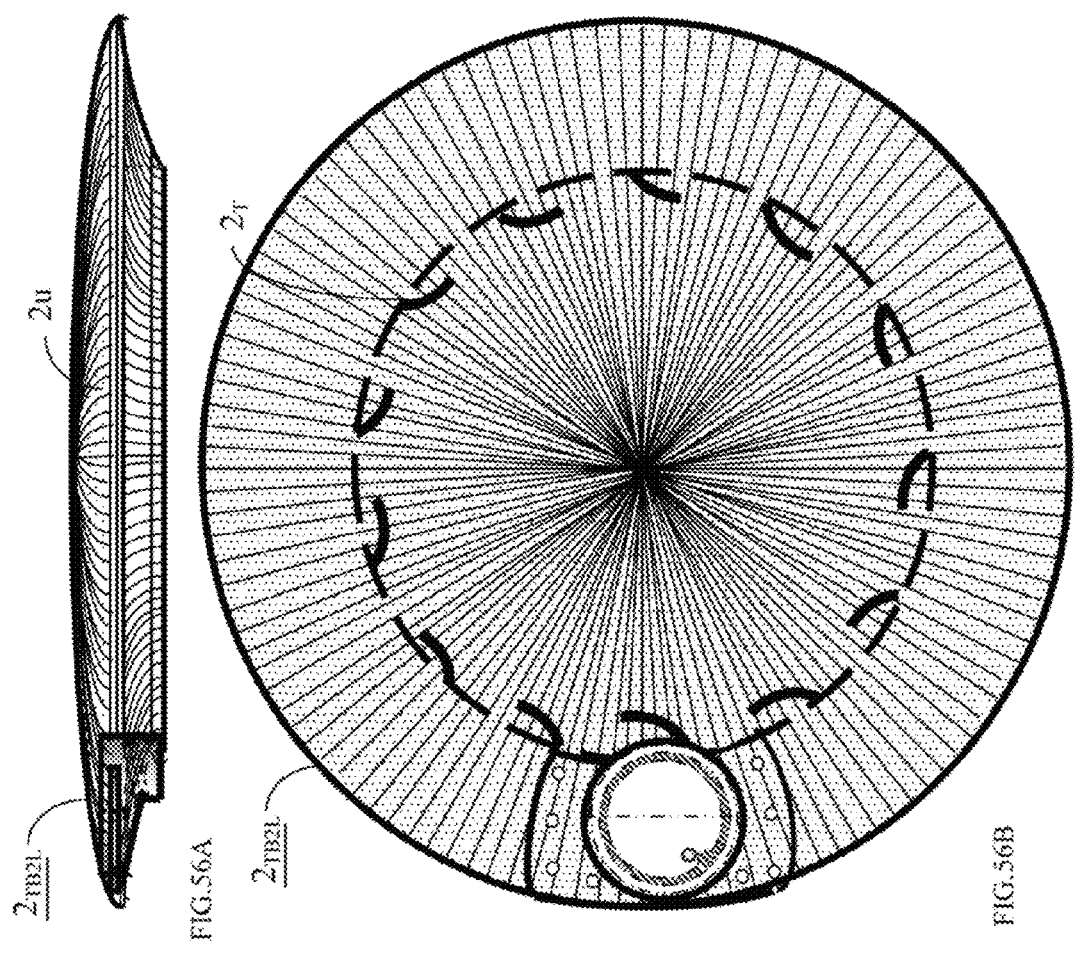

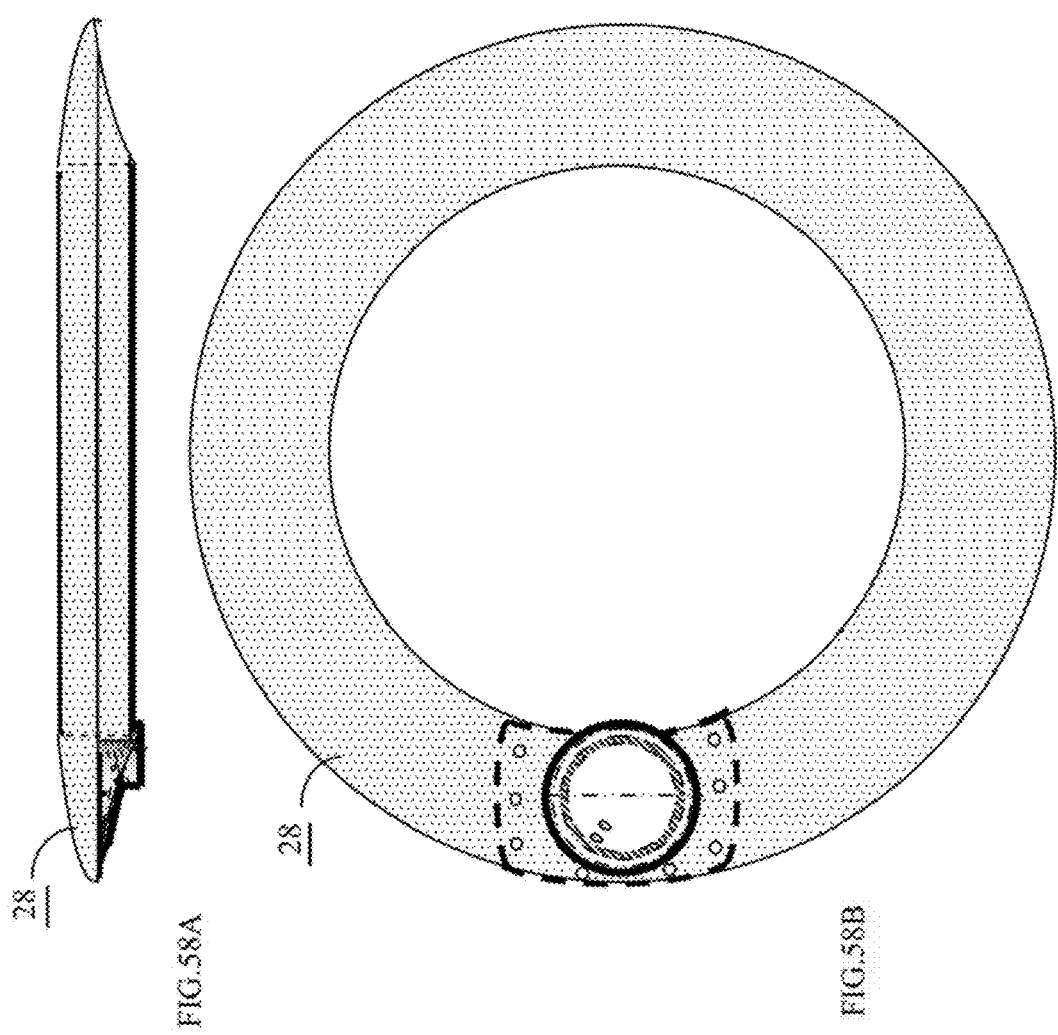

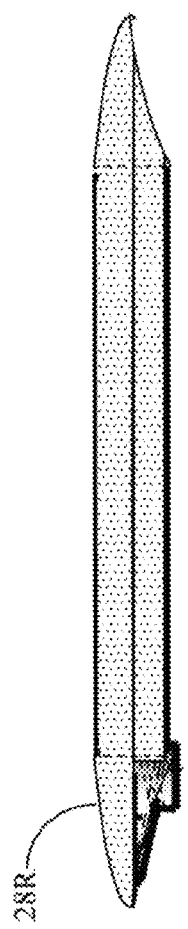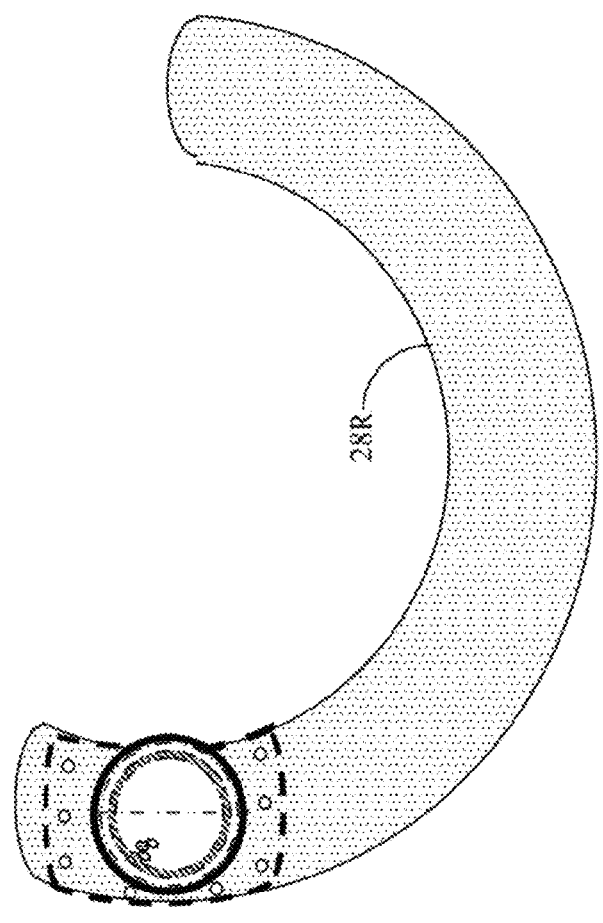

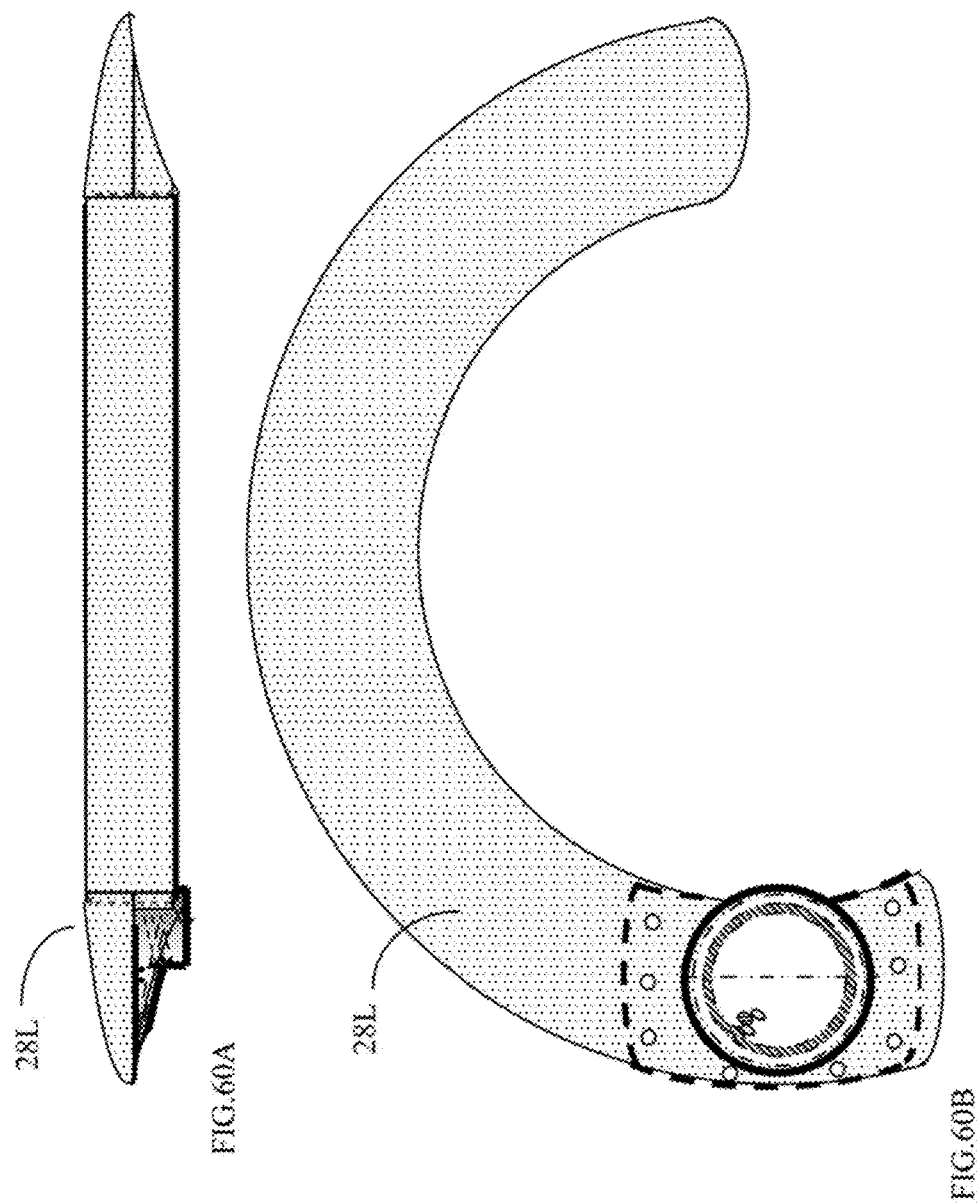

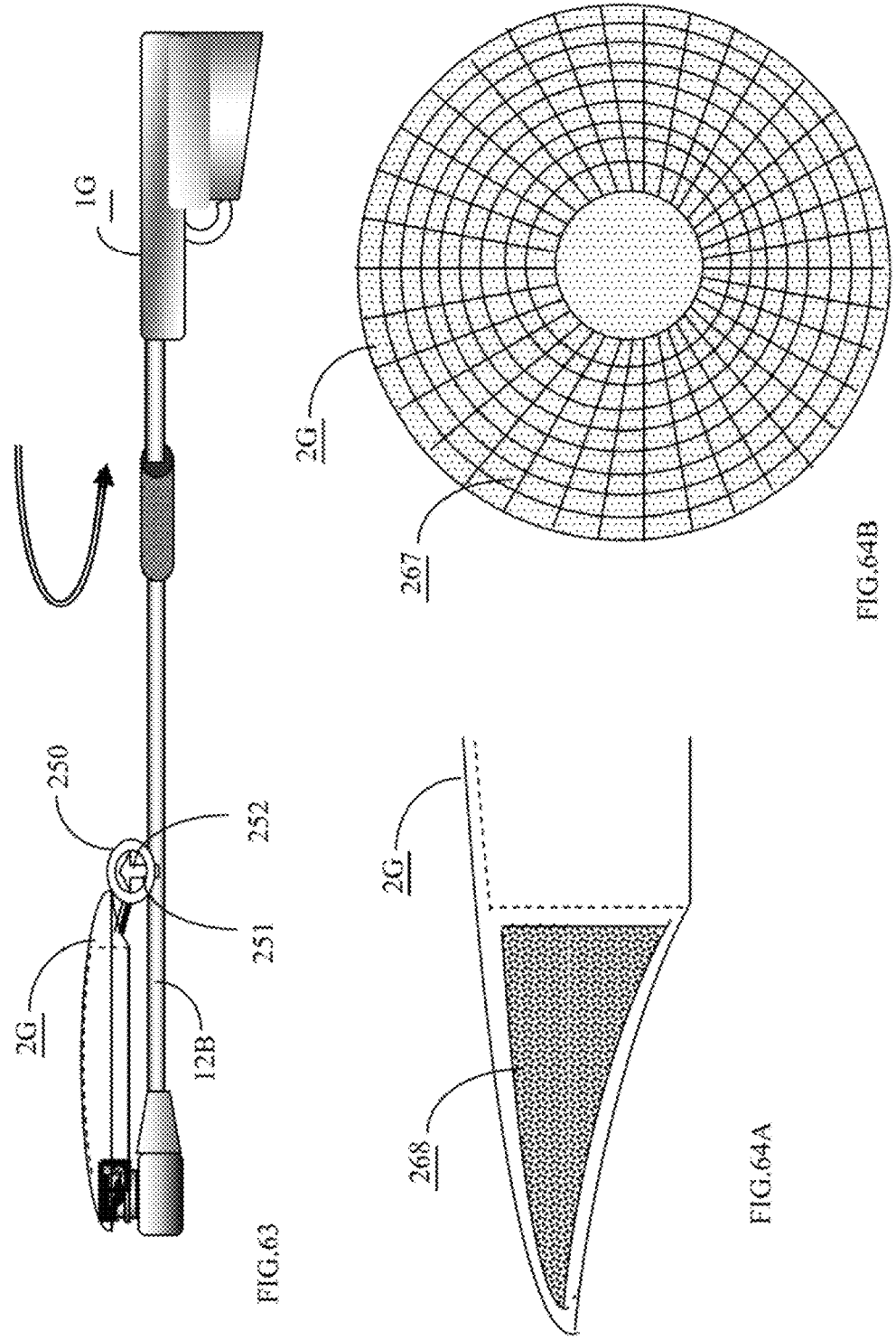

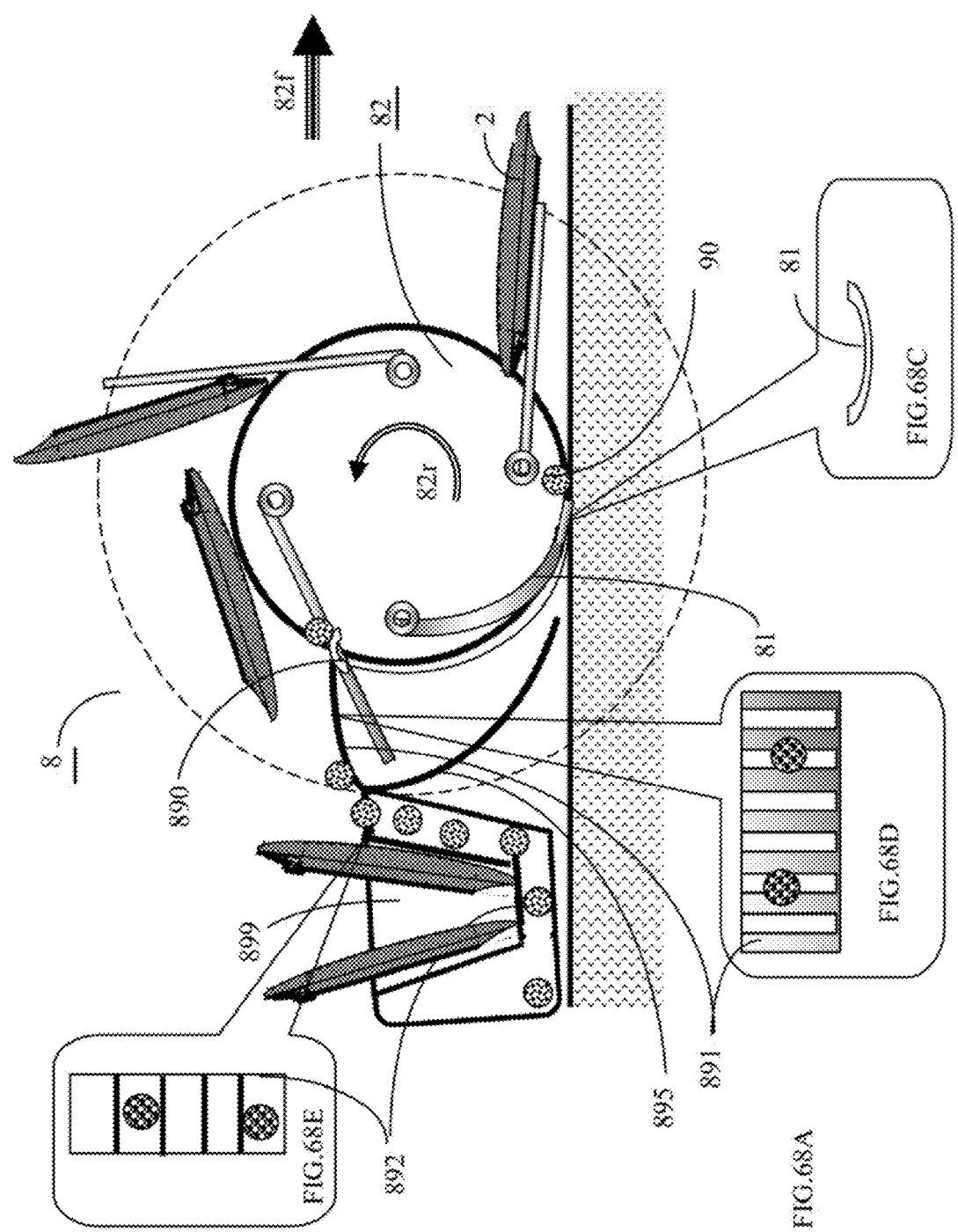

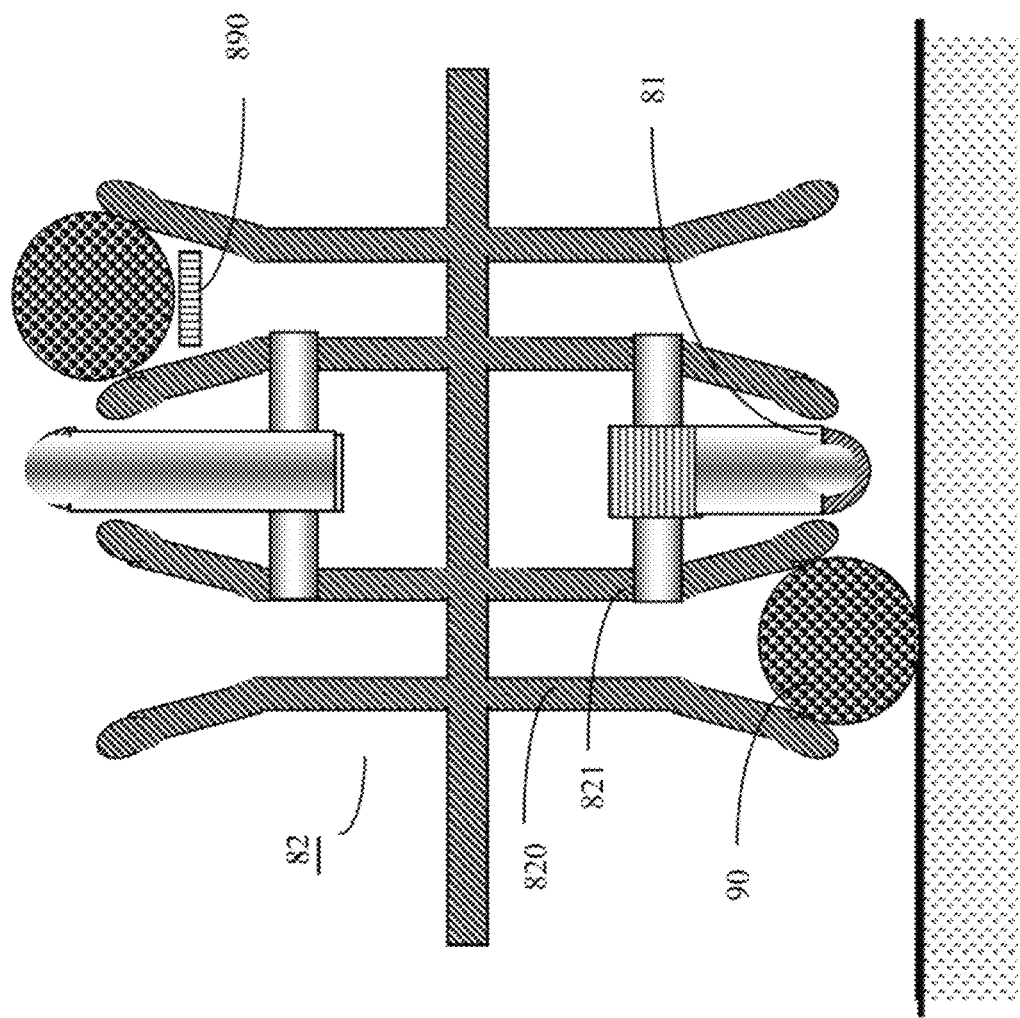

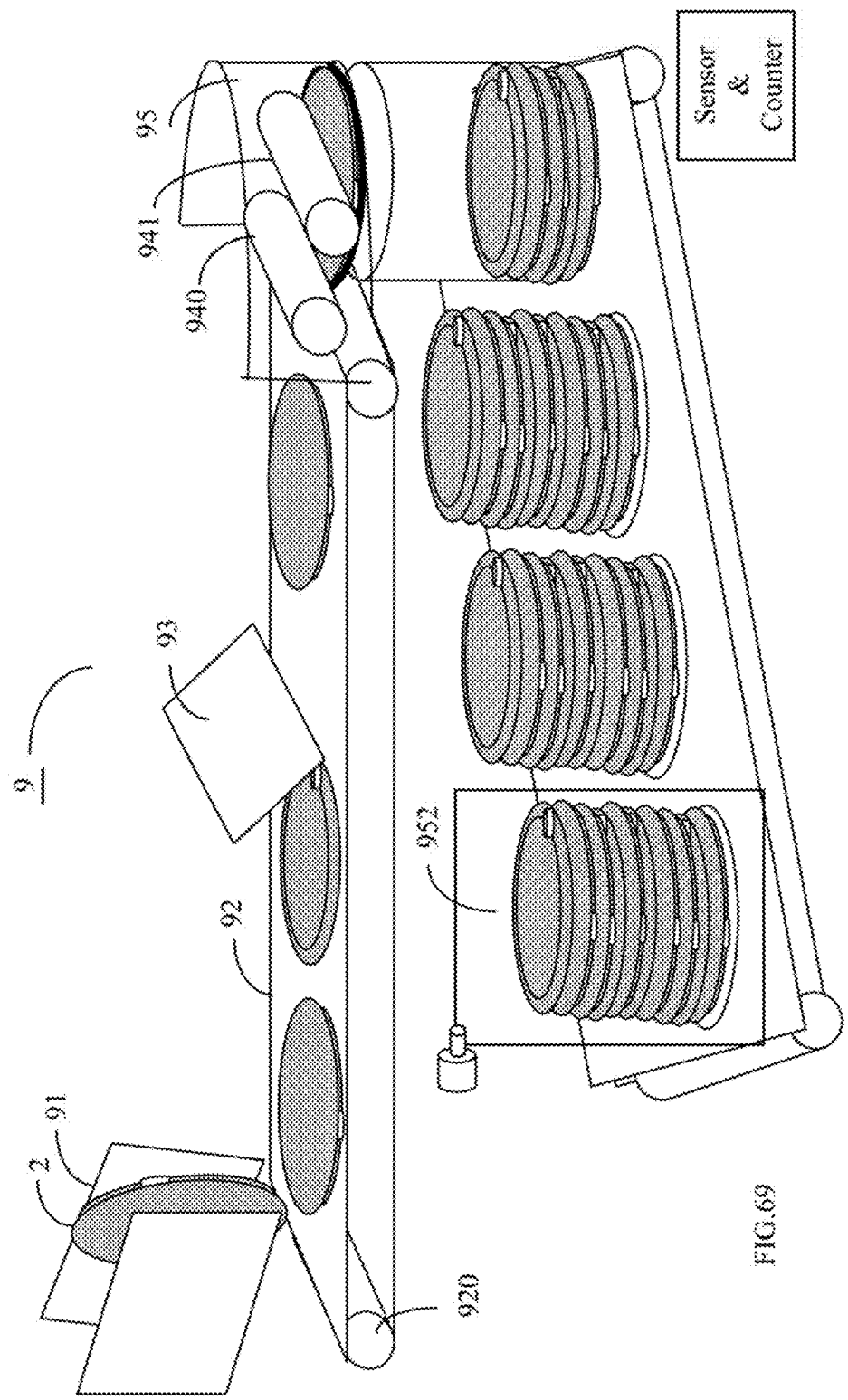

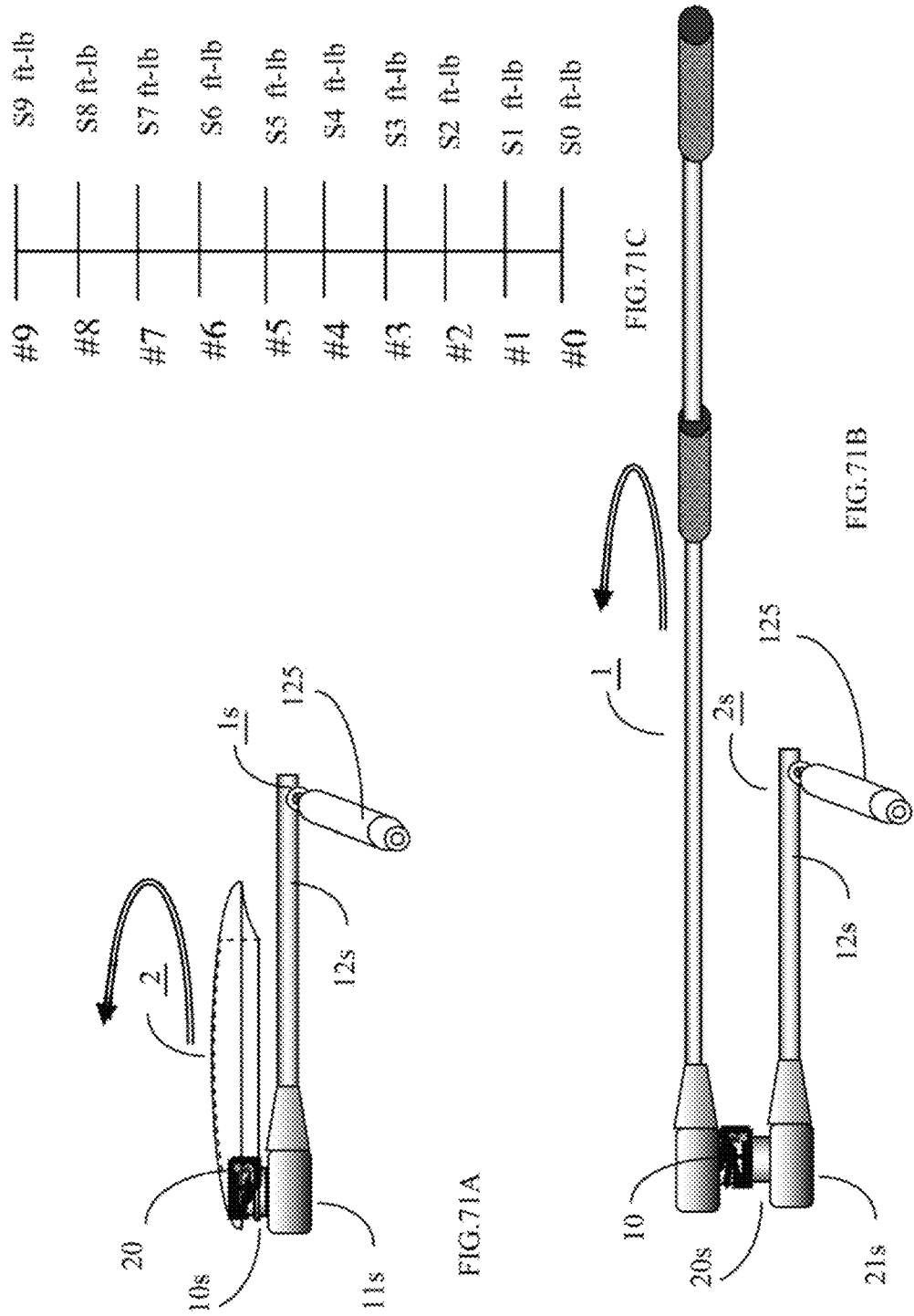

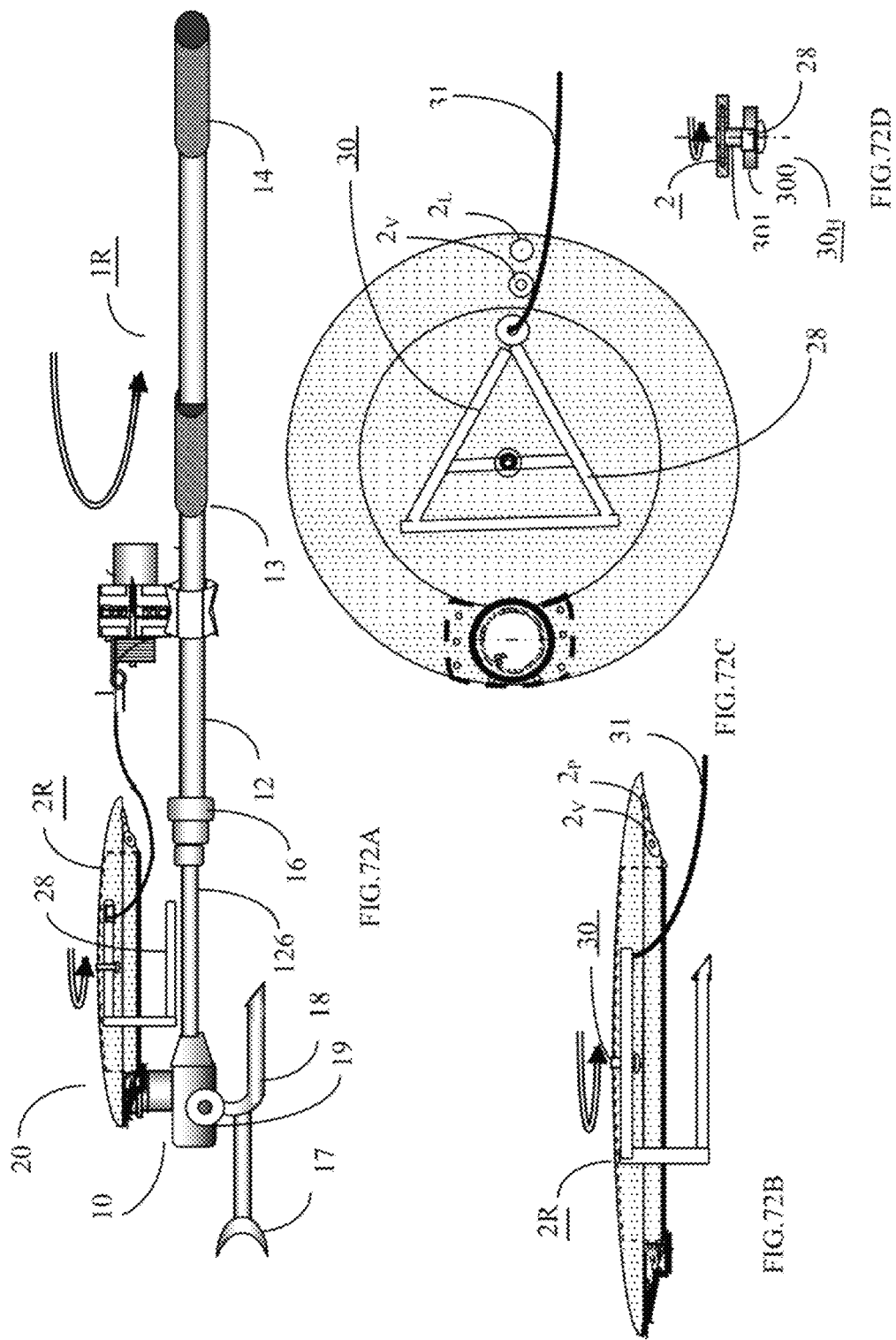

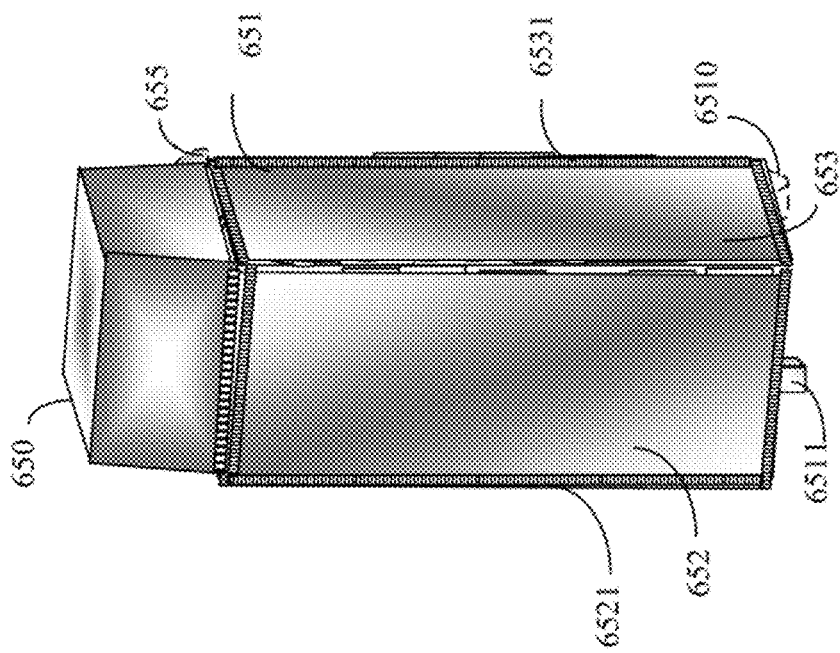
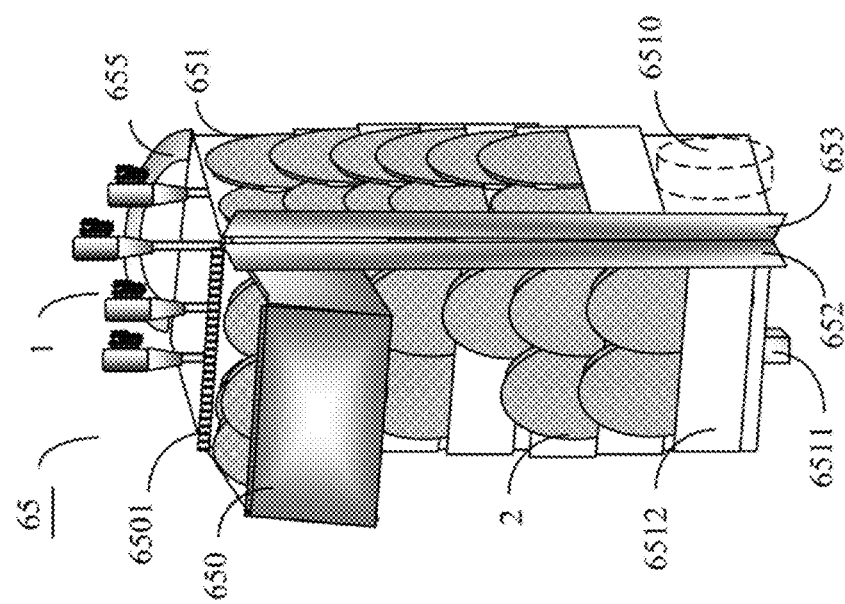
FIG.73A
FIG.73B

DISCLUB GOLF AND PHONEFLY: XPHONE WITH SFDPCC AND DUAL-PHONE-WATCH PAIR SMART FLYING DISC PHONE FOR CLOUD COMPUTATION

RELATED APPLICATIONS

This is a Continuation in Part application claims priority of patent applications of U.S. patent application Ser. No. 13/918,989 filed Jun. 16, 2013, U.S. patent application Ser. No. 12/422,719 filed Apr. 13, 2009; U.S. patent application Ser. No. 12/317,973, filed Dec. 31, 2008, now U.S. Pat. No. 8,089,324 issued on Jan. 3, 2012; U.S. patent application Ser. No. 12/291,984, filed Nov. 12, 2008; U.S. patent application Ser. No, 12/291,618, filed Nov. 12, 2008, now U.S. Pat. No. 7,876,188 issued on Jan. 25, 2011; U.S. patent application Ser. No. 12/288,770, filed Oct. 23, 2008, now U.S. Pat. No. 7,663,349 issued on Feb. 16, 2010; U.S. patent application Ser. No. 12/229,412, filed Aug. 23, 2008, now U.S. Pat. No. 8,089,323 issued on Jan. 3, 2012; U.S. patent application Ser. No. 12/157,785, filed Jun. 14, 2008, now U.S. Pat. No. 7,857,718 issued on Dec. 28, 2010; U.S. patent application Ser. No. 12/074,143, filed Feb. 29, 2008, now U.S. Pat. No. 7,794,341 issued on Sep. 14, 2010; U.S. patent application Ser. No. 11/210,306, filed Aug. 24, 2005, now U.S. Pat. No. 7,422,531 issued on Sep. 9, 2008; U.S. patent application Ser. No. 10/842,739, filed May 10, 2004, now U.S. Pat. No. 7,101,293 issued on Sep. 5, 2006; U.S. patent application Ser. No. 09/127,255, Jul. 31, 1998, now U.S. Pat. No. 6,193,620 issued on Feb. 27, 2001; U.S. patent application Ser. No. 12/082,601, filed Apr. 12, 2008; U.S. patent application Ser. No. 12/079,179, filed Mar. 25, 2008, now U.S. Pat. No. 8,089,353 issued on Jan. 3, 2012; U.S. patent application Ser. No. 11/593,271, filed Nov. 6, 2006, now U.S. Pat. No. 7,511,589; U.S. patent application Ser. No. 11/500,125, filed Aug. 5 2006, now U.S. Pat. No. 7,525,392 issued on Apr. 28, 2009; U.S. patent application Ser. No. 892,358, filed Jul. 14, 1997, now U.S. Pat. No. 5,850,093; U.S. patent application Ser. No. 854,800, filed Mar. 23, 1992, now U.S. Pat. No. 5,280,200; U.S. patent application Ser. No. 81,074, filed Jun. 22, 1993, now U.S. Pat. No. 5,793,125; U.S. patent application Ser. No. 577,792 filed Sep. 5, 1990, now U.S. Pat. No. 5,198,691; U.S. patent application Ser. No. 577,791, filed Sep. 5, 1990, now U.S. Pat. No. 5,111,076; which herein incorporated by reference in its entirety.

FIELD OF THE INVENTION

The phone can fly.
Let the bullet fly for a while, Let the phone fly.
Let the Butterfly free, Butterfly.
Let the Phone of DP fly, Phonefly.

From mobile phone to flying phone, it creates another new dimension of applications for the mobile phone. We bridge the virtual world and the real word with the combination of the innovations of disclub golf, dual-Phone-Watch pair, the mobile surveillance, BT earphone, the monitor and game controller, etc. to be the Phonefly xPhone. The phone can fly. The DP pair of Dual-Phone has the symbol of "Dragon & Phoenix" which comes from the Poem of Tang Dynasty. The poem has two statements as follows. The watch/monitor has no wings to fly. However, there is WiFi connection between the Phone and Dragon. The standing people holding watch/monitor is Dragon. The flying Phone is Phoenix. Suddenly, there are a lot of new applications and functions for the next generation mobile phone to be the flying phone, xPhone. The xPhone applications have the smart fishing of golfish, the silent attack of smart battlefield and the smart lifeguard buoyancy, etc. It changes the people-people remote interaction mode from the virtual world to be the real world. Furthermore, the dual-Phone-Watch-Pair develops the merge screen technologies. Instead of single-large screen of mobile phone, the flying phone develops the multiple screens technology. Either the screens are separated screens or merged together to be one large screen. The multiple-screens technologies have several different operational modes. It not only has better carrying capabilities, larger merged screen, dual-interactive-screen mode, etc, but also has the new functions of remote access and remote control, etc. We completely reverses the design ideology, design trend and development direction of the smart mobile phone which has been set by the iPhone of Apple Company.

The conventional hand-throwing disc is disc golf. The disclub golf is to launch the disc to fly in the sky with the swiveling of disclub. There are special adaptors on the disc and disclub head. The present invention relates to the Smart Flying Disc Phone for Cloud Computation (SFDPCC) system of the club-swing disclub golf. The mobile Smart Flying Disc Phone for Cloud Computation (SFDPCC) can be installed any place with the assistance of the dynamic flying capability of the disc and disclub golf.

The dual-Phone-Watch-pair of the SFDPCC is the flying phone, Phonefly. Since the disc having the small objects to be carried to fly to the specified far distance, there are many potential applications. Such small objects are the cellular phone or grenade, etc. Such specified far distance is several hundred yards. Even without the disclub, the phone still can fly with the hand-throwing disc. Let the phone to fly with the hand-throwing conventional disc. With the disclub, the throwing distance can increase x4 times to x5 times. The combination of the golf technology and the mobile phone technology to create the next generation cellular phone, xPhone has many fantastic applications of smart golfishing, silent attack and life saving, etc. We can stand on the bank to scan the underwater activities to have the smart fishing, etc. It is extremely important innovation for the lifeguard to save the drown people in the surge of water waves. Definitely, the young kids will like the flying version of the next generation phone, xPhone.

The Disclub Golf is the Club-Swiveling Disc Golf. Having made the technology breakthrough, the flying distance and performance of the Club-Swiveling Disc Golf with disclub are comparable with the Young Sportsman Hand-throwing Disc Golf and even better. With the disclub, the throwing distance can increase x4 times to x5 times. The old retired men, children, and women now all can play the Club-Swiveling Disc Golf as good as the young sportsman Hand-throwing Disc Golf does.

Since the disc can be thrown far away, it is difficult to locate the flat disc in the bushes, etc. Therefore, it has the necessity for the combination of the communication with disclub golf. There are versatile ways to implement the communication of disc, such as buzzer, sound, light, LED, RFID, smart Phone, and GPS, etc. The dual-Phone-Watch -pair is one way to implementation the communication in the disclub golf. However, the dual-Phone-Watch-pair can provide the platform to have all the buzzer, sound, light, LED, RFID and GPS, etc. selectively implemented in the communication system.

Being similar to the eco-system of the club-swing ball golf, the eco-system of the long-drive club-swing disclub golf includes the long-drive swing disclub, long-distance flying disc, inverted-umbrella flagpole, the disc vending machine, and the disc harvesting machine, etc. With the collapsible inverted-umbrella basket mounted on the flagpole, the disclub golf can share the same course with the ball golf. The club-swiveling disclub golf is an art of golf. Being similar to golf and disc golf there will be a set of Disclubs and a set of discs. For the different flying distance, it needs to use the optimum combination of the different discs and different disclubs.

The eco-system of the club-swing sporting style and the facilities of the Disc and Disclub are fully compatible with the eco-system of the Golf Courses of ball golf. Therefore, the Golf Courses will accept the Club-Swiveling Disclub Golf to play in the golf Courses. Now, the Club-Swiveling Disclub Golf becomes the "family style entertainment on Golf Course." The grand parent can play with son, grandson, and granddaughter on the same golf course all together. It is family gathering with disclub golf sport.

Furthermore, combining the dual-Phone-Watch pair with the disclub golf Smart Flying Disc (SFD) or Smart Flying Disc Phone (SFDP), has the special applications in the battlefield. It serves as disc grenade and flying scout in the silent attack. Launching the disc to fly, it even flies further than the bullet of WK-47 rifle. First throws the disc scout to scan the battlefield silently. As the enemy is detected by the flying disc scout, the infantry throws the disc grenade with disclub. In the silent attack, there is no fire and no sound at all. The infantry can attack the enemy without the exposure of his own position by the firing sound and firing light of the conventional gun grenade. There are so many potential military applications of the SFD and SFDP with disclub golf. Therefore, the civilian practice the disclub golf is much more making sense than the civilian practice of ball golf. We have embedded the military training of silent attack of the infantry in the civilian training of the disclub golf.

Disclub Golf is the Club-Swiveling-Disc Golf. After 30 years research and development with the millions dollars personal investment in the Disc & Disclub of Club-Swiveling Disclub Golf finally, the Disc and Disclub are ready for the popular enjoy and entertainment. Having made the technology breakthrough with cam lock, the flying distance and performance of the Club-Swiveling Disclub Golf with disclub are comparable with the Hand-throwing Disc Golf and even better. It is compatible with ball golf in the golf course. In the near future, we definitely will put more investments on this innovation and production making them to be available to the public.

For the safety purposes, the PGA (Professional Golf Association) put the limit of the flying distance; the PDGA (Professional Disc Golf Association) put the limit of the weight of the Disc. However, these two different limits are equivalent. Assuming the form and shape factors to be the same of the different weights, the momentum determines the flying distance. The more weight the disc or ball is; the farther the disc or ball flies. It is dangerous to exceed these limits. Therefore, for the good design of club or disclub, the flying distance is function of the weight of the ball or disc. The Disclub disc will follow the limits set by the PGA and PDGA to have the safety for the disclub sport.

Many thanks to Mrs. Shun-Yu Nieh and Jwu-Ing Tarng, the King of Golf is back. It is the disclub golf saving both the golf and the golf course. Even for the previous old version of disclub golf, there are already many people expressing to buy the disclub golf. However, we hold it until we have made the technology breakthrough of cam lock as disclosed in this patent application. For the popular convenience, the people who are interested to buy the cutting-edge dual phone DP author Disc and Disclub of disclub golf, please contact Dr. Min Ming Tang as follows. TANG SYSTEM, 4225 Borina Drive, San Jose, Calif. 95129, Tel: (408)-446-3163; (408)-504-7530(Cellular), Email: tangsystem@gmail.com; Website: http://TangSystem.com

BACKGROUND FIELD OF INVENTION

The phone evolutes front the big junk desk phone to the thin and large flat cellular phone. It combines the video camera, computation, and phone communication capability. With the basic functions of the video camera and phone communication, we can extend the smart phone sPhone to be xPhone with the SFDPCC: Smart Flying Disc Phone for Cloud Computation system with the club-swing disclub golf.

Furthermore, the Dual-Phone-Watch-Pair integrates the pairing mechanisms of the mobile surveillance, interactive game controller, Blue-Tooth Ear Phone, Screen-Keyboard pair, etc which have the two portions of communication facilities to be unified platform. The superior Dual-Phone-Watch-Pair is integrated with the superior ultra-long-drive delivery capabilities of disclub golf to be the next generation mobile Phone standard, Phonefly of xPhone.

Comparing the disclub golf with the ball golf, the disclub golf does not have the huge impact force as the golf ball does. The golf ball is too small that it has very small lift force. Furthermore, as the golf ball is hit to fly, it has very large impact force that the ball is under serious deformation. Therefore, the golf ball has no practical application.

On the contrary, the disclub disc golf has the practical application to carry the phone to the remote site. The disc flies horizontally having large lilt force that it can carry objects. Combing the disclub golf remote site reaching capability and the dual-Phone-Watch-Pair remote site communication and control capabilities, the new generation xPhone is generated.

The disclub golf, club-swing-disc golf, is to throw the disc with club swing. The club-swing disclub golf is the conjugate golf sport of the club-swing ball golf. The club-swing disclub golf can co-exist with the club-swing ball golf in the golf course.

Furthermore, the inventors of the club-swiveling disclub golf have to make another breakthrough of cam lock to increase the throwing distance with the club-swiveling disc golf. Taking more than 30 years research and development effort, the club swing disclub golf has the flying disc to carry the thin and light cellular phone to several hundred yards remote place. Now, the inventor has made the technology breakthrough of cam lock in the disc golf technology to increase the throwing distance. The throwing distance of disclub golf is comparable to and even better than the hand-throwing disc golf. This is the fundamental breakthrough of the disc golf technology. The new golf technology has the practical applications in versatile civilian and military fields now. It is time to combine the evolutions of the mobile phone and the disclub golf to have the innovations in the applications of the next generation xPhone, Phonefly technology.

In the civilian application, during the rock fishing, the smart flying disclub fishing of the club-swing disclub golf can carry the fishing lure several hundred yards far away in the strong sea wind. The fishing man is no more need to stand on the edge of the rock. It increases the safety of rockfish. Furthermore, the flying disc of the disclub golf can carry the LED light, etc to lure the fish. The Smart Dual-Phone-Watch Pair can monitor the underwater fishing activities. During the pull of the hooked fish, the disc can help the fishing man to struggle with the hooked fish. This is the smart fishing with golfish of disclub golf.

In the military application, during the silent attack, the Smart Flying Disc Phone for Cloud Computation (SFDP) system can fly over the battlefield silently and transmit the video image and information, etc back to the infantry in real time. According to the video image and information, the infantry can launch the flying disc grenade silently and kills the enemies immediately.

All the above fantastic practical applications are based on the merge of the ultra long drive capability of the club wing disclub golf and the evolution of the smart mobile phone to be the next generation Phonefly xPhone. The long drive capability of the club-swing disclub golf increases the new functional dimension of real-time far-distance remote-operating capability with the smart phone. Since the next generation smart flying Phone xPhone has this new functional dimension of real-time far distance remote-operating capability, the new smart mobile phone system is named as the next generation Phonefly, xPhone.

The xPhone not only has the civilian application but also has the military application. Therefore, as the civilian plays the disclub golf in tin golf course, they are actually practice for the military training. To have the ball golf and disclub golf to play on the smite golf course, we make the unification of the ball golf course and disclub golf course. We just need to make the modification of the "flagpole" to have the additional inverted umbrella basket. Then the ball golf course can play as the disclub golf course.

For the ball golf, the sport venue has the facilities of the ball harvest machine and the ball vending machine. The sport venue of ball golf is dangerous. The golfer is forbidden to take the golf ball back from the sport venue. The sport venue has the harvest machine to collect the golf balls from the field of the sport venue. Then the collected golf balls are dumped into the golf ball vending machine. The golfer pays bill to the vending machine to get the bucket of golf balls to practice.

To have the disc sport venue to share the same sport venue with the ball sport venue, we needs to add the capabilities of the disc harvest machine and the disc vending machine. It had better to have the hybrid ball/disc harvest machine to collect the disc and ball at the same time. Then the ball and disc are automatically separated to feed into the hybrid machine having the ball vending machine and disc vending machine. To save the space, the hybrid ball/disc vending machine is constituted of both ball vending machine and disc vending machine.

BACKGROUND—DESCRIPTION OF PRIOR ART

The ball golf is dead. It is declared by Lisa Gray, the Gray Matters Columnist, Houston Chronicle. http://www.houstonchronicle.com/local/gray-matters/article/Golf-is-dead-5589999.php Right now, the ball golf is dying due to the hand-throwing disc golf. However, the hand-throwing disc golf is just temporary solution in the transitional period. Even it is disc golf killing the ball golf, however, the disclub golf will be the final winner instead of the disc golf.

There are two kinds of club-swinging golf: the ball golf and the disclub golf. The ball golf is dying now. The next generation golf is the disclub golf. It is the only hope to save the Golf Courses and the Golf Industry. Before the disc golf killing the golf, the disclub golf makes the golf technology innovation in emergency and steps in to save the Golf Industry. At the same time, the disclub golf will get rid of the disc golf to save the golf courses. However, the golf industry still needs to transform from the club-ball golf industry to be the disclub-disc golf industry. In other words, even the disclub golf will get rid of disc golf, however, the ball golf is already dead and the disc golf already killed the golf. There is no way for the dead ball golf to be alive again. The golf industry still exists; however, the golf industry transforms to be the disclub golf industry.

The rise of the hand-throwing disc golf is abnormal. It is just due to the delay of the innovations of golf technology. The know-how of the disclub golf technology is extremely hard that it causes the delay of the innovations of golf technology. Due to the delay of innovations of disclub golf technology more than two centuries, it forces the disc golfers to play the disc with hand-throwing way to be the disc golf. Even the ball golf industry tries to repel the mega-trend of disc golf to extend the ball golf life, however, the irreversible process of the mega-trend of golf moving from the ball golf to disc golf is still undergoing, and the speed of the irreversible process is faster and faster. Right now, it is the hand-throwing disc killing the club-swiveling ball golf. Even the hand-throwing disc golf already makes the ball golf dying, however, the disclub golf will make the ball golf die at the spot immediately. All the golf industry and golf courses have to be preparing for the shock transitions.

The name of disc golf comes from the name of discus. The disc golfers really throw the golf disc as the sportsman of the discus does before. The disc golfer runs on the flat concrete bed then turns around the body to throw the golf disc. Therefore, most of the disc golfers are the sportsmen. Therefore, the disc golf is kept out of the golf courses due to the following reasons.

(1) The running-to-throw disc golf is not compatible with the standing-to-swivel ball golf.

(2) The concrete bed destroys the nature environment of the golf course.

(3) The golf ball players are the old retired people. However, to play the disc golf of the conventional disc golf, it needs to be very strong sportsman. Therefore, almost all the disc golf player is young sportsman. The running and fast throwing actions of the young sportsmen are the threat to the life of the old retired people.

(4) The target of the disc, disc basket, is the new facility that the golf course has to add it permanently.

(5) The ball golf uses the water pond and sand holes as the blockage to the golf ball. However, the disc golf player uses the trees as the blockage to the flying disc.

(6) Playing at different tracks/portions of the golf course, the disc golf and ball golf play in parallel at the same time. The high-speed disc flying around the old retired people, it scares the old retired people.

(7) It is dangerous for the high-speed disc hitting an the old retired people.

According to the above seven factors, the golf ball courses having good ball business are reluctant to take the disc golf business. Only a few golf ball courses add the concrete bed and basket to have the business of the disc golfers. As the disc golf becomes popular, the young man does not go to the golf course to play any more. Furthermore, the disc golf does not use the club. It causes the golf to be dead and it is disaster of the loss of business of both golf course and golf industry.

The golf ball is the most difficult sport. The ball golf uses swiveling club to hit the ball. The selectivity of the destination of the golf ball is poor. For the long-range long drive, it is impossible to repeat the same operations twice to have the golf ball to fall within the same specified region. The ball flies long distance that the hitting impact force has to be very large. However, due to the huge impact hitting force, it is almost useless in the real life. It has the other partner to catch the flying disc or Frisbee. Due to the dangerous and poor selectivity of the golf ball, it has no other partner to catch the flying golf ball.

Furthermore, the size and shape of the cellular phone is not compatible to the small round golf ball. The cellular phone is in the form of the large flat plate. It is impossible to store the cellular phone in the small round golf ball. Therefore, the ball golf has no communication capability. Furthermore, the ball has the large temporary distortion under the large hitting impact force. No protection facility will work under such kind huge impact force. It is impossible to have the delicate cellular phone to store in the golf ball to carry the cellular phone to fly the long distance. Due to the huge impact force and small lift force, the golf ball cannot carry the phone to far away distance. It was impossible to have the mobile remote surveillance capability in the ball golf era. Therefore, the ball golf is useless for the military application such as scout and throwing grenade, etc.

To overcome the impact problem and selectivity problem of the golf ball, the inventors did invent the club -swiveling ring and club-swiveling disc. The throwing distance of the club-swiveling ring is good. However, it has the disaster to hook and hang up on the tree. Furthermore, the wind-resistance is weak. Therefore, almost all the disc golfers play the golf discs instead of the golf ring. Therefore, the inventors have to make a lot efforts to make the technology innovations of cam lock. We disclose these innovations of cam lock in this patent application. The disclub golf invented by us is to make up all the prior defects. Our disclub golf is the only hope for the golf industry.

Objects and Advantages

Let the Phonefly be xPhone. Combining the innovation of the club-swiveling disclub golf with the innovation of mobile smart phone, the Phonefly xPhone having the mobile remote surveillance capabilities serves as the smart-fishing, lifeguard, real-time battlefield monitoring and club-swiveling grenade, etc. Furthermore, the Phonefly xPhone has the versatile different operation modes. The versatile different operation modes enchants the young kids to accept the Phonefly xPhone to be the next generation mobile phone standard.

Comparing with ball golf, the disclub golf is less difficult with much better selectivity. There is no huge impact hitting force on the disc itself The disclub has no impact force on the phone and has the big lift force to carry the phone to the far away remote site. The Wi-Fi has communication range up to 1 kilometer. Therefore, the communication range and the disc flying distance are compatible. We can make the combination of the disclub golf and the phone to be the "flying phone—Phonefly" of the next-generation xPhone. Furthermore, the disclub golf has the following advantages:

(1) Disclub golf still uses the disclub that the golf industry will not lose its business.

(2) Disclub golf is suitable for the old man, woman and kids, etc, that the golf courses will not lose their business.

(3) Disclub golf follows the exact Tee-time rules as the golf ball does. Disclub golf uses the same playing track as golf ball does. Only one team plays in the Tee spot at one time. Therefore, there is no dangerous to the other golf players.

(4) The disc is mounted on the disclub head directly that the selectivity of the disc golf is much better than the selectivity of the ball golf. Therefore, the disc golf is much safer than the ball golf does. It has no problem for the ball golf course to accept the disc golf.

(5) Disclub golf is compatible with ball golf. The only minor modification is the flagpole. There is no need to add the concrete plate and stand alone steel disc basket, etc. to the existed golf course.

(6) Both disclub golf and ball golf are the same club-swinging style sport. They are sporting style compatible. The ball golfer has no objection in mind to the same sporting style disc golf.

(7) The disclub golf itself has the technology challenge as the ball golf does. Therefore, disclub golf does not need to add the bushes to create the external environmental difficulties as the disc golf does. Therefore, the disclub golf is suit for play in the same open and wide golf courses as the ball golf does Comparing the useless ball golf, the disclub golf technology has the practical applications to human life. The club-swiveling disclub golf and the club-swiveling ball golf can share the same golf course. To have both ball golf and disc golf sharing the same course, it only needs to add the inverted umbrella basket to the existed flagpole. Furthermore, all the ball harvest machine and ball vending machine can upgrade with the hybrid machine of the ball-disc harvest machine and ball-disc vending machine that the sport venue can have both ball golf and disclub golf to share the same golf course.

DRAWING FIGURES

FIG. 1 is the basic operation of the ultra-long-drive club-swiveling disclub golf having cam lock; (A) is the ultra -long-drive club-swiveling disc being mounted on the disclub head of the ultra-long-drive club-swiveling disclub; swiveling the disclub as shown by the arrow, the disc rotates to the position as shown in FIG. 1B; (B) is the disc rotating on the disclub head and going to launch to take off flying in the sky; the callouts shows the detailed structure of the disc, cap and head.

FIG. 2 is the disclub of the ultra-long-drive club-swiveling disclub golf having cam lock; (A) is the elevation view of the ultra-long-drive club-swiveling disclub having cam lock; (B) is the elevation view of the disclub head having cam lock; (C) is the moving trajectory of the conventional bottle cap; (D) is the moving trajectory of the fitting discap of the disc on the disclub head for the disclub.

FIG. 3 is the disc of the ultra-longdrive drive-swiveling disclub golf having cam lock; (A) is the exposed elevation view of the disc having cam lock; (B) is the bottom view of the disc of the ultra-long-drive club-swiveling disclub golf having cam lock.

FIG. 4 is the disclub head and fitting discap of the disc for the ultra-long-drive club-swiveling disclub golf having cam lock; (A1) is the top view of the disclub head of the disclub for the ultra-long-drive club-swiveling disclub golf; (A2) is the elevation view of the disclub head for the ultra-long-drive club-swiveling disclub golf; (B1) is the bottom view of the fitting discap of the disc having cam lock for the ultra-long-drive club-swiveling disclub golf; (B2) is the elevation view of the fitting discap the disc having cam lock for the ultra-long-drive club-swiveling disclub golf; (B3) is the partially exposed view of the fitting discap of the disc having the elasticity type cam lock; (B4) is the partially exposed view of the fitting discap of the disc having the spring type cam lock.

FIG. 5 is the disclub head structure for the ultra-long-drive club-swiveling disclub golf; (A) is the top view and the exposed side view of the disclub head for the ultra-long-drive club-swiveling disclub golf; (B) is the shaded structure of the disclub head to show the 3D, three dimensional, structure of the disclub head having cam lock for the ultra-long -drive club-swiveling disclub golf.

FIG. 6 is the fitting discap structure of the disc having can't lock for the ultra-long-drive club-swiveling disclub golf; (A) is the bottom view and the exposed side view of the fitting cap of the disc for the ultra-long-drive club-swiveling disclub golf; the dotted line is the disclub head to show the fit between the disclub head and the discap; (B) is the shaded and partial exposed structure of the fitting discap of the disc for the ultra-long-drive club-swiveling disclub golf.

FIG. 7 is to illustrate the fitting discap structure of the disc having cam lock for the ultra-long-drive club-swiveling disclub golf; (A) is to illustrate the fitting discap embedded in the disc being at the mounting position as shown in FIG. 1A; the fitting discap itself can be designed to be antenna having the RFID chip being mounted on it or to be the part of the loop antenna; (B) is to illustrate the fitting discap embedded in the disc being at the launching position as shown in FIG. 1B.

FIG. 8 is the fitting discap and the disclub head having only one single locking cam lock. The dotted line is the disclub head.

FIG. 9 is the fitting discap and disclub head having the dual locking cam locks. The dotted line is the disclub head.

Figure 10A:
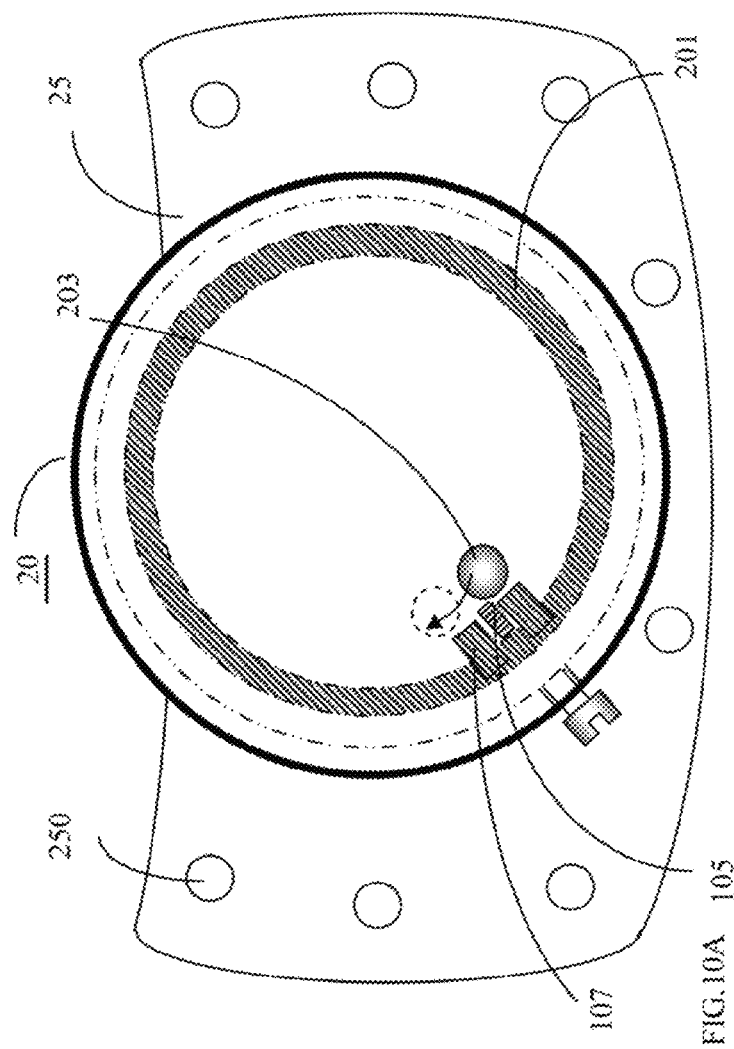
FIG. 10 is the disclub head having the adjustable locking cam lock; (A) is the exposed bottom view of the disclub head with the adjustable locking cam lock having the discap mounted on the disclub head; (B) is the exposed elevation view of the disclub head with the adjustable locking cam lock having the discap mounted on the disclub head.

FIG. 11 is the extra interlocking cam mechanism at the bottom edge of the discap for the fitting discap being tightened at the cam-locking position; (A) is the position of the interlocking cam mechanism of the discap being tightened at the cam-locking position; (B) is the enlarged view to show the detailed mechanism of the interlocking cam mechanism of the discap being tightened at the cam-locking position.

FIG. 12 is the interlocking cam mechanism at the top edge of the disclub head with the discap being tightened at the can locking position; (A) is the position of the interlocking cam mechanism of the discap being tighten at the cam -locking position; (B) is the enlarged view to show the detailed mechanism of the interlocking cam mechanism of the discap being tighten at the cam-locking position.

FIG. 13 is the interlocking cam mechanism at the end edge of the tighten screw with the discap being tightened at the cam-locking position; (A) is the position of the interlocking cam mechanism at the end edge of the tighten screw of the discap being tightened at the cam-locking position; (B) is the enlarged view to show the detailed mechanism of the interlocking cam mechanism at the end edge of the tighten screw with the discap being tightened at the cam-locking position.

FIG. 14 is to show the carry capability of the disc for the ultra-long-drive club swiveling disclub golf; the disc drags, pulls and carries the fishing-string and/or nano-wire to far distance; (A) is the exposed elevation view to show the fishing-string and/or nano-wire being attached to the center stud below the disc; (B) is the bottom view to show the fishing-string and/or nano-wire is attached to the center stud below the disc; (C) is the enlarged view to show the fishing-string and/or nano-wire is hooked to the center stud below the disc; (D) is the enlarged view to show the fishing -string and/or nano-wire is hooked to the bearing being mounted on the center stud.

FIG. 15 is to show the camera and LED to be installed on the disc for the ultra-long-drive club-swiveling disclub golf; (A) is the exposed elevation view of the disc for the ultra-long-drive club-swiveling disclub golf to show the camera and LED being installed on the disc for the ultra-long-drive club-swiveling disclub golf; (B) is the bottom view of the disc for the ultra-long-drive club-swiveling disclub golf to show the camera and LED to be installed on the disc for the ultra-long-drive club-swiveling disclub golf.

FIG. 16 is to show the smart mobile phone sPhone or the phone of the dual-Phone-Watch-Pair of xPhone, etc to be installed on the disc for the ultra-long-drive club-swiveling disclub golf; (A) is the exposed elevation view of the disc for the ultra-long-drive club-swiveling disclub golf to have the smart mobile phone sPhone of the phone of the dual -Phone-Watch-Pair of xPhone, etc to be installed on the disc for the ultra-long-drive club-swiveling disclub golf; (B) is the bottom view of the disc for the ultra-long-drive club-swiveling disclub golf to have the smart mobile phone sPhone or the phone of the dual-Phone-Watch-Pair of xPhone, etc to be installed on the disc for disclub golf; (C) is the elevation view of the shrinkable disc after shrinkage for the disclub golf; (D) is the bottom view of the shrinkable disc after shrinkage for the disclub golf.

FIG. 17 is to show the smart mobile phone or the phone of the dual Phone-Watch-Pair of xPhone, etc to be installed on the disc for the disclub golf having the PCB to be embedded in the outside ring of the disc; (A) is the elevation view of the disc for the disclub golf to have the smart mobile phone sPhone or the phone of the dual-Phone -Watch-Pair of xPhone, etc to be installed on the disc having the PCB to be embedded in the outside ring; (B) is the bottom view of the disc for disclub golf to have the smart mobile phone or the phone of the dual-Phone-Watch-Pair of xPhone, etc. to be installed on the disc having the PCB to be embedded in the outside ring.

FIG. 18 is to show the active fishing reel to reduce the drag force for ultra-long-drive disclub golf; (A) is the partial exposed view of the active fishing reel to reduce the drag force for ultra-long-drive disclub golf; (B) is the motor mechanism of the active fishing reel to reduce the drag force for ultra-long-drive club-swiveling disclub golf.

FIG. 19 is the smart watch/monitor of the smart watch-phone or Dual-Phone-Watch pair/set of the "flying phone -Phonefly xPhone" for disclub golf; (A) is the elevation view of the smart watch/monitor of the smart watch-phone or Dual-Phone-Watch pair/set of the "flying phone—Phonefly xPhone" for disclub golf; (B) is the side view of the smart watch/monitor of the smart watch-phone or Dual-Phone-Watch pair/set of the "flying phone—Phonefly xPhone" for the disclub golf; (C) is the wrist wrapper type of the smart watch/monitor for the smart watch-phone or Dual-Phone-Watch pair/set of the "flying phone—Phonefly xPhone" for the disclub golf.

FIG. 20 is the systematic view of the golfishing or cloud computation application of the ultra-long-drive club -swiveling disclub golf; (A) is the disc being mounted on the disclub head; the watch/monitor being worn on the wrist or wrapped around the wrist; (B) is the disc flying far away, falling and floating on the water; the disclub golfer watches and monitors the underwater fishing activities with the watch/monitor being worn on or wrapped around the wrist.

FIG. 21 is the systematic view of the golfishing or cloud computation application of the ultra-long-drive club -swiveling disclub golf; (A) is the disc being mounted on the disclub head; the watch/monitor being mounted on the disclub; (B) is the disc flying far away, falling and floating on the water; the disclub golfer watches and monitors the underwater fishing activities with the watch/monitor being mounted on the disclub.

FIG. 22 is the systematic view of the cloud computation application of disc golf; (A) is the disc being held with a hand; the watch/monitor being mounted on the hand or wrapped around the wrist; (B) is the disk flying far away, falling and floating on the water, the disc golfer watches and monitors the underwater fishing activities with the watch/monitor being mounted on the club at wrapped around the wrist.

FIG. 23 is the systematic view of the cloud computation application of dual-Phone-Watch Pair; (A) is the Phone being held with a hand: the watch/monitor being mounted on the hand or wrapped around the wrist; (B) is the Phone far away; the owner watches and monitors the activities with the watch/monitor being mounted on the arm or wrapped around the wrist.

FIG. 24 is the cloud computation of the ultra-long-drive golfring with the disclub golf; (A) is the side elevation view of the cloud-computation ultra-long-drive golfring coated with solar cells for self-generation electricity and/or equipped with vibration electricity, etc.; (B) is the bottom view of the cloud-computation ultra-long-drive ring coated with solar cells for self-generation electricity and/or equipped with vibration electricity, remote control balloon, microphone, video camera, etc.

FIG. 25 is the cloud computation with the dual-Phone-Watch-Pair having the operation mode as Monitor and Game Controller; the disc is the conventional golf disc; (A) is elevation view of the dual-Phone-Watch-Pair embedded in the disc; (A1) is elevation view of the Phone of the dual-Phone-Watch-Pair embedded in the disc of disc golf as the monitor of the game; (A2) is elevation view of the Watch of the dual-Phone-Watch-Pair as the game controller of the game, etc.; (B) is the bottom view of the dual-Phone-Watch-Pair embedded in the disc; (B1) is the bottom view of the Phone of the dual-Phone-Watch-Pair embedded in the disc as the monitor of the game; (B2) is the bottom view of the Watch of the dual-Phone-Watch-Pair as the game controller of the game, etc.; (C) is the application of the disc Phone-Monitor and Watch-keyboard with the dual-Phone-Watch-Pair; (D) is the version of disc having the hook; (E) is the version of disc having the universal video camera.

FIG. 26 is the dual-Phone-Watch-Pair having the operation mode as Monitor and Game Controller, etc.; the disc is the disclub disc; (A) is elevation view of the dual-Phone-Watch-Pair embedded in the disc of disclub golf; (A1) is elevation view of the Phone of the dual-Phone-Watch-Pair embedded in the disclub disc as the monitor of the game, etc.; (A2) is elevation view of the Watch of the dual-Phone-Watch-Pair as the game controller of the game, etc.; (B) is the bottom view of the dual-Phone-Watch-Pair embedded in the disclub disc; (B1) is the bottom view of the Phone of the dual-Phone-Watch-Pair embedded in the disclub disc as the monitor of the game, etc.; (B2) is the bottom view of the Watch of the dual-Phone-Watch-Pair as the game controller of the game, etc.

FIG. 27 is the systematic approach for the versatile combinatory applications of the disc golf, disclub golf and dual-Phone-Watch-pair; (A) is the components of the fitting discap, disc, phone and watch; (B) is the phone and watch being merged to be one screen and/or 3D video/image display; (C) is the phone and watch working as the pair of screen and keyboard, etc.; (D) is the phone and watch working as display and game controller, etc; (E) is the combinatory application of the fitting discap, disc and the dual-Phone-Watch-Pair working as the remote monitor for the smart golfishing and cloud computation, etc.

FIG. 28 is the illustration of the versatile applications of the Cloud-Computation with the assistance of the dual -Phone-Watch-Pair and the ultra-long-drive disclub golfring, disclub disc, etc. of the ultra-long-drive club swiveling disclub golf.

FIG. 29 is the general platform and architecture of the smart phone and/or the Dual-Phone-Watch-Pair for the ultra -long-drive club-swiveling disclub golf.

Figure 30:
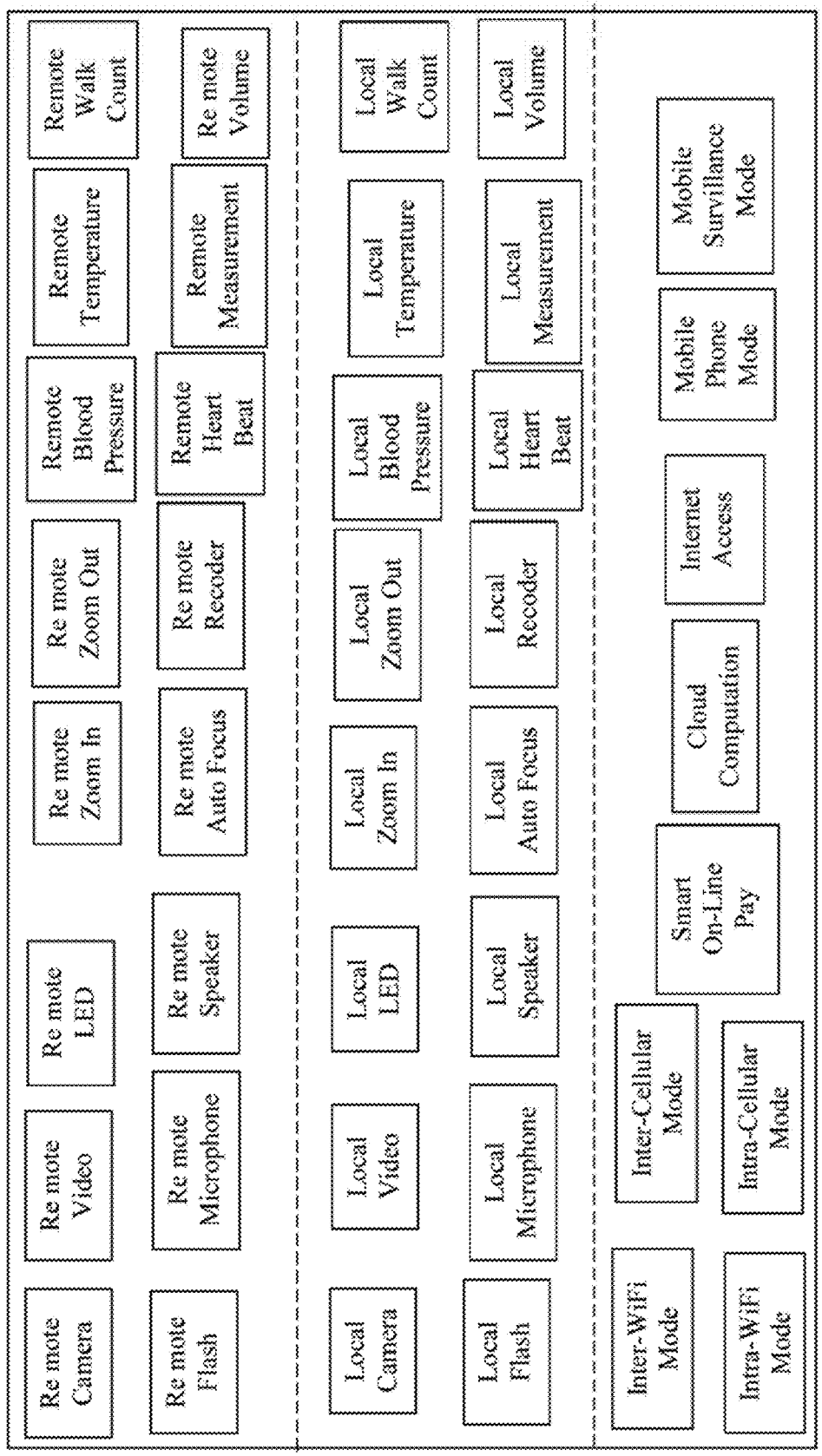

FIG. 30 is the general functional control panel of the smart phone and/or the Dual-Phone-Watch-Pair for the ultra -long-drive club-swiveling disclub golf.

Figure 31:
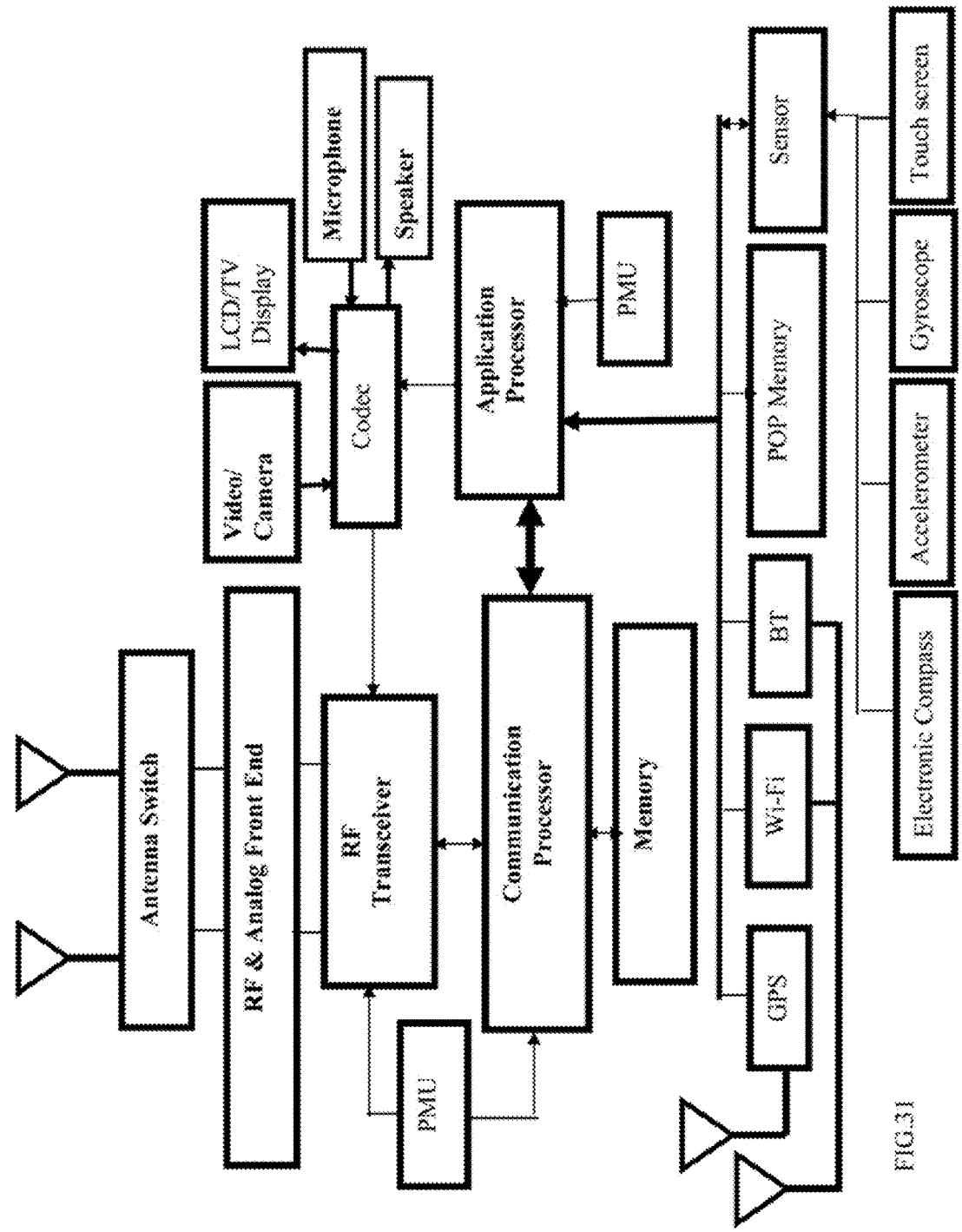

FIG. 31 is the general block diagram of the smart phone and/or the Dual-Phone-Watch-Pair for the ultra-long-drive club-swiveling disc golf.

Figure 32:
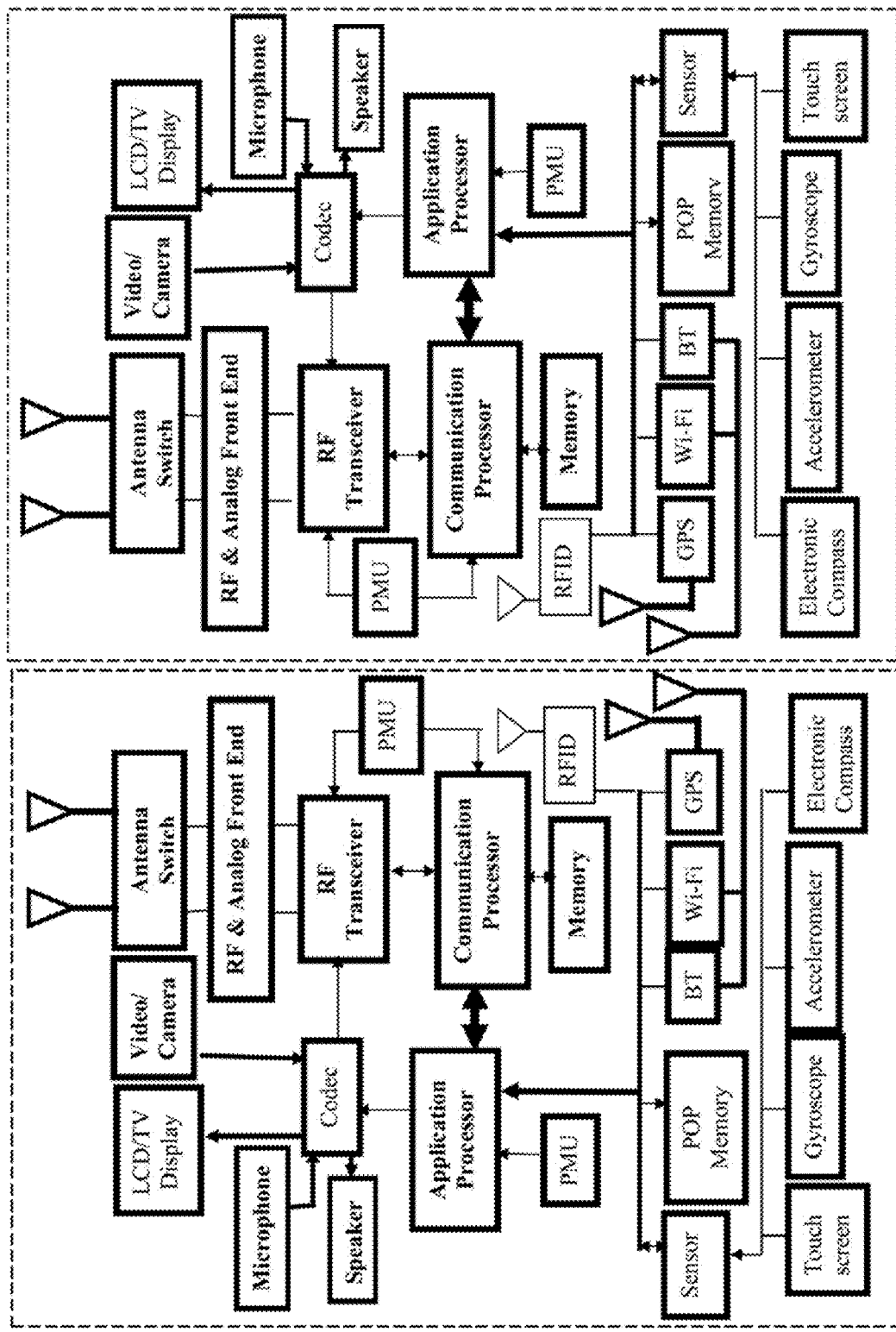

FIG. 32 is the general block diagram of the dual smart phone pair such as the dual-phone-watch pair of the ultra -long-drive club-swiveling disclub golf.

Figure 33:
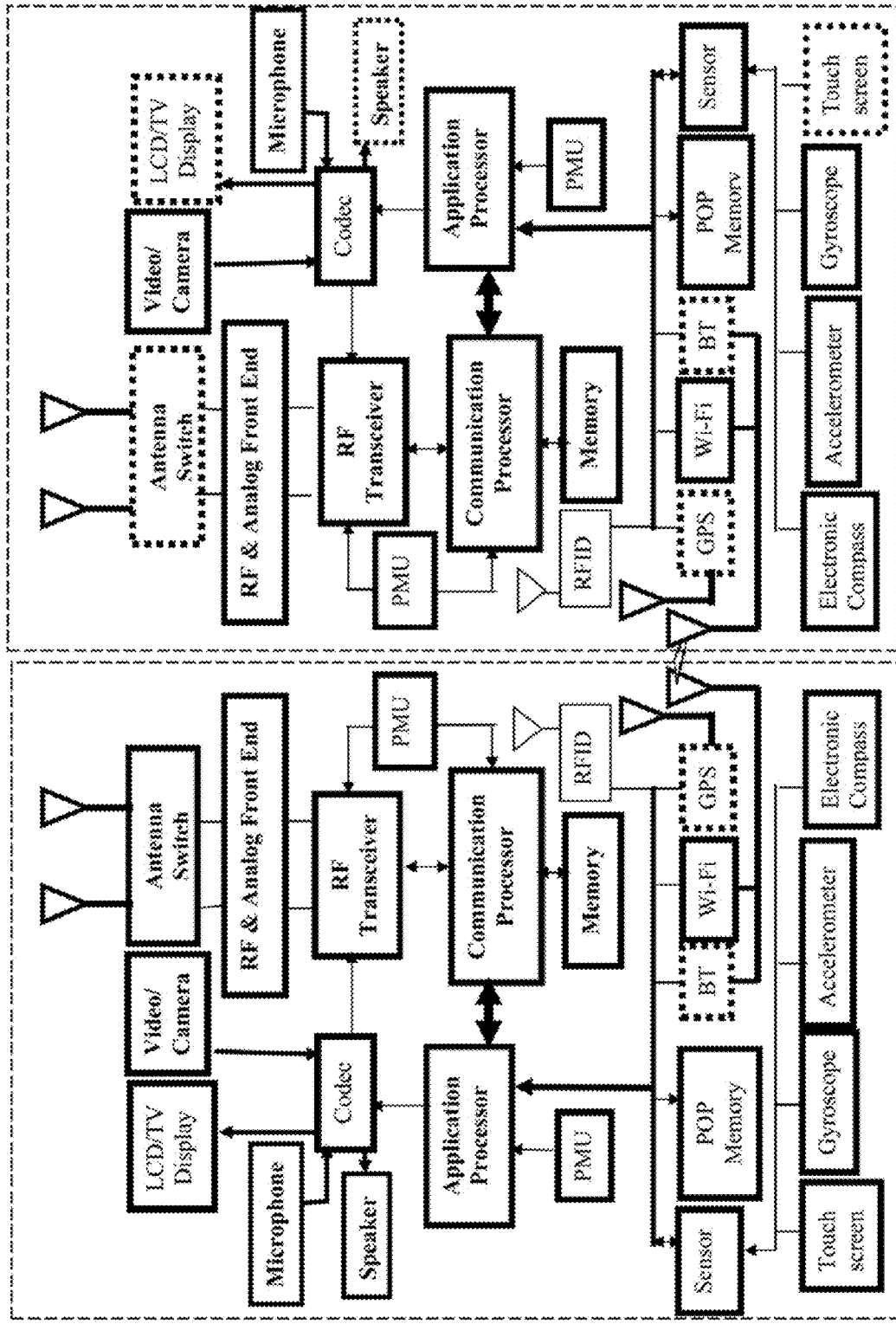

FIG. 33 is the block diagram for one selected application of the dual-smart-phone-pair to illustrate the phone-watch pair having the application-specific integrated system for the ultra-long-drive club-swiveling disclub golf.

FIG. 34 is the wireless charger for the ultra-long-drive club-swiveling disclub golf; (A) is the charging pad wireless charger for the ultra-long-drive club-swiveling disclub golf; (B) is the curvilinear charging pad wireless charger for the ultra-long-drive club swiveling disclub golf; (C) is the charging box wireless charger for the ultra-long-drive club swiveling disclub golf.

FIG. 35 is the bended ultra-long-drive disclub for the ultra-long-drive club-swiveling disclub golf; (A) is the disc being mounted on the ultra-long-drive bonded disclub for the ultra-long-drive, (B) is the disc being ready to launch to take-off on the ultra-long-drive bended disclub for the ultra-long-drive; (C) is the velocity diagram of the disc being mounted on bended disclub.

FIG. 36 is the universal adjustable ultra-long-drive disclub for the ultra-long-drive club-swiveling disclub golf; (A) is the disc being mounted on the universal adjustable ultra-long-drive disclub for the ultra-long-drive; (B) is the disc being ready to launch to take-off on the universal adjustable ultra-long-drive disclub for the ultra-long-drive.

FIG. 37 is the disclub disc being launched to fly with the conventional golf club; the disclub disc launching station is derived from the fitting discap of the disclub golf.

FIG. 38 is the conventional disc being launched to fly with the conventional golf club; the disc launching station is derived from the clamping fork; (A) is the front view of the conventional disc launching station; (B) is the side view of the conventional disc launching station.

FIG. 39 is the analysis and solution for the mysterious failure of the disc; (A) is the trajectory of the golf ball; (B) is the trajectory of the conventional disc; (C) is the trajectory of the turbulent-free disc.

FIG. 40 is the turbulent-free disc for the ultra-long-drive club-swiveling disclub golf, (A) is the elevation view of the turbulent-free disclub disc for the ultra-long-drive club-swiveling disclub golf; (B) is the exposed top view of the turbulent-free disclub disc for the ultra-long-drive club-swiveling disclub golf.

FIG. 41 is the turbulent-free disc for the conventional disc golf. (A) is the elevation view of the turbulent-free disc for the conventional disc golf; (B) is the bottom view of the turbulent-free disc for the conventional disc golf.

FIG. 42 is the analysis of the Coriolis force effect; (A) is the Coriolis force diagram; (B) is the trajectory with Coriolis force having the moving aerodynamic center.

FIG. 43 is the compensated ultra-long-drive disc for the conventional disc golf; (A) is the elevation view of the ultra-long-drive disc for the conventional disc golf with compensation at the top edge of the concave cave; (B) is the elevation view of the ultra-long-drive disc for the conventional disc golf with compensation at the bottom edge of the concave cave.

FIG. 44 is the compensated ultra-long-drive disc for the ultra-long-drive club swiveling disclub golf; (A) is the elevation view of the ultra-long-drive disc for the ultra-long-drive club-swiveling disclub golf with compensation at far fitting discap end; (B) is the elevation view of the ultra-long-drive disc for the ultra-long-drive club-swiveling disclub golf with compensation at near fitting discap end.

FIG. 45 is the Tarngs 1st Force applying to the disc; (A) is the Tarngs 1st Force due to the rotation of the disc having the single-sided net lifting force at the top of the disc; (B) is the trajectory of the disc having the single-sided net lifting force at the top of the disc.

FIG. 46 is the ultra-long-drive disclub disc having the Tarngs 1st force on the top of the disc; (A) is the side view of the ultra-long drive disc of disclub golf; (B) is the exposed top view of the ultra-long drive disc of disclub golf.

FIG. 47 is the conventional disc having the Tarngs 1st force on the top of the disc; (A) is the side view of the conventional disc of hand-throwing golf; (B) is the exposed top view of the conventional disc of hand-throwing golf.

FIG. 48 is the ultra-long-drive disclub disc having the Tarngs 1st force both on the top and the bottom of the disc for side turning; (A) is the side view of the side-turning ultra-long drive disclub disc of disclub golf; (B) is the exposed top view of the side-turning ultra-long drive disclub disc of disclub golf.

FIG. 49 is the conventional disc having the Tarngs 1st force both on the top and the bottom of the disc for side turning; (A) is the side view of the side-turning conventional disc; (B) is the, top view of the side-turning conventional disc of disc golf.

FIG. 50 is the analysis and design of the Tarngs 2nd force having the directional wind force single-sided net pushing up effect; (A) is the diagram of the force diagram having the directional wind force single-sided net pushing up effect; (B) is the trajectory of disc having the directional wind force single-sided net pushing up effect.

FIG. 51 is the compensated disc with the single-sided net force effect of Tarngs 2nd force for the conventional disc golf; (A) is elevation view of the ultra-long-drive disc for the conventional disc golf with the compensation of small turbine blades at the boundary of inner cave; (B) is the top partially exposed view of the ultra-long-drive disc for the conventional disc golf with the compensation of small turbine blades at the boundary of inner cave to have the single -sided pushing up effect.

FIG. 52 is the compensated disc with the single-sided net force effect of Tarngs 2nd force for the ultra-long-drive disc of the disclub golf; (A) is elevation view of the ultra-long-drive disc for the disclub golf with the cam type locking pole and the compensation of small turbine blades at the boundary of inner cave; (B) is top partially exposed view of the ultra-long-drive disc for the disclub golf with the cam type locking pole and the compensation of small turbine blades at the boundary of inner cave.

FIG. 53 is the ultra-long-drive disc compensated disc with the single-sided net force effect of Tarngs 2nd force having the cam type dual locking poles for the ultra-long-drive club-swiveling disc golf; (A) is elevation view of the ultra-long-drive disc for the ultra-long-drive club-swiveling disclub with the cam type dual locking poles and the compensation of small turbine blades at the boundary of inner cave; (B) is the partially exposed view of the ultra-long -drive disc for the ultra-long-drive club-swiveling disclub golf with the cam type dual locking poles.

FIG. 54 is the ultra-long-drive disc having both the Tarngs 1st force and Tarngs 2nd force; (A) is the elevation view of the ultra-long-drive disc having both the Tarngs 1st force and Tarngs 2nd force for the ultra-long-drive club -swiveling disclub golf; (B) is the partially exposed top view of the ultra-long-drive disc having both the Tarngs 1st force and Tarngs 2nd force for the ultra-long-drive club-swiveling disclub golf.

FIG. 55 is the conventional disc having both the Tarngs 1st force and Tarngs 2nd force; (A) is the elevation view of the conventional disc having both the Tarngs 1st force and Tarngs 2nd force for the ultra-long-drive disc golf; (B) is the partially exposed top view of the conventional disc having both the Tarngs 1st force and Tarngs 2nd force for the ultra-long-drive disc golf; the Tarngs 2nd force is generated with the turbine blade type fins; (C) is the partially exposed top view of the conventional disc having both the Tarngs 1st force and Tarngs 2nd force for the ultra-long-drive disc golf; the Tarngs 2nd force is generated with airfoil type fins.

FIG. 56 is the side-turning ultra-long-drive disc with the shark skin having both the Tarngs 1st force and Tarngs 2nd force; (A) is the elevation view of the side-turning ultra-long-drive disc with the shark skin having both the Tarngs 1st force and Tarngs 2nd force for the ultra-long-drive club-swiveling disclub golf; (B) is the exposed top view of the side-turning ultra-long-drive disc with the shark skin having both the Tarngs 1st force and Tarngs 2nd force for the ultra -long-drive club-swiveling disclub golf.

FIG. 57 is the side-turning conventional disc with the shark skin, etc. having both the Tarngs 1st force and Tarngs 2nd force; (A) is the elevation view of the conventional ultra-long-drive disc with the shark skin, etc. having both the Tarngs 1st Force and Tarngs 2nd force for the ultra-long-drive disc golf. (B) is the exposed top view of the side -turning conventional disc with the sharkskin, etc. having both the Tarngs 1st force and Tarngs 2nd force for the ultra -long-drive disc golf.

FIG. 58 is the ultra-long-drive disc with the sharkskin, etc. for the lifebuoy, etc for the ultra-long-drive club -swiveling disclub golf; (A) is the elevation view of the ultra-long-drive disc with the sharkskin, etc. for the lifebuoy, etc for the ultra-long-drive club-swiveling disclub golf; (B) is the bottom view of the ultra-long-drive disc with the sharkskin, etc. for the lifebuoy, etc for the ultra-long-drive club-swiveling disclub golf.

FIG. 59 is the ultra-long-drive disc for the edge-leading boomerang with the shark skin, etc. for the ultra-long -drive club-swiveling disclub golf; (A) is the elevation view of the ultra-long-drive disc for the edge-leading boomerang with the shark skin, etc. for the ultra-long-drive club-swiveling disclub golf; (B) is the bottom view of the ultra-long -drive disc for the edge-leading boomerang with the shark skin, etc. for the ultra-long-drive club-swiveling disclub golf.

FIG. 60 is the ultra-long-drive disc for the puncher-leading boomerang with the shark skin. etc. for the ultra-long-drive club-swiveling disclub golf; (A) is the elevation view of the ultra-long-drive disc for the puncher-leading boomerang with the shark skin, etc. for the ultra-long-drive club-swiveling disclub golf (B) is the bottom view of the ultra-long-drive disc for the puncher-leading boomerang with the shark skin, etc. for the ultra-long-drive club-swiveling disclub golf.

Figure 61A:
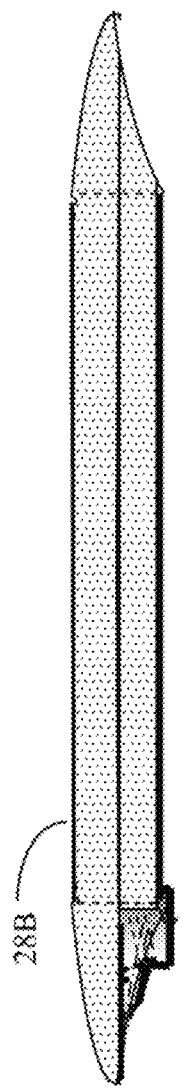
Figure 61B:
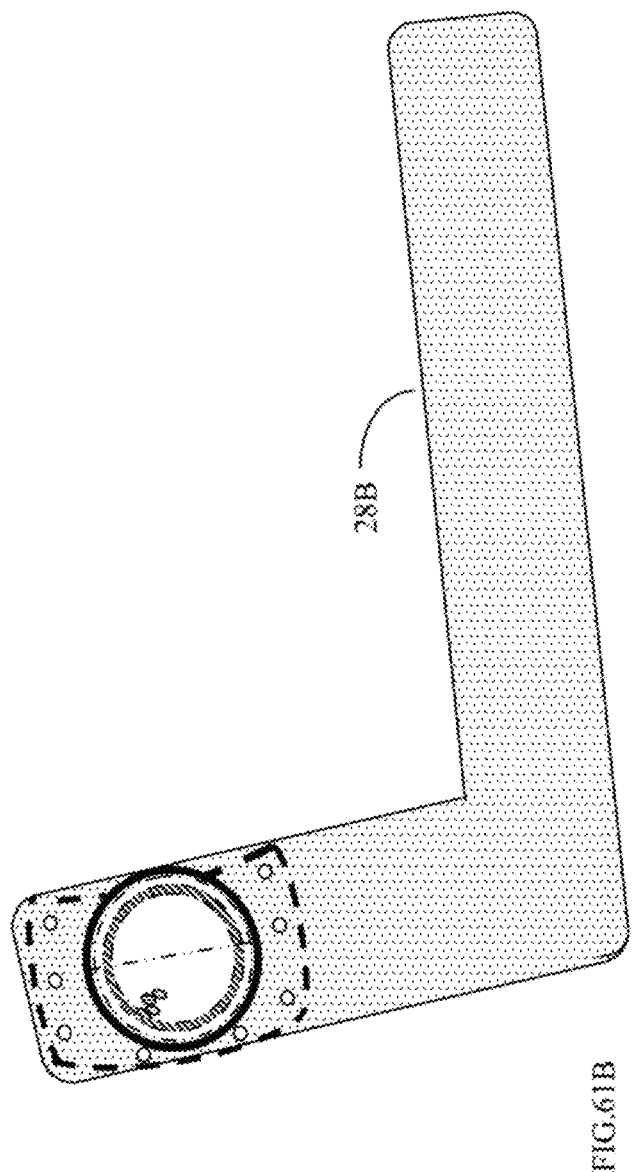

FIG. 61 is the ultra-long-drive disc for the angle-shaped boomerang with the shark skin, etc. for the ultra-long -drive club-swiveling disclub golf; (A) is the elevation view of the ultra-long-drive disc for the angle shaped boomerang with the shark skin. etc. for the ultra-long-drive club-swiveling disclub golf; (B) is the bottom view of the ultra-long -drive disc for the angle-shaped boomerang with the shark skin, etc. for the ultra-long-drive club-swiveling disclub golf.

FIG. 62 is the ultra-long-drive disc for the disc grenade, etc with the ultra-long-drive club-swiveling disclub golf; (A) is the elevation view of the ultra-long-drive disc for the disc grenade, etc. for the ultra-long-drive club-swiveling disclub golf at the mounting position; (B) is the elevation view of the ultra-long-drive disc for the disc grenade, etc. for the ultra-long-drive club-swiveling disclub golf at the launching position.

FIG. 63 is the ultra-long-drive disc for the disc grenade, etc with the rifle having ultra-long-drive club-swiveling disclub golf capability.

FIG. 64 is structure of the ultra-long-drive disc for the disc grenade; (A) is the section of the disc grenade which is filled with dynamite; (B) is the deep-notches being notched on the surface of the disc grenade.

FIG. 65 (A) is the arm of the Robot Warrior being equipped with the rifle having ultra-long-drive club-swiveling disclub golf capability for the secret and silent attack; (B) is the amputee of wounded soldier fitting with the rifle having ultra-long-drive club-swiveling disclub golf capability for the secret and silent attack.

FIG. 66 is the simplified figures of the golf flag pole to show the basic operations of the ball-course adaptable disc basket for the disclub golf course to share with the ball golf course; (A) is the inverted umbrella vertical-string hanging basket in the open position for the disclub golf; (B) the inverted umbrella vertical-string hanging basket in the closed position for the ball golf.

FIG. 67 is the complete figure of the golf flag pole to show the basic operations of the ball-course adaptable disc basket for the disclub golf course to share with the ball golf course; (A) is the inverted umbrella vertical-string hanging basket in the open position for the disclub golf; (B) is the inverted umbrella vertical-string hanging basket in the closed position for the ball golf.

FIG. 68 is the hybrid ball and disc harvest machine; (A) is the operation cycles of the ball-disc hybrid harvest machine; (B) is to show the operational principle of the ball-disc hybrid harvest machine; (C) is the flexible stick to pick up the disc; (D) is ball blocking-filter; (E) is the ball-passing-disc-blocking filter.

FIG. 69 is the pre-stack-disc type disc vending machine of the hybrid ball and disc vending machine.

Figure 70:
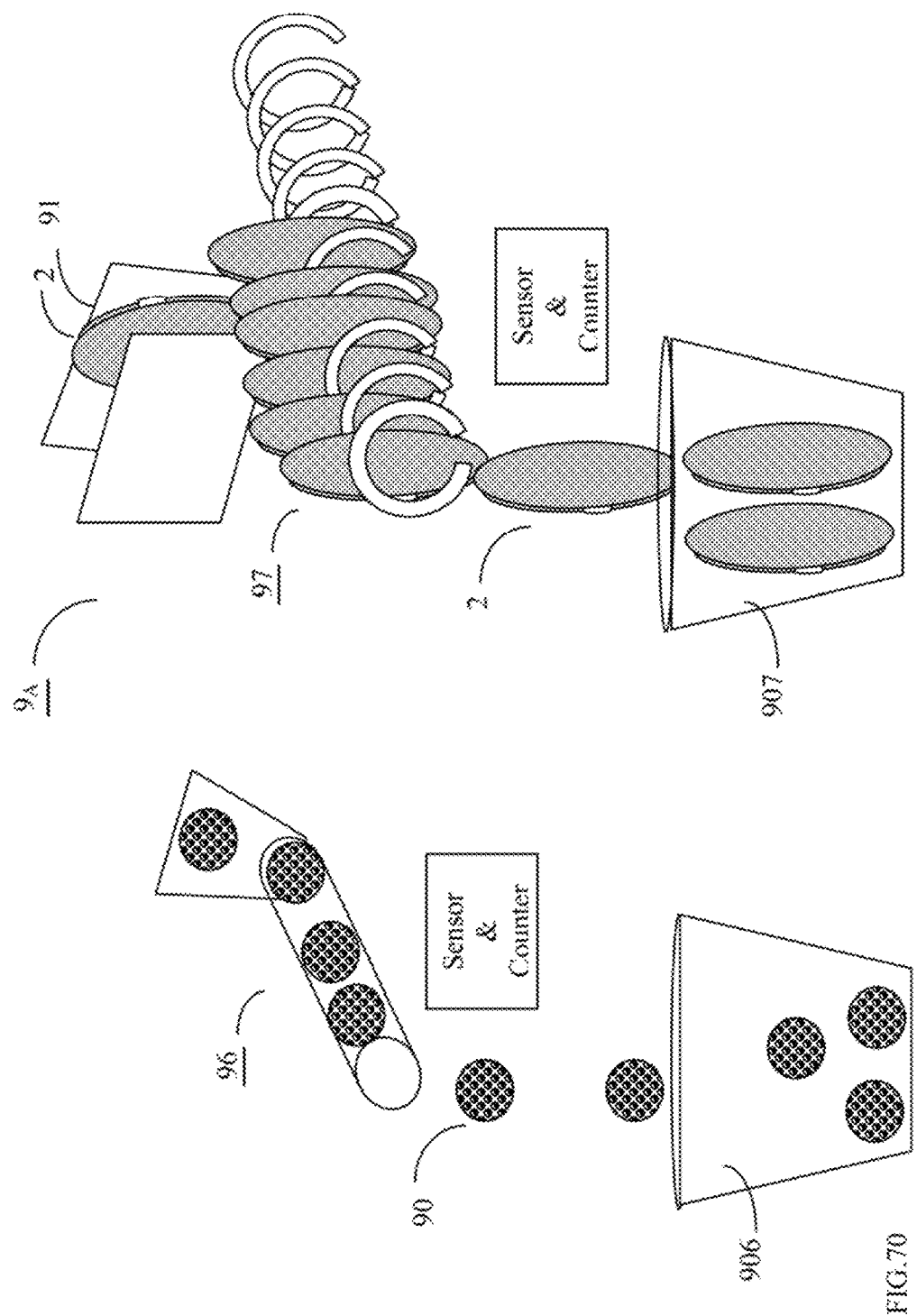

FIG. 70 is the hybrid ball and disc vending machine.

FIG. 71 is the standard calibration machine and standard for disclub golf; (A) is the standard calibration machine for the fitting discap of the disc; (B) is standard calibration for the disclub head; (C) is the standard of calibration.

FIG. 72 is the disclub retriever for the disc being trapped in the tree and/or falling into the pond, etc; (A) is the elevation view of the disclub retriever; (B) is the elevation view of the disc retriever; (C) is the bottom view of disc retriever; (D) is the elevation of the bearing joint of the disc retriever.

FIG. 73 is the disclub golf trolley; (A) is the open exposed operational view of the disclub golf trolley; (B) is the closed carrier view of the disclub golf trolley.

DESCRIPTION AND OPERATION

A disclub golf Phonefly system comprises a head and a cap with multiple options. As shown in FIG. 1A and FIG. 1B, the first option is to have the head 10 mounted on the disclub 1 to be disclub head and the cap is embedded in the disc 2 to be discap 20. Swiveling the disclub 1, the disc 2 rotates on the disclub head 10 and takes off from the disclub head 10. This case is represented with (head-club, cap-disc). The second option is to have the head embedded/mounted on the disc and the cap is mounted on the club. Swiveling the club, the disc rotates on the cap and takes off front the cap. This case is represented with (cap-club, head-disc). In the following description, is based on the first option, (head-club, cap-disc). However, it is very easy to extend the description of the first option to be the description of the second option.

Figures 46A, 46B:
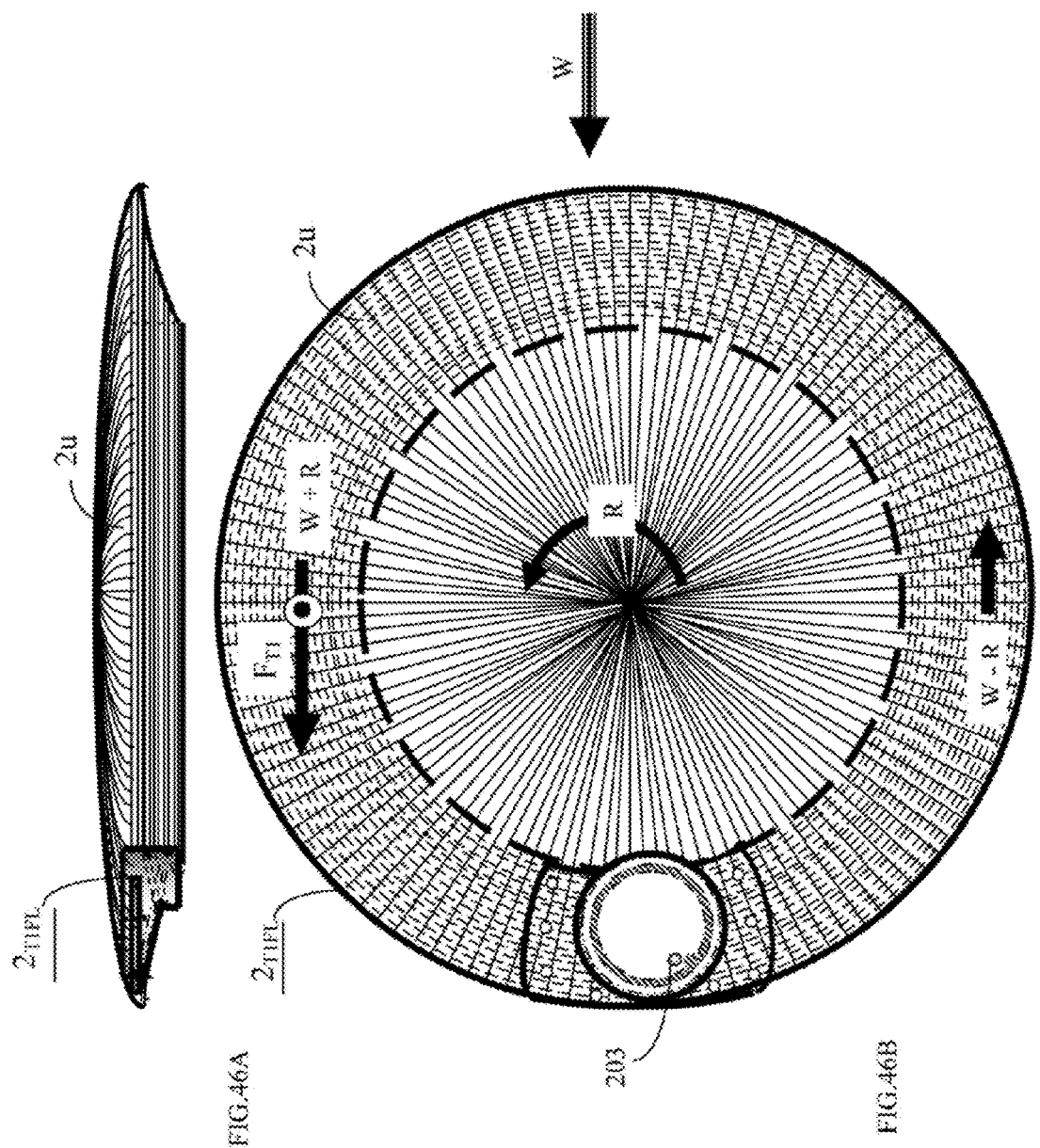

Referring to FIG. 1A and FIG. 1B, the callout of the disc 2 is copied from FIG. 46A. The callout of the section view of disc 2 is copied from FIG. 16A. The callout of the cap 20 is copied from FIG. 11A. The callout of the head 10 is copied from FIG. 11A. The callout of the watch 6 is copied from FIG. 19C. It shows the complete set of disclub golf As shown in the FIG. 20 and FIG. 21, they show the operation of the complete set of the disclub golf.

Referring to FIG. 1A and FIG. 1B, it is the illustrative operations of the right-handed club-swiveling disclub golf. The right-hand club-swiveling disclub golf is implemented with the right-handed screw for the right-hand people. It is the normal operation mode for the right-hand club-swiveling disclub golf. However, changing the right-hand screw to be the left-handed screw, the right-hand club-swiveling disc golf can change to be the left-hand club-swiveling disc golf for the left-hand people. Accordingly, there are four different combinations of this operational apparatus such as, (head-club -right, cap-disc-right), (head-club-left, cap-disc-left), (cap-club-right, head-disc-right), and (cap-club-left, head-disc-left). In the following description, we only discuss the first case, (head-club-right, cap-disc-right). However, it is very easy to extend the first case to the other three cases.

As shown. FIG. 1A, the disclub head 11 is mounted at one end of the club 12 of the disclub 1. The left hand of the disclub golfer holds the left-hand grip 14. The right hand of the disclub golfer holds the right-hand grip 13. The disc 2 is mounted on the disclub head adaptor 10 with the discap adaptor 20. The center of the mass of the disc 2 is a little to the right of the centerline of the disclub pole 1. This deviation of the center of the mass of the disc 2 is a little to the right of the centerline of the disclub pole 1 is to keep the disc 2 to start to rotate in the correct direction. As the disclub is swiveled from the right rear to the left front as shown by the arrow in FIG. 1A, the disc 2 rotates as shown in FIG. 1B. There are many trade-off factors for the selection of the optimum position of the initial position of the center of the mass of the disc 2. One of the good suggestions is that the angle between the centerline of the disclub 12 and the center of the mass of the disc 2 is about to 10 degrees.

As shown in FIG. 1B, as the disclub is swiveled from back right to front-left, the disc 2 rotates about 180 degrees and is ready to launch and fly. As shown in FIG. 2A, FIG. 5B and FIG. 6B, etc., a disclub golf Phonefly system comprises a tightening apparatus. The disclub head 10 has one-half of circle 101 is pushing portion and has another half circle 100 of the screw means being detaching portion. The detaching portion 100 has a portion outside the screw edge 1000 is removed. The discap 20 has one-half circle 201 being pushed portion and having another half circle 200 of the cap being detached portion. The detached portion 200 has a portion outside of the screw edge 2000 been removed. With the detaching portion 100 of the disclub 10 head and the detached portion 200 of the discap 20, the discap is mounted on the disclub head in the longitudinal direction of as the arrow 210 does and is able to be removed in the transverse direction as the arrow 2101 does as shown in FIG. 2D.

As shown in FIG. 2A, it is the basic disclub for the ultra-long-drive of disclub golf. FIG. 2B is to illustrate the detail of the disclub head 10. There are two overlapping semi circle screws 100 and 101. There are many versatile ways to design the semi-circle screws. These two semi-circle screws 100 and 101 are preferred to be symmetrical. However, these two semi-circles have the overlaps that the actual angle of the semi-circle is larger than 180° and much less than 360°. Usually, the angle of the semi-circle is chosen to be 240°. Therefore, the preferred overlapping angle is about 30° at each end of the semi circle screw. All the above features are similar to the screw mechanism to the conventional bottle. However, as shown in FIG. 2B, it is unsymmetrical screw structure that it is not the screw of the bottle. As shown in FIG. 2C, it is the moving trajectory of the conventional bottle cap. As the cap rotates, the cap moves downward as shown by arrow 210 and upward as shown by the arrow 2100 in the longitudinal direction. As shown in FIG. 2D, it is the moving trajectory of the fitting discap 20 of the disc on the disclub head 10 for the disclub golf. The discap moves downward as shown by the arrow 210 in the longitudinal direction. However, the discap moves horizontally as shown by the arrow 2101 in the launching process. This is the reason why the disclub 1 has the ultra-long-drive capability with the cam lock being constituted of the head cam lock 103 and cap cam lock 203. There are versatile ways to design the disclub head and disc cap. As shown by the horizontal double arrow in FIG. 2D, the fundamental principles is be discap taking off horizontally as the disc rotates about 180°.

As shown in FIG. 2B, starting with the beginning root of the screw 101, the wall of the screw body is cut and removed. After the cut and remove of the wall, the screw 100 side becomes a slope 1000. The discap 20 will rotate along this slope 1000 and take offer horizontally as shown by the horizontal arrow 2101 in FIG. 2D.

Furthermore, as shown in FIG. 2B, the wall 1010 of the screw 101 side is high without any cut. Just as the club head of the golf club hits the ball, the edge 1010 will serve as the punching hammer to drive the discap adaptor 20 and the disc 2 to fly far away.

It is noted that the mount of the fitting cap 20 on the disclub head 10 is in the normal up-down direction as shown by the arrow 210 in FIG. 2D. However, the fitting discap 20 and the disc take off are in the horizontal direction as shown by the arrow 2101 in FIG. 2D. If you can sit on the top of disclub head, the fitting disc cap 20 and disc 2 just flies and cuts over your head.

As shown in FIG. 4A2 and FIG. 4B2, etc., a disclub golf Phonefly system comprises a tightening apparatus having one half of cam type locking means 103 is on the top of head 10 and another half of locking means 203 is on the cap 20.

The cam type locking means 103 on the head 10 and the cam type locking means 203 on the cap 20 are locked together with cam type locking mechanism.

FIG. 3 is the basic version of the ultra long drive disc 2. It is noted that, as shown in FIG. 4A1 and FIG. 4B1, even we mention this is the ultra long drive, the same design still can be used for the short distance and middle-range, etc, with the adjustment of the locking force between the locking cams 103 and 203. It is the locking force between the locking cams 103 and 203 determining the throwing distance of the disc 2. The error of the distance is less than 5%.

As shown in FIG. 3A, basically, the shape of the disc 2 is the convolution of the airfoil around the vertical centerline of the disc 2. In the middle, there is one cave 21 having the vertical wall. It serves as the stabilizer during the flight. The disc 2 is made of the plastic medium. The fitting disc cape 20 is installed/embedded at the edge of rim of disc 2. Due to the extreme large locking cam force, the friction force between the cam locks 103 and 203 is very large. Therefore, the fitting discap 20 has to be made of the metal such as titanium, etc. The fitting discap 20 is embedded in the plastic disc 2 during the plastic module injection.

To increase the bondage between the metal fitting discap 20 and the disc 2, there are the through holes 25 on the metal fitting discap 20. During the plastic module injection, the melted plastic flows through the through holes 25 and make the lock between the plastic disc 2 and the metal fitting discap 20.

On the internal wall, there are two semi-circle screws 200 and 201, which are matching with the screws 100 and 101 on the disclub head 10. There is one cam-type locking cam 203. As shown in FIG. 2B and FIG. 3B, the cam lock 103 on the disclub head 10 is locked with the cam lock 203 of the fitting discap 20. It is noted that the cam locks 103 and 203 can have the versatile designs. Here, we just use pin type cam lock to show one of the implementation of the locking cams.

The most important factor is the mutual fit having the targeting cam locking force to hold the fitting discap 20 and disc 2 on the disclub head 10. Since the fitting discap 20 is mounted on the rim of disc 2, swiveling the disclub 1, there is eccentric force generated by the mass of the disc 2. The eccentric force causes the disc 2 to rotate. As the rotation is about 180°, the disc 2 will take off al the same speed of the disclub head 10. Furthermore, the flying speed of disc 2 is the sum of the disclub head velocity and the acceleration of the punching-hammer force on the discap 20. The disclub art is to generate large velocity and suddenly apply the snapping punching-hammer impulse force on the discap 20 to overcome the cam locking force. The targeting design of throwing distance is determined by the cam locking force.

Both the eccentric force and the cam lock force will generate the torques which are relative to the center of the disclub head 10. As the torque generated by the eccentric force being smaller than the torque generated by the cam locking force, the fitting discap 20 and disc 2 are held on the disclub head 10 and disclub 1. The disclub golfer can swivel the disclub 1 without worrying the disc 2 dangling on the disclub head 10. In other words, there is no dangling movement of the disc 2 on the disclub head 10. As the torque generated by the eccentric force is less than the torque generated by the cam force, the disc 2 just sticks to the head of disclub 1.

However, as the torque generated by the eccentric force is larger than the torque generated by the cam lock force of 103 and 203, then the disc 2 and fitting discap 20 will start to rotate. As the rotation of the disc 2 and fitting discap 20 is about 180°, the fitting discap 20 is disengaged with the disclub head 10 in the forward direction and in the unidirectional sense as shown in FIG. 2D. The unidirectional sense means that the disclub head 10 still can push and apply the driving force to the fitting discap 20 as the speed of the fitting discap 20 being less than the speed of disclub 10. The good disclub golfer can apply the hitting punching hammer impulse to the discap 20 at this moment. However, as the speed of the fitting cap 20 being huger than the speed of disclub 10, the fitting discap 20 disengages with the driving disclub head 10 and takes off to fly in the sky. With the hitting punching hammer impulse, the impulse energy will speed up the disc 2 that the flying speed of disc 2 can be larger than the tangent velocity of disclub head 10.

Therefore, the torque of the cam lock determines the range of the disc 2 flying distance. To have the different flying distance, we just change the torque of the cam lock, then we have the different flying distance. In other words, being similar to the set of golf club, the disclub of disc golf also has a set of disclubs and a set of discs. In the set of disclub, different disclub head 10 has the different cam lock force with the standard fitting discap 20s as shown in FIG. 71B.

Furthermore, we can have the set of long-drive disc 2. The throwing distance is dominated by the cam locking force unless the disclub golfer is very good expert to apply the hitting punch impulse force. Therefore, there are a set of disclubs and discs having the different locking cam forces. In the set of long-drive disc 2, different long-drive disc 2 has the different cam lock with the standard disclub head 10. In the set of discap, different discap 20 has the different cam lock force with the standard disclub 10s as shown in FIG. 71A. In the above combination, we can design the set of long -drive disc 2 matching with the set of long-drive disclub 1. There is a very large commercial chance in the set of disclubs and the discs 2.

FIG. 4A1, FIG. 4A2, FIG. 4B1, FIG. 4B2, FIG. 4B3 and FIG. 4B4 give the detailed structure description of the disclub head 10 and the fitting discap 20. FIG. 4A1 and FIG. 4A2 is the detailed structure of the disclub head 10. As shown in the disclub 10 has two opposite semi-circle screw 100 and 101. The semi-circle has the angle in a range about 240°. To reduce the height of the disclub head 10, it might use three one-third circles and even four-quarter circles, etc. However, all of them still follow the same principle of the two semi-circles. It just makes the different cut portions in the wall. However, the principle is still the same, i.e., as the disc 2 rotates about 180°, the fitting discap 2 needs to disengage with the disclub head 10 in the horizontal direction and in unidirectional sense. Now, we jest make the detailed description of the two semi-circles case, i.e., 2-(½)-circle case. However, this description still applies to the multiple n, n-(1/n)-circle case.

As shown in FIG. 4A1 and FIG. 4A2, the fundamental structure of the disclub head is a screw. There is the cut and removal of the partial wall of the disclub. This cut and removal can have many different ways as long as it can perform the horizontal disengagement of the fitting discap 20 and disclub head 10 in the horizontal unidirectional sense. One good choice is to have the cut portion starting at the beginning tip of the semi-circle screw 101. The cut starts from the edge 1010 and stop at the semi-circle screw 100. Then the cut continues along the root of the semi-circle, 100 and runs about 180 degrees. There is the lock flange rim 102 to stop the rotation of discap 20. As the fitting discap 20 rotates, it will stop with the cap bottom edge 2012 locking with the top edge of stop flange rim 102. At the same position, the top edge 1010 locking with the ceiling of discap 20, too.

FIG. 4B1 and FIG. 4B2 are to show the details of the fitting discap 20. During the swivel of disclub 1, the fitting discap 20 will rotates 180° together with the disc 2. As shown in FIG. 4B2, there is the cut portion 2000 to have the horizontal disengagement as shown by the horizontal arrow 2101 in FIG. 2D. As the disc 2 rotates about 180°, this cut portion 2000 in FIG. 4B2 matches with the cut and removal portion 1000 as shown in FIG. 4A2. The fitting discap 20 and the driving disclub head 10 can disengage in the horizontal unidirectional sense. At the horizontal unidirectional disengage position, the edge 2012 of disc 2 matches the edge 1010; the cut edge 2000 of the fitting discap 20 matches with the cut edge 1000 of disclub head 10. At the horizontal unidirectional disengage position, the edge 2012 of disc 2 can be pushed by the edge 1010 of disclub head. There is no overlapping between the cut edge 2000 of the fitting discap 20 and the cut edge 1000 of disclub head 10. Therefore, the fitting discap 20 can be driven to speedup in the unidirectional forward direction.

Furthermore, during the fitting discap 20 rotating, the screw 200 of the fitting discap 20 rides on the screw 100 of the disclub head 10 with the cutting edge 2000 overlapping with the cutting edge 1000. The disclub head 10 pushes the fitting discap 20 moving upward. The moving upward momentum will help the cutting edge 2000 to slide over the cutting edge 1000 in the disengaging process.

As shown in FIG. 4B1 and FIG. 4A1, the cam lock 203 of discap 20 is locked with the cam lock 103 of the disclub head 10 at the initial mounting position. As shown in FIG. 4A2, the cam lock 103 is mounted on the bottom base and pointing upward. As shown in FIG. 4B2, the cam lock 203 is mounted on the ceiling of the discap 20 and pointing downward. There is overlapping contact between the cam locks 103 and 203. With the overlapping contact, the cam lock operation is generated. The system design of the disclub 10 and disc 20 is to have the cam lock in the locked position as the fitting discap 20 is at the final tighten position with the disclub head 10. Therefore, the cam locking force works together with the screw tightening squeeze force together to lock the discap 20 with the disclub head 10.

There are versatile cam lock designs depending on the force requirement of the cant lock. As shown in FIG. 4A1, FIG. 4A2, FIG. 4B1 and FIG. 4B2, the cam lock is based on the elasticity of the shaft of the cam lock 103 and/or the elasticity of the shaft of the cam lock 203. The cam lock force is very strong that it is suitable for the ultra -long fly distance. For the middle-range distance, as shown in FIG. 4B3, there is the elasticity material 203e serving as the cam lock mechanism. For the short-range distance, as shown in FIG. 4B4, there is the spring 203s serving as the cam lock mechanism.

To make the side-by-side comparison between the driving disclub head 10 and the fitting discap 20, as shown in the FIG. 5A, and FIG. 5B, the top view, side exposed view and side shaded view of the disclub head 10 are illustrated. As shown in the FIG. 6A and FIG. 6B, the bottom view, side exposed view and side shaded view of discap 20 are illustrated. In the exposed elevation view of FIG. 6A, the fitting discap 20 is mounted on the driving disclub head 10 to illustrate the fitting discap 20 and the driving disclub head 10 in the tighten position.

As shown in the FIG. 6A, in the bottom view of the fitting discap 20, the cam lock 203 of the fitting discap 20 rotates and slides over the cam lock 103 of the driving disclub head 10. It is noted that the cam force needs to be very strong that the friction force is very large. The friction endurable metal such as the titanium is needed for both the disclub head 10 and fitting discap 20.

In FIG. 7A and FIG. 7B, they illustrate the rotational views of the ultra-long-drive disc. FIG. 7A is the disc 2 in the mounting position as shown in FIG. 1A; the callout is to show the enlarged view of the fitting discap 20 at this position. The fitting discap 20 can be designed to be antenna having the RFID chip being mounted on it and/or to be the part of the loop antenna. FIG. 7B is the disc 2 in the launching position as shown in FIG. 1B; the callout is to show the enlarged view of the fitting cap 20 at this position. In FIG. 7A, it further illustrate that the RFID and Antenna can be mounted on the top of the fitting cap 20 during the plastic module injection process. To reduce the turbulent flow effect to increase the flying distance, the surface of the ultra-long-drive disc 2 can be notched as the sharkskin, etc. which will be discussed in the later sections. This sharkskin, etc. can be embedded in the plastic injection module. Furthermore, the loop antenna for the RFID, cellular phone, GPS, satellite, etc can be embedded in the rim of the ultra-long-drive disc. This ultra-long-drive is a carrier and platform of the high-tech facilities.

In the following figures of FIG. 8, FIG. 9, FIG. 10A and FIG. 10B, etc., we will show an operational apparatus comprising a tightening apparatus. The tightening apparatus comprises a head, i.e. disclub head 10, and a cap, i.e. discap 20. The head and cap are coupled with screw means. At the end of tighten process, the tightening apparatus is locked with the cam type locking means 103 and 203 or 2031 and 2032, etc.

To have the ultra-long-drive capability, we can increase the number of cam locks to increase the cam lock force to increase the long drive distance. As shown in FIG. 8, there is only one discap cam lock 203 and there is only one head cam lock 103. As shown by the solid shaded circle, the cam lock 203 is in the pre-lock position. As shown by the arrow and the dotted circle, the cam lock 203 is moved into the post-lock position. Increasing the number of the cam lock will increase the total lock force and increase the ultra-long-drive distance. As shown in FIG. 9, the cam lock number increases to be two. In the lining discap 20, there are two cam locks 2031 and 2032 in the pre-lock position. In the driving disclub head, there are two cam locks 1031 and 1032 in the pre-lock position. The increment of the total cam lock force is non-linear function of the increase the number of the cam lock. To increase the nonlinear cam lock force, we can increase the number of cam locks. The only requirement is all the cam locks will be "explosive release" at the same time. In other words, all the locked cam locks will be released at the same moment suddenly.

Figure 10B:
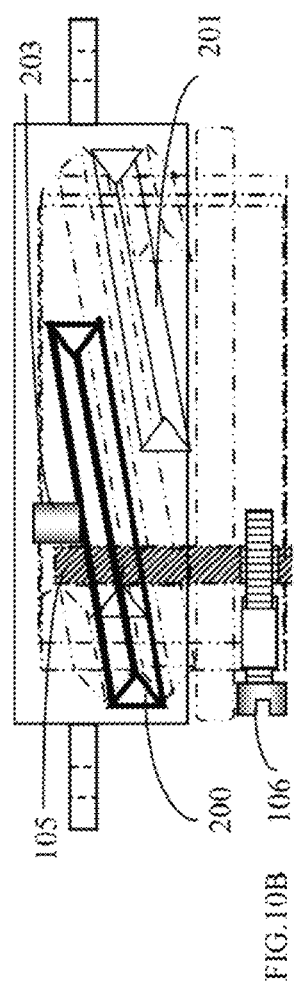

The driving distance is completely determined by the cam lock force generated by the cam locks. Different driving distance has to use different disclub having the different cam lock force. For each driving disclub, the driving distance might be varying +/−5%. However, we might use one disclub to have versatile drive distance as long as the cam lock force is adjustable. FIG. 10A and FIG. 10B show the adjustable cam lock of the adjustable-driving-distance disclub.

As shown in FIG. 10A, as the cam lock 105 is pushed out, the cam lock force will increase. There are guiding bars 107 on the both side of the cam lock 105. As shown in FIG. 10B, adjusting the screw 106, the cam lock 105 will move back or forth to adjust the cam lock force. Adjust the cam lock force, the driving distance will be adjusted accordingly.

Figures 11A, 11B:
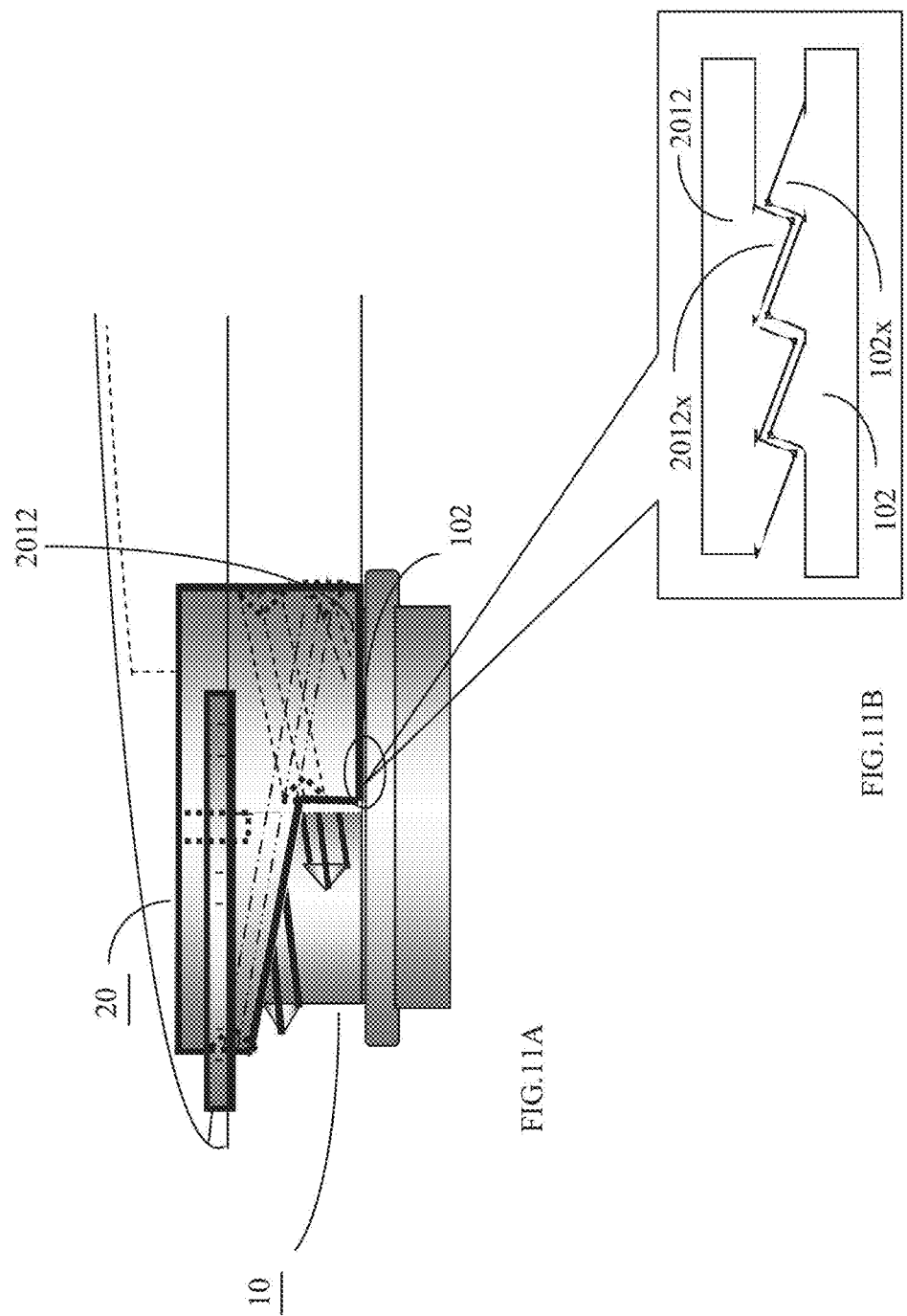

To increase the cam lock force, we can use the other mechanisms which have the same cam locking effect. The only requirement is the locking effect is at the tightening position and all the cam locks are released at the same time. In the following figures, an operational apparatus comprises the tightening apparatus having multiple options of cam mechanisms. As shown in FIG. 11A, the first option is for the tighten process being ended with an engagement of the bottom flange 102 of the screw means of the head 10 and bottom wall 2012 of the screw means of the discap 20. One of the cam type locking means 102x being located at said engagement of bottom flange 102 position of said head means 10. Another coupled cam type locking means 2012x being located at said engagement of bottom wall 2012 of said discap 20.

As shown in FIG. 12A, the second option of which said tighten process being ended with an engagement of top wall 1010 of said screw means of said head 10 and a ceiling plate of the discap 20. One portion of the cam type locking means 1010x being located at said engagement of top wall position 1010 of the head 10. Another coupled cam type locking means 2010x is located at the engagement of the ceiling plate 2010 of the discap 20.

As shown in FIG. 13A, the third option of the cam type locking means is located at end position of the screw. The cam type locking means has one-half of the cam type means 10x located at the end position of the screw of the head 10. The cam type locking means has another half 201x of the cam type means located at the end position 201 of the screw of the cap 20.

As shown in FIG. 11A, the interlocking wedges at the tightening end can serve as the cam lock mechanism. As shown in FIG. 11B, the wedges have the different length of the wedging edges. As the cap 20 is tightened, the slope of the interlocking wedges 2012x and 102x is longer that it very easy to run into the lock position. However, as the discap 20 is loosen, the slope of the interlocking wedges 2012x and 102x is much shorter that it very difficult to run out of the lock position. This is the cam lock effect. This cam lock position is at the bottom edge 2012 of the fitting discap 20 and the top edge of the stop flange 102.

Similarly, as shown in FIG. 12A, the same cam lock mechanism can be applied to the top edge 1010 of the driving disclub head 10. As shown in FIG. 12B, the wedges have the different length of the wedging edges. As the discap 20 is tightened, the slope of the interlocking wedges 2010x and 1010x is longer that it very easy to run into the lock position. However, as the discap 20 is loosen, the slope of the interlocking wedges 2010x and 1010x is much shorter that it very difficult to run out of the lock position. This is the cam lock effect. This cam lock position is at the top edge 1010x of the drive disclub head 10 and the ceiling edge of the fitting discap 20.

As shown in FIG. 13A, there is another cam lock position is at the tightening position of the discap rim 201. As shown in FIG. 13B, it shows the horizontal sectional view of the interlocking cam lock mechanism. The rim 201 having the wedge 201x of the fitting discap 20 interlocks with the disclub head 10 having the wedge 10x. The wedges have the different length of the wedging edges. As the discap 20 is tightened, the slope of the interlocking wedges 201x and 10x is longer that it very easy to run into the lock position. However, as the discap 20 is loosen, the slope of the interlocking wedges 201x and 10x is much shorter that it very difficult to run out of the lock position. This is the cam lock effect. This cam lock position is at the tightening end rim edge 10x attic drive disclub head 10 and the tightening end rim edge 201 of the fitting discap 20.

The disc 2 can fly into the unreachable and/or dangerous place to pull out the people in the dangerous situation. An operational apparatus comprises string means being carried by disc means. Pulling the string means, the disc 2 is collected. The operational apparatus has application in smart fishing.

As shown in FIG. 14A and FIG. 14B, the ultra-long-drive disc 2 can carry the fishing line or nanometer wire 31 However, due to the fast spin of the disc 2, the line 31 cannot tight to the disc 2 directly. As shown in the FIG. 14C, in the carrier 30, the end, of the line 31 is in the loop to hook up to the stub 301.

However, for the large load to pull, as shown in FIG. 14D and FIG. 72D, there is a bearing 300 mounted on the stub 301. The fishing line 31 is tight to the bearing 300 directly. The bearing reduces the friction force and the fishing line will not twist due to the disc rotation. The bearing 300 also can pull large load.

Figures 15A, 15B:
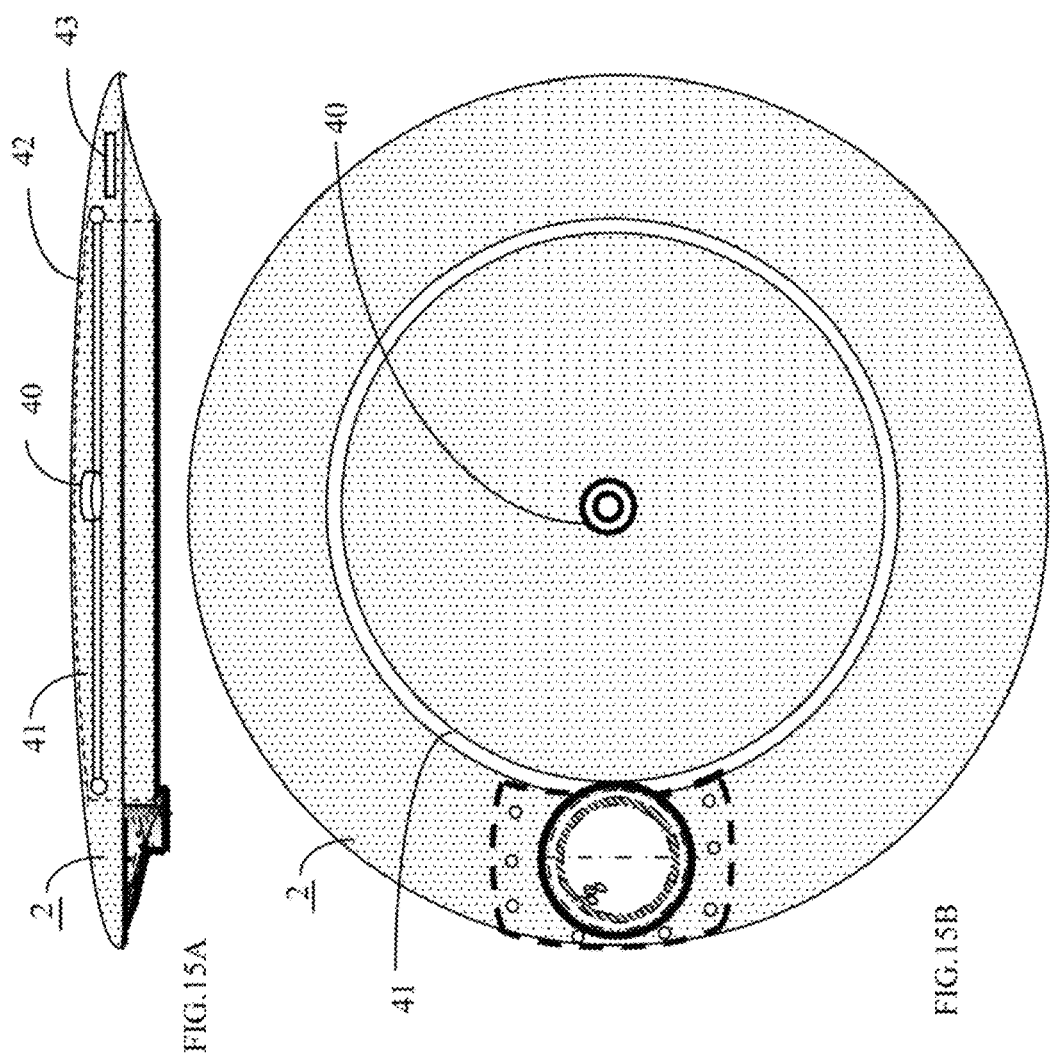

The flying disc also can observe the underwater activities, etc. As shown in FIG. 15A and FIG. 15B, the LED 41 is aligned around the edge of the concave cave. The camera 40 is mounted at the center of the disc. The surface of the disc 2 is coated with the solar cells 42. The wireless circuit PCB 43 is embedded in the triangle zone of rim.

From the release of iPhone 6, it has no new functions. It shows the new functional idea of iPhone has reached to its limit of imagination and creativity. From the desk phone to the cellular phone, it takes a long path. The mobile phone still has the phone held in the user's hand. To have the new function, the cellular should leave the user's hand. Let the bullets a while in the battlefield, let the xPhone fly, then let the disc grenade fly. Instead of using the dedicated application specific disc, it is much convenient to use the conventional cellular phone having built-in video camera to fly to take the video of the flying path. Let the phone fly a while. Let the cellular phone to fly is another domain of imagination and productivity, It is the mobile surveillance. As the phone can fly, it is to extend the phone capabilities. It is the combination of the innovation of the disc golf technology with the cellular phone technology. Therefore, the phone is named as next iPhone, x-iPhone, or just xPhone.

As shown in the following figures, an operational apparatus comprises a phone-watch dual pair apparatus. The phone-watch dual pair apparatus comprises a phone means 51 as shown in FIG. 16A and a watch means 6 as shown in FIG. 19A. The phone 51 and watch 6 are connected wirelessly. The phone 51 makes observations of remote place and sending data to the watch 6. Viewing the watch 6, it is able to monitor the activities of the remote place.

As shown in FIG. 16A. and FIG. 16B, the cellular phone 51 is mounted in the transparent water-seal box 50. The camera 510 of the cellular phone 51 takes the video and/or picture. The carrier 30 carries the fishing line 31. Now, we invent the new cellular phone 51 which can transmit the images or video back to the watch 6 of the caller.

Today, the cellular phone only has the capability to take the picture by the user only. There is no function to transmit the video camera to the other caller. There is no function for the caller to get the video from the camera of this cellular phone. In other words, there is no linkage between the communication and camera. As the phone fly, we need to add the "remote activate" flying phone capability. The capability to get the data storage and video, etc, is referred to be the "cloud computation" of the mobile phone.

Under the remote control of the caller, as shown in FIG. 16B, the camera 510 can send the video back to the watch 6 of the caller with real time. This video sending back to the caller is the basic new function of "cloud computation" we need to add to the xPhone. Furthermore, the water-seal microphone window 511 still can transmit the underwater voice into the water-seal box 50.

Furthermore, to increase the portability of the ultra-long-drive disc, as shown in FIG. 16C and FIG. 16D, the disc 2 can be shrunken to be the small disc 2s to carry easily.

For the disc cellular phone, as shown in FIG. 17A, the liquid crystal film 2L can attach to the top of the disc 2 or embedded and sealed in the disk 2. The PCB board 2P can be installed in the triangle zone of the disc 2.

As shown in FIG. 18A and FIG. 18B, an operational apparatus, the string means 31 is delivered by a motor 320. The motor 320 comprises the rotating coils 3201 and fixed magnets 3202. The rotating coils 3201 is sandwiched by said fixed magnets 3200 and 3202. A motor control circuit 321 drives current through the rotating coils 3201 that the plate containing said rotating coils 3201 rotates.

With the above basic building block of disc phone, etc, we can integrate the disclub with disc phone to have the xPhone system. To increase the disc 2 flying distance, the fishing line 31 cannot be dragged by the disc 2. The fishing line 31 must be actively delivered to the disc 2. As shown in the FIG. 18A, since the disc flies very fast, the reel 310 is automatically rotating to deliver the fishing line 31. The motor 320 is controlled by the controller 321 to rotate. As shown in FIG. 18A and FIG. 18B, the motor 320 is constituted of the fixed magnet pole 3200, the moving coil array 3201, and the fixed magnet poles 3200 and 3202. The controller 321 drives the current into the coil 3201 and the induced magnetic field interfered with the field of magnets 3200 and 3202 that the coil array 3201 is forced to rotate. The reel 310 is in the same axis of the coil array 3201 that the reel 310 rotates to deliver the fishing line 31 actively. The ring 311 is the guider of the wire 31 to rip off the wire from the reel 310 to have the active delivery of the wire 31. The clamp 323 is to mount the motor on the disclub 1.

Figure 19C:
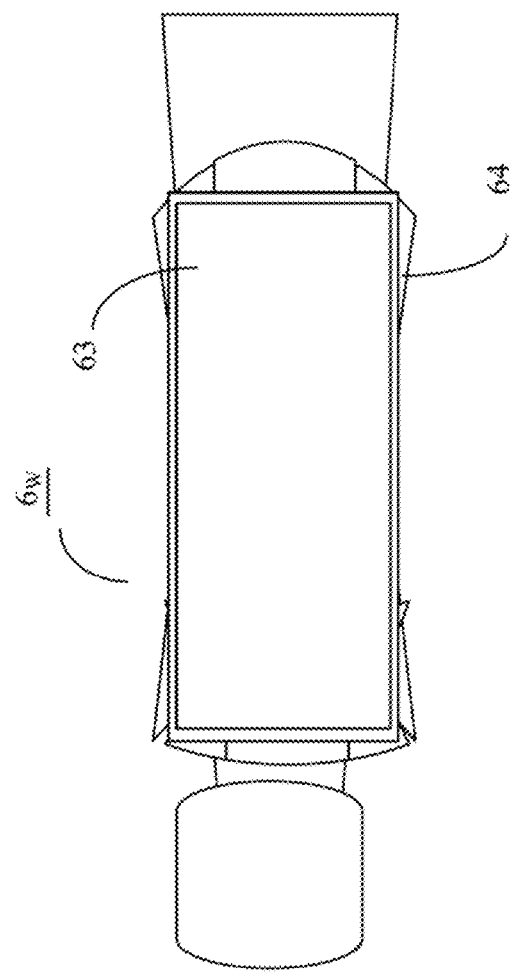

As shown in FIG. 19A and FIG. 19B, to watch and monitor the underwater fishing activity, etc, we need to have the remote monitoring companion watch 6. The flat panel 60 is the LCD to monitor the underwater fishing activity, etc. The flat panel 60 is mounted on the wrist or the pole of the disclub 1 with the clamping set 61. The flat panel 60 is mounted on the universal joint made of cup 601 and ball 610. The ball 610 is mounted on the curved link 611. The curved link 611 is hinged to the clamper 612. The clamper 612 will clamp the pole of the disclub 1 or clamp on the wrist. Furthermore, as shown in FIG. 19C, it is the wrist-wrapper type watch/monitor $6_W$ for the dual-Phone-Watch-Pair. The wrist-wrapper type watch/monitor $6_W$ can be implemented with the flexible LCD screen 63. The wrist wrapper 64 wrapping around the wrist. It is much individuality that the young kids will like such kind style design and style.

As shown in FIG. 20A and FIG. 20B, an operational apparatus comprises phone-watch dual pair 5 and 6, disclub golf means which comprising disc means 2 and disclub means 1. The phone of the phone-watch dual pair apparatus 5 is carried by the disc 2 to far distance. The watch 6 of the phone-watch dual pair apparatus is viewed to monitor activities. The video or image is transmitted back with signals being transmitted by the phone 5.

As shown in FIG. 20A and FIG. 20B, the flying-phone xPhone system is the merge of the innovations of cellular phone having the cloud computation capability and the long-drive disclub technology together to have the flying phone applications such as smart fishing, golfishing, etc. In FIG. 20A, the long-drive disc 2 is mounted on the disclub head 10. The cellular phone xPhone 5 has video and image transmitted to monitoring watch 6 or $6_W$ which is mounted on the wrist of caller. The line deliver 32 is mounted at the disc club 1. The lure 35 is hanging below the long-drive disc 2. Swiveling the disclub 1, the disc 2 flies far away and line deliver 32 automatic delivers the line 31. The watch 6 or $6_W$ is worn on the wrist to make the close watch of the underwater fishing activities. As shown in FIG. 20B, the long-drive disc 2 falls on the water, the fishing man monitors the watch 6 or $6_W$ to make the remote monitoring of the underwater fishing activities.

As shown in FIG. 21A and FIG. 21B, the watch 6 is mounted on the pole of disclub 1. The techniques of the Smart Fishing are the most advanced cutting edge technologies. As shown in FIG. 22A, FIG. 22B, FIG. 23A, and FIG. 23B, it can be simplified and reduced to the conventional disc applications, too. However, the fantastic of the disclub disc is that it can be used in both the disclub golf and disc golf.

FIG. 22A and FIG. 22B are the system view of the golfishing application of disc golf FIG. 22A is the disc 2 being held with a hand and the watch/monitor 6 or $6_W$ being mounted on the wrist. FIG. 22B is the disk flying fir away, falling and floating on the water; the disc golfer watches and monitors the underwater fishing activities with the watch/monitor 6 or $6_W$ being mounted on the club.

FIG. 23A and FIG. 23B are the system view of the application of dual-Phone-Watch Pair. FIG. 23A is the Phone 5 being held with a hand and the watch/monitor 6 or $6_W$ being mounted on the wrist. FIG. 23B is the Phone 5 being far away; the owner watches and monitors the activities with the watch/monitor 6 or $6_W$ being mounted on the wrist.

As shown in FIG. 24A, FIG. 24B, FIG. 25A, FIG. 25B, FIG. 25A1, FIG. 25A2, FIG. 25B1, FIG. 25B2, FIG. 25C, FIG. 25D, FIG. 25E, FIG. 26A, FIG. 26B, FIG. 26A1, FIG. 26A2, FIG. 26B1, FIG. 26B2, FIG. 27A, FIG. 27E and FIG. 28, etc., the long-drive disc can have the cloud computation capability to monitor the ecosystem and environment. In the forest, the camera will hang up on the tree to watch and monitor the activities under the tree.

FIG. 24A shows the ecosystem long-drive disc. On the surface of golf ring $2_{RS}$ is coated with the solar cell 38 to generate be electric energy. The xPhone and video camera set 37 is hanged with strings. The expandable balloon 39 can be expanded under the remote control command.

FIG. 25A, FIG. 23B and FIG. 25C, etc. are the dual-Phone-Watch-Pair working as the remote surveillance and/or game mode of the monitor-controller embedded in the conventional disc of disc golf. FIG. 26A and FIG. 26B are the dual -Phone-Watch-Pair working as the remote surveillance and/or game mode of the monitor-controller embedded in the disclub of disc golf. As shown in FIG. 25C, the dual-Phone-Watch-Pair can serve as the pair of the Disc-Phone-Monitor and the Watch-Keyboard for the kids to study. The study tool and the playing tool are unified the the kids. It is the exciting experience and life style for the kids. As shown in FIG. 25A, FIG. 25B, FIG. 26A, and FIG 26B, the phone $2_{PH}$ of the dual-Phone-Watch-Pair is embedded in the disc. The printed circuit board $2b$ is embedded in the rim of disc. The LCD display $2c$ is at the ceiling of the disc $2_{PH}$. The solar cell array $2s$ is on the top of the phone $2_{PH}$ to supply the energy to phone $2_{pH}$ and watch monitor $2_{WM}$. As shown in FIG. 25A, the watch $2_{WM}$ is attached and connected with the wire connection. As shown in FIG. 25A1 and FIG. 25A2, the watch $2_{WM}$ detached from the disc that the phone $2_{PH}$ and watch monitor $2_{WM}$ are connected with wireless connection. To speed up the data transmission, as the phone $2_{PH}$ detects the watch $2_{WM}$ connected to the disc directly, the phone $2_{PH}$ will switch back to the wire connection.

As shown in FIG. 25A1, FIG. 25B1, FIG. 25A2, FIG. 25B2, FIG. 26A1, FIG. 26B1, FIG. 26A2 and FIG. 26B2, etc., the watch $2_{WM}$ is removed from the phone $2_{PH}$, the phone $2_{PH}$ connects with watch $2_{WM}$ with wireless connection. The video camera $2v$ takes the video movie and picture of the remote site and transmits to the watch $2_{WM}$. Viewing the remote video picture on the watch $2_{WM}$, the commands can be issued to control the actions and activities of the phone $2_{PH}$. This is the mobile surveillance system. However, the phone $2_{PH}$ can have the "cloud computation" capability to do the signal process, storage the data and retrieved data, etc.

As shown in FIG. 25A, FIG. 25A1, FIG. 26A, FIG. 26A1 and FIG. 25D, the hanging ear 250 can be flipped. As the disc phone 2PH is hanged at the top of tree as shown in FIG. 28, the hanging ear 250 is tightened with a tree to hang on the tree. As shown in FIG. 25E, the disc $2_{UC}$ has the universal video camera that it can rotate to take the video and image in any direction according to the pre-setting or remote commands, etc.

Figure 27B:
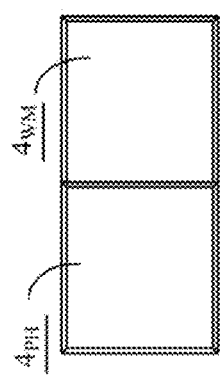
Figure 27C:
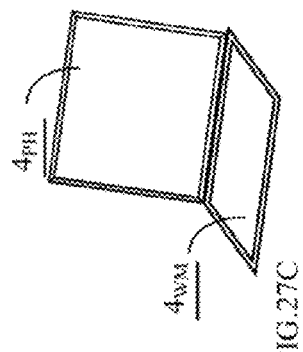
Figure 27D:
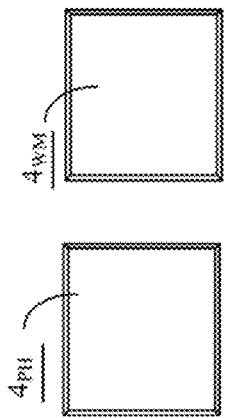
Figure 27A:
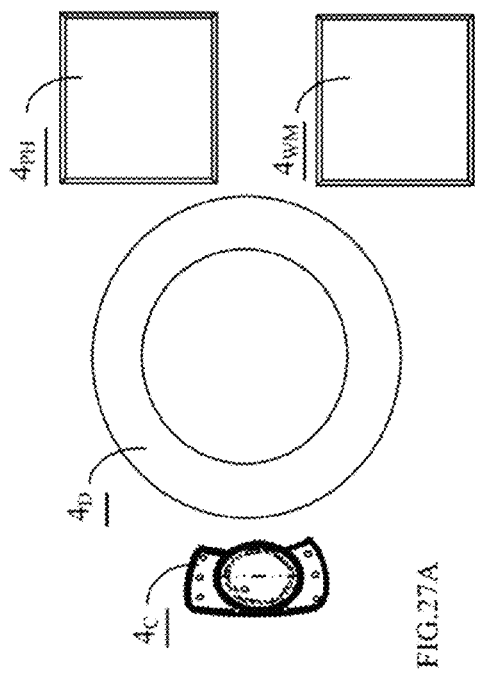

As shown in FIG. 27A, FIG. 27B, FIG. 27C, FIG. 27D, and FIG. 27E, it shows the versatile applications with the basic components of the cap $4_C$, disc $4_D$, phone $4_{PH}$ and watch $4_{WM}$ of the dual-Phone-Watch pair in the FIG. 27A. As shown in the FIG. 27B, the phone $4_{PH}$, and watch $4_{WM}$ of the dual-Phone-Watch-pair can be merged to be one big screen phone to work. Furthermore, each screen can display different image and the well-trained eyes can synthesize them to be 3D image/video. This is very important for the silent attack in the military applications.

Figure 27E:
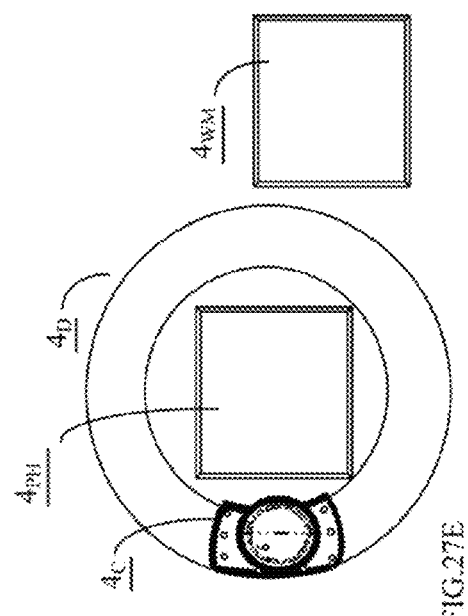

As shown in FIG. 27C, the phone $4_{PH}$ and watch $4_{WM}$ of the dual-Phone-Watch-pair can be worked as the screen and keyboard pair. As shown in FIG. 27D, the phone $4_{PH}$ and watch $4_{WM}$ of the dual-Phone-Watch-pair can be worked as the display smelt and game controller, etc. As shown in FIG. 27E, the phone $4_{PH}$ and watch $4_{WM}$ of the dual-Phone -Watch-pair can be worked as remote monitor to monitor the under-water fishing activities monitor in the smart fishing of golfishing, etc.

Comparing FIG. 27B and FIG. 27D, it shows that we can have the flexibility to merge two phones of the dual -phone-watch-pair to be single phone to have large screen and we can separate the two phones for easy to carry. It will not only reduce the cost of the big screen but also increase the flexibility to carry in pocket. It is innovation to be the first time to apply the dual-PC techniques to the mobile phone. The xPhone not only increases the new dimension of Phone-fly but also reverses the wrong "bigger and bigger screen" development path set up by the iPhone of Apple.

As shown in FIG. 28, the helicopter 49 cannot fly too close. Then the disc $4_{PH}$ or golf ring $2_{RS}$ is launched. The disc $4_{PH}$ or golf ring $2_{RS}$ flies and hangs up on the tree. The xPhone and video camera set 37 is hanged with strings and point toward the ground. The xPhone and video camera set, etc 37 monitoring the activities beneath the tree. The xPhone and video camera set 37 or disc $4_{PH}$ has the cloud computation capability to store and processing the monitored data. The caller monitors the companion watch 6 or $4_{WM}$ and sends the commands to the xPhone 37 or $4_{PH}$. The monitoring watch 6 can retrieve the data from the cloud computation disc $4_{PH}$ or $2_{RS}$. This merges of the innovations of the disclub, cellular phone, and cloud computation. The expandable balloon 39 can expand to carry the golf ring $2_{RS}$ in the sky that the helicopter 49 can pick up As shown in FIG. 29, it shows the three level architecture of the cloud-computation and internet access with the xPhone and disc Pone, etc. The 1st level is the structure level. It is constituted of the Antenna, Microphone, Camera, Sensors, GPS, Cellular Phone, WiFi, RFID, LED, TV, Display, Speaker, Buzzer, PMU Power management, Wireless Charger, USB Charger, Battery Charger and Battery Power Management, etc. The 2nd Level includes the Dual-Cellular Smart Phone, Phone-Watch Pair Smart Phone, Flying Disc Smart Phone, and Intra-Cellular Phone, etc. The 3rd Level is the Cloud Computation and Internet Access, etc.

As shown in FIG. 30, it shows the functions listed on the control panel. They are the new functions for the advanced xPhone and cloud computation. The functions includes Remote Camera, Local Camera, Remote Video, Local Video, Remote LED, Local LED, Remote Flash Light, Local flash Light, Remote Microphone, Local Microphone, Remote Speaker, Local Speaker, Inter-WiFi Mode, Intra-WiFi Mode, Inter-Cellular Mode, Intra-Cellular Mode, Internet Access, Smart On-Line Pay, Remote Zoom In, Local Zoom In, Remote Zoom Out, Local Zoom Out, Remote Auto Focus, Local Auto Focus, Remote Recorder, Local Recorder, Remote Blood Pressure, Local Blood Pressure, Remote Temperature, Local Temperature, Remote Measurement, Local Measurement, Remote Heart Beat, Local Heart Beat, Remote Walk Count, Local Walk Count, Remote Volume, Local Volume, Cloud Computation, etc.

As shown in FIG. 31, it is the block diagram of the xPhone and Cloud Computation for the ultra-long-drive disc and disclub golf. It includes the Antenna Switch, RF & Analog Front End, RF Transceiver, PMU, Communication Processor, Memory, Video/Camera, LCD/TV Display, Microphone, Speaker, Codec, Application Processor, PMU, GPS, Wi-Fi, BT, POP Memory, Sensor, Electronic Compass, Accelerometer, Gyroscope and Touch Screen, etc.

As shown in FIG. 32, it is the block diagram for general platform of the dual-cellular-Phone pair and or Phone -Watch pair, etc. For the different application, different portion of the platform will be activated or included in the application-specified design. As shown in FIG. 33, there is the application specific simplified design. In FIG. 33, it is the application of the video data going through the Wi-Fi Channel. Correspondingly, a lot of other modules can be either eliminated or powered down to save the money or energy.

As shown in FIG. 29 and FIG. 31, there are different ways to supply the powers and power management. The power can use USB charger, Wireless Charger, Solar Cell charger and Micro inverter, etc. As shown in FIG. 34A, for the xPhone or Disc cellular phone 5 charging uses the flat panel wireless charger 70. As shown in FIG. 34B, for the Disc Phone having the antenna embedded in the curve plate, we can use the curved wireless charger 71 to increase the charging efficiency. As shown in FIG. 34C, for the general wireless charger, we can use the wireless charge box 72.

As the torque generated by the swing is larger than the torque of cam lock, the disc 2 starts to rotate and launch to fly with the same speed of disclub head. To increase the flying distance, for the same toque of cam lock, we want to use the bended disclub. As shown in FIG. 35A and FIG. 35C, swiveling the bended disclub 19, the disc 2 rotates due to the horizontal component $V_H$ of velocity V only. Only the torque induced by the horizontal component $V_H$ of velocity V will overcome the cam lock. However, as shown in FIG. 35B, as the disc 2 takes off from the disclub head, it will have the same speed V of the disclub. In other words, even with the same disclub, as the club is bended, the disc flies distance will increase.

FIG. 36A and FIG. 36B show the adjustable disclub 19. As shown in FIG. 36A, adjusting the joint 191, the club length can be adjusted. Adjusting the joint 190, the bend angle of club can be adjusted.

If we continue increasing the bend angle to be 90°, it is equivalent to the long drive of the golf ball with the ball being located at the pin. As shown in FIG. 37, the disc pin 10p is constituted of the disclub head 10 and the stand pole 111. The joint 114 can be adjusted for the different launch angle. Swiveling the conventional club 17, the club head hits on the disc 2 and the disc 2 taking of from the disclub pin 10p.

FIG. 38 shows another alternative design of disc pin 12p. The fork 112 clamps the disc 2. The tension adjusted bar 1123 is to adjust the clamping force of the fork 112. The joint 113 can be adjusted for the diffront launch angle. Swiveling the conventional club 17, the club head hits on the disc 2 and the disc 2 takes off from the disclub pin 12p.

All the distance records of the golf ball and golf disc show that the throwing distance of golf disc is about one -half of the throwing distance golf ball. FIG. 39B shows the core technology problem of the disc. As we plot the trajectory in the elevation view, we can show the problem. As shown in FIG. 39A, the trajectory is almost symmetrical to the highest point. However, as shown in FIG. 39B, as the disc flies to the highest point, it suddenly crashes and falls to the ground immediately. That explains why all the record of golf disc is just about one-half of the golf ball.

However, according to physical law, as shown in FIG. 39A, for the golf ball, the horizontal speed is kept about the same that the trajectory is symmetric to the highest point. Therefore, as shown in FIG. 39B, even at the highest point, there should have enough horizontal speed. Why the disc suddenly crashes and falls down to the ground? The only explanation is that the turbulent flow causes the disaster.

Figures 42A, 42B:
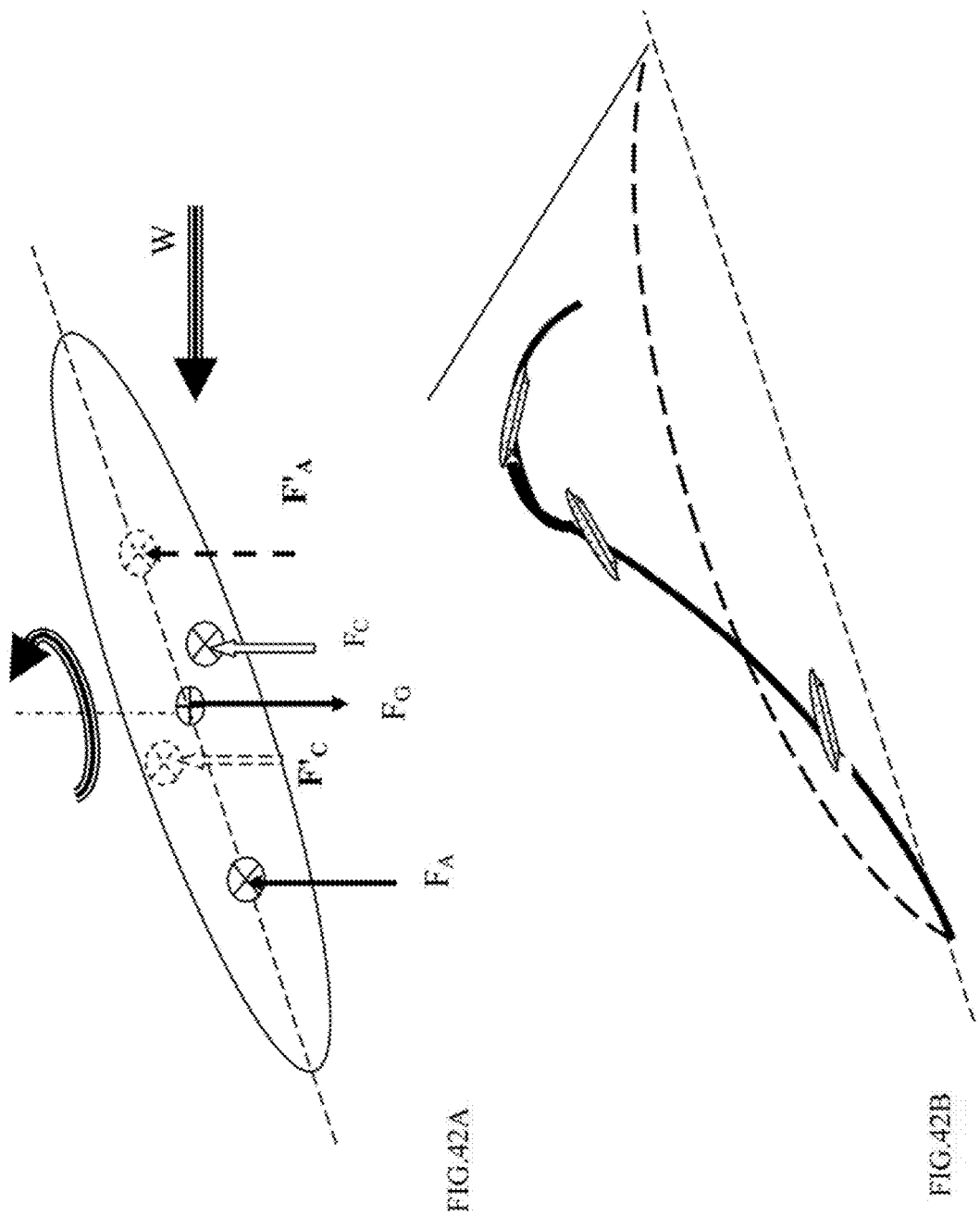

As shown in the following figures, we will show an operational apparatus comprises flying rotating apparatus. The flying rotating apparatus comprises versatile flow guiding means in the flow. The flow guiding means can reduce the turbulent flow as shown in FIG. 40A and FIG. 41A and/or modifying pressure distributed on the flying rotating apparatus. As shown in FIG. 42A and FIG. 45A, the pressure generating force being located at a position of 90-degree phase advanced in a direction of the flow guiding means. The pressure generating force generates the Coriolis force behind gravity center of the flying rotating apparatus. The Coriolis force generating moment causes the flying rotating apparatus tilting downward in forward direction to compensate the increment of attack angle.

To increase the disc 2 flying distance, we need to reduce the turbulent flow generated by the disc 2. As shown in FIG. 40A, the surface of disc 2 is notched with the tiny scratch of the concentric ring 2r. These tiny scratch 2r will generate the waves canceling each other that the boundary layer will not grow. As the boundary layer does not grow, the turbulent flow will not generate. The turbulent flow generation is due to the boundary layer grows too thick into the streamlines. The free flow interacts with the boundary having the large pressure difference between the free stream and boundary layer. Finally, the streamlines crash and the turbulent flow is generated. At beginning, the formation of boundary layer is due to the wave perturbations and waves generated at the solid face. As the wave strings propagate into the fluid streams, the boundary is formed. We want to destroy the wave strings that the boundary will not grow further. We add more sources of the wave strings and the wave strings canceling each other due to the superposition. Therefore, the boundary layer no more grows due to the mutual cancellation and the elimination of the wave strings. As shown in FIG. 39C, with the concentric ring 2r combining the other techniques together, the disc $2_{FC}$ trajectory becomes more symmetric and the disc flying distance increases a lot.

As shown in FIG. 41A and FIG. 41B, the same turbulence reduction principle is applied to the conventional disc $2_{FC}$. The concentric hey scratches are marked on the surface of the conventional disc $2_{FC}$ to reduce the turbulent flow.

As shown in FIG. 42A, the gravity force $F_G$ is located at the center of gravity. Due to the flying disc is spinning and flies, there is Coriolis force $F_C$ generated by the rotation of the spin and the aerodynamic force $F_A$.

As shown by the solid line, aerodynamic force is located behind the gravity force $F_G$. As the wind speed increases, the aerodynamic force $F_A$ increases; the angle of attack decreases and the aerodynamic force $F_A$ decreases. As the wind speed decreases, the aerodynamic force $F_A$ decreases; the angle of attack increases and the aerodynamic force $F_A$ increases. For the aerodynamic force $F_A$ which is located behind the gravity force $F_G$, this is the stable condition.

On the contradictory, as shown by the dotted line, the aerodynamic force $F'_A$ is located before the gravity force $F_G$. As the relative wind W speed increases, the aerodynamic force $F'_A$ increases, the angle of attack increases, and the aerodynamic force $F'_A$ increases further. For the aerodynamic force $F'_A$ which is located before the gravity force $F_G$, this is the unstable condition.

Furthermore. for the disc 2 having the vertical cave, the position of the aerodynamic force $F_A$ is the function of the relative wind speed W, i.e., (disc 2 speed—absolute wind speed). As the disc 2. speed is high, the aerodynamic force $F_A$ is located behind the gravity force $F_G$. The disc 2 is stable and turning left. As the disc 2 speed is slow, the aerodynamic force $F'_A$ is located before the gravity force $F_G$. The disc 2 is unstable, turning right and crashes to fall on the ground as shown in FIG. 39B. This is the essential characteristics of the disaster problem of the conventional disc. Furthermore, the spin of disc 2 serves as gyroscope that the aptitude of the disc is kept to have the angular momentum to fix in one direction. The decreasing aerodynamic force is running into the unstable condition. It makes the disaster of the conventional disc.

At beginning, the disc 2 has the aerodynamic force $F_A$ is located behind the gravity force $F_G$, as shown in FIG. 42B, the trajectory is wavering to the left. Later, as the speed of disc 2 decreases, the angle of attack increases and the aerodynamic force $F_A$ moves forward As shown in FIG. 42B, the trajectory is wavering to the right.

Figure 43A:
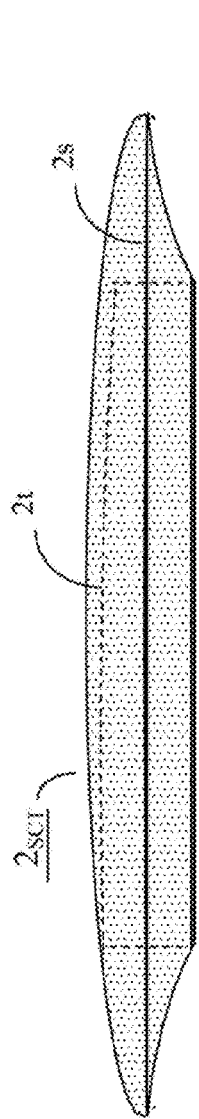
Figure 43B:
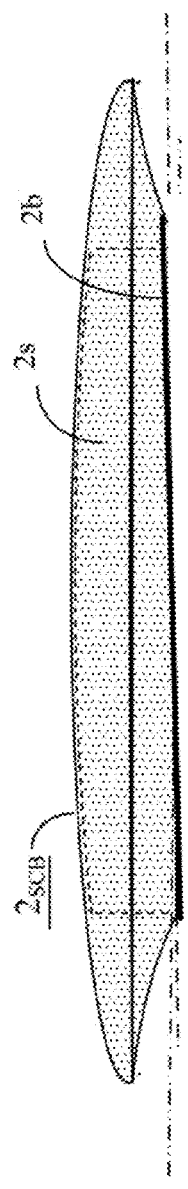

In the real world, the disc speed 2 continues decreasing, To compensate the decrement of the speed of disc 2, as shown in FIG. 43A and FIG. 43B, the depth of the concave is uneven. In FIG. 43A, the uneven concave cave is caused by the tilt of the upper roof $2t$ of the disc $2_{SCT}$. In FIG. 43B, the uneven concave cave is caused by the tilt of the bottom rim $2b$ of the disc $2_{SCB}$.

Figure 44A:
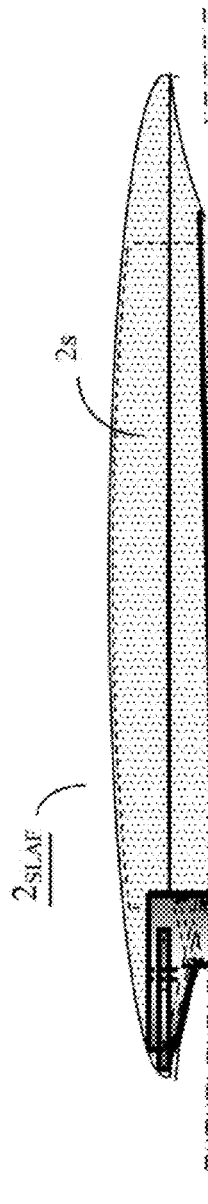
Figure 44B:
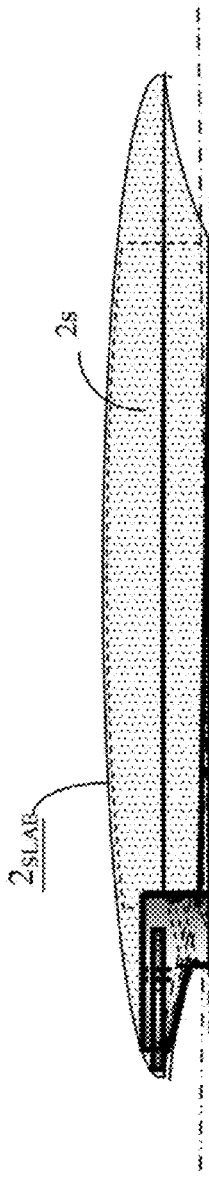

As shown in FIG. 44A, the ultra-long-drive disc $2_{SLAP}$ has the front right tilt of the compensation. As shown in FIG. 44B, the ultra-long-drive disc $2_{SLAB}$ has the backend left tilt of the compensation.

Furthermore, we can use the wind-induced force effect to change the aptitude of the flying disc. The wind-induced force effect of $F_{T1}$ and $F_{T2}$ is discovered by Dr. Tarng's Family that we name it as Tarngs 1st Force and Tarngs 2nd Force. As shown in FIG. 45A, assuming there is a lift force $F_{T1}$ on the top of disc $2_{T1}$ and we name this tree to be Tarngs 1st Force $F_{T1}$. The Tarngs 1st Force not only counterbalances with the Coriolis force $F_{AC}$ generated by the aerodynamic force $F_A$ but also generated another Coriolis force $F_{T1C}$ being located after the center of gravity $F_G$. As wind W increases, the Tarngs 1st Force $F_{T1}$ increases; the Coriolis force $F_{T1C}$ increase and the angle of attack decreases. This is the negative feedback stability operation. Furthermore, the angular momentum of the disc $2_{T1}$ will tilt forward due to the Coriolis force $F_{T1C}$. As shown in FIG. 45B, Shows the trajectory of flying disc with the compensation of Tarngs 1st Force $F_{T1}$.

Furthermore, it is noted that, after the disc falls, there is the diving angle and the potential energy can convert to be the dynamic energy that the disc can drift in the air. This drift characteristic can increase the disc flying distance a lot. Today, the conventional disc is just stall in the air at the peak of trajectory and falls down as the parachute does or crashes to the ground.

To implement the Tarngs 1st fount, as shown in FIG. 46A, there are a lot of radial lines $2u$ on the top of the disc $2_{T1FL}$ where the subscript T1 means Tarngs 1st force; F means the turbulence-free at the bottom of disc; L means long-drive disc. As shown in FIG. 46B, it is the exposed top view of the disc $2_{T1FL}$. The cam lock 203 is single cam lock located at the low side of the cap of the disc $2_{T1FL}$. The wind W blowing direction is shown by the arrow. The disc $2_{T1FL}$ rotational direction is as shown by the turning directional arrow. Being similar to the Magnus effect, the low side wind speed is relative to the mutual canceling effect of (W−R) that the air-pressure is high; the upper side wind speed is relative to additive effect of (W+R) that the air-pressure is low. Therefore, the equivalent force result $F_{T1}$ at the upper side in FIG. 45A is pointing outward of the paper as shown in FIG. 46B.

As shown in FIG. 47, the conventional disc $2_{T1FC}$ is similar to the long-drive disc $2_{T1FL}$ as shown in FIG. 46.

Figures 48A, 48B:
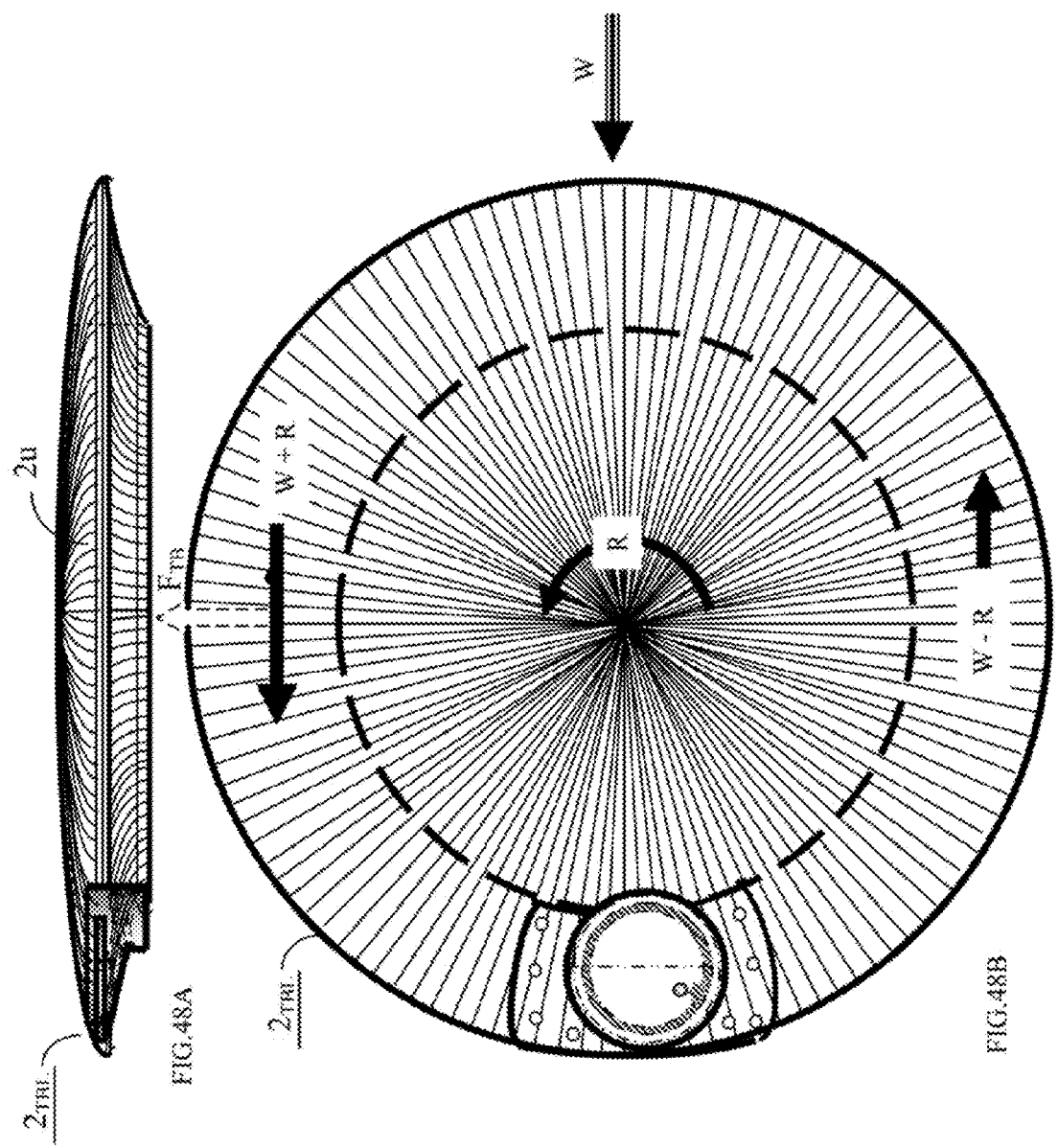

As shown in FIG. 48A, the disc $2_{TBL}$ is left turn long-drive disc. As shown in FIG. 48B, at the top side, of disc $2_{TBL}$, the net speed is relative to the additive effect of (W+R) being higher and the pressure is lower. At the bottom side of disc $2_{TBL}$, the net speed is relative to the mutual canceling effect of (W−R) being lower and the pressure is higher. Therefore, the net force $F_{TB}$ pushes the disc $2_{TBL}$ moving sideward. Being similar to the golf ball, with the wind W blowing direction and long-drive disc $2_{TBL}$ rotating direction, the flying long-drive disc $2_{TBL}$ will make the let turn in the air. As shown in FIG. 49A and FIG. 49B, the disc $2_{TBC}$ has the same principle of long-drive disc $2_{TBL}$ been applied to the conventional disc $2_{TBC}$.

Figure 50A:
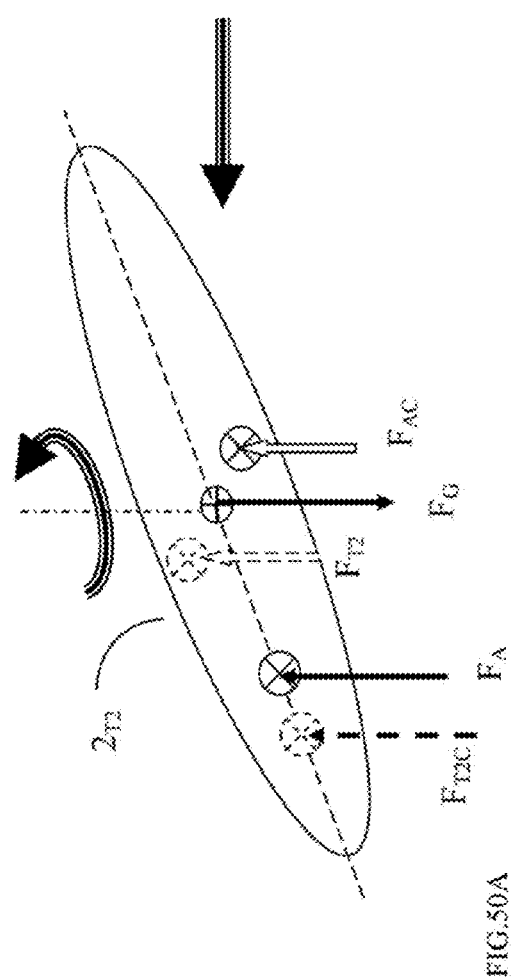

As shown in FIG. 50A, the ideal compensation is as shown by the dotted line. The wind induced the Tarngs 2nd force $F_{T2}$ applies at the bottom side of the disc $2_{T2}$ and at the opposite side of Coriolis Force $F_{AC}$ having the same value as $F_{AC}$. The Coriolis force $F_{T2C}$ generated by $F_{T2}$ applies after the gravity force $F_G$. As the wind speed increases, the wind induced Tarngs 2nd force $F_{T2}$ increases; the Coriolis force $F_{T2C}$ increases; the angle of attack decreases; the wind-induced force $F_{T2}$ decreases. As the wind speed decreases, the aerodynamic force $F_{T2}$ decreases; the Coriolis force $F_{T2C}$ decreases; the angle of attack increases; the wind-induced force $F_{T2}$ increases. For the wind-induced force $F_{T2}$ which is located at the left side of the gravity force $F_G$, this is the unconditional stable condition.

Figure 50B:
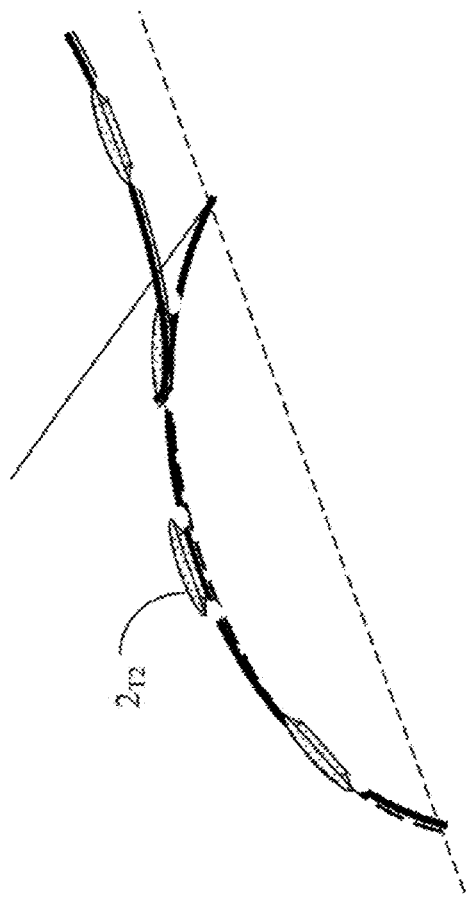

As shown in FIG. 50B, for the Tarngs 2nd Force, the trajectory of disc $2_{T2}$ is as perfect as the golf ball does and it is even better. The aptitude of she disc $2_{T2}$ is tangent to the curve of the trajectory. In other words, as the disc $2_{T2}$ passes the highest point, due to the Tarngs 2nd Force, it will dive downward as the paper folded airplane does. It will convert the potentional energy of disc $2_{T2}$ to be the flying momentum of the disc $2_{T2}$. In other words, it will fly even much farther than the golf ball does. It is not only recovering the golf ball trajectory hut also develop the paper airplane gliding capability. The disc $2_{T2}$ flying distance is increased from x(½) golf ball flying distance to x(1) or x(m) times golf ball flying distance, where m>1. We finally solve the mysterious problem of, the disc crashes and falls to ground problem disc as the disc $2_{T2}$ reach the highest point.

In the following figures, as shown in FIG. 51A, an operational apparatus comprises a flying rotating apparatus $2_{T2SC}$ having a concave cave under the flying rotating apparatus $2_{T2SC}$. The flow guiding means is unidirectional means $2_T$ having pressure increment being much larger in one direction. The unidirectional means $2_T$ locates at the interior wall of the concave cave. The unidirectional means $2_T$ modulates the pressure distributed on the surface of flying rotating apparatus. As shown in FIG. 50A, the pressure generating force $F_{T2C}$ is located at a position of 90° phase advanced in the direction of the net force $F_{T2}$ generated by the flow guiding means $2_T$.

There are versatile ways to generate the Tarngs 2nd Force $F_{T2}$. As shown in FIG. 50A and FIG. 51B, the water turbine-type blades $2_T$ are attached to the inner boundary of the concave cave of the disc $2_{T2SC}$. FIG. 51B is the partially exposed top view of the disc $2_{T2SC}$. As shown in FIG. 51A and FIG. 51B, the water-turbine-type blades $2_T$ is the unidirectional mechanism and it will generate the Tarngs 2nd Force. The unidirectional blades $2_T$ on the left side of the gravity force $F_G$ will generate much more pressure than the unidirectional blades $2_T$ on the right side of the gravity force $F_G$. Therefore, the net force result, the Tarng's 2nd Force. $F_{T2}$ is generated on the left side of the gravity force $F_G$. Furthermore, the unidirectional blades $2_T$ can convert the translation momentum to be the angular momentum of disc $2_{T2SC}$. It keeps the disc $2_{T2SC}$ to have the proper gliding capability.

FIG. 52A and FIG. 52B is the summarized of the techniques of the single cam lock, turbulent reduction technique with sharkskin, and the Tarngs 2nd Force Blade to be the ultra-long-drive disc $2_{T2SL}$. The single cam lock 203 uses the elasticity of shaft to generate the cam locking force. It is for long drive. FIG. 53A and FIG. 53B is the summarized of the previous discussion of the dual cam lock, turbulent reduction technique with sharkskin, and the Tarngs 2nd Force turbo-blade $2_T$ to be the ultra-long-drive disc $2_{T2SL}$. The cam lock 2032 uses the elasticity of shaft to generate the cam locking force. The cam lock 2031 uses the elasticity of deformation to generate the cam locking force. It is for ultra long drive.

FIG. 54A and FIG. 54B are the disc $2_{T12FL}$ having both Tarngs 1st force and 2nd force with turbulent-free long-drive disc. FIG. 55A and FIG. 55B are the disc $2_{T12FC}$ having both Tarngs 1st force and 2nd force with turbulent-free conventional disc. FIG. 54A and FIG. 54B are the disc $2_{T12FL}$ having both Tarngs 1st force and 2nd force with turbulent-free long-drive disc. FIG. 55A and FIG. 55B are the disc $2_{T12FC}$ having both Tarngs 1st force and 2nd force with turbulent-free conventional disc. There are versatile ways to generate the Tarngs 2nd force. As shown in FIG. 55B, the Tarngs' 2nd force is generated with the turbine-blade type fin $2_T$. To reduce the drag force generated by the turbine-blade type fin $2_T$, as shown in FIG. 55C, the Tarng's 2nd force is generated with the airfoil type fins $2_A$.

Figures 57A, 57B:
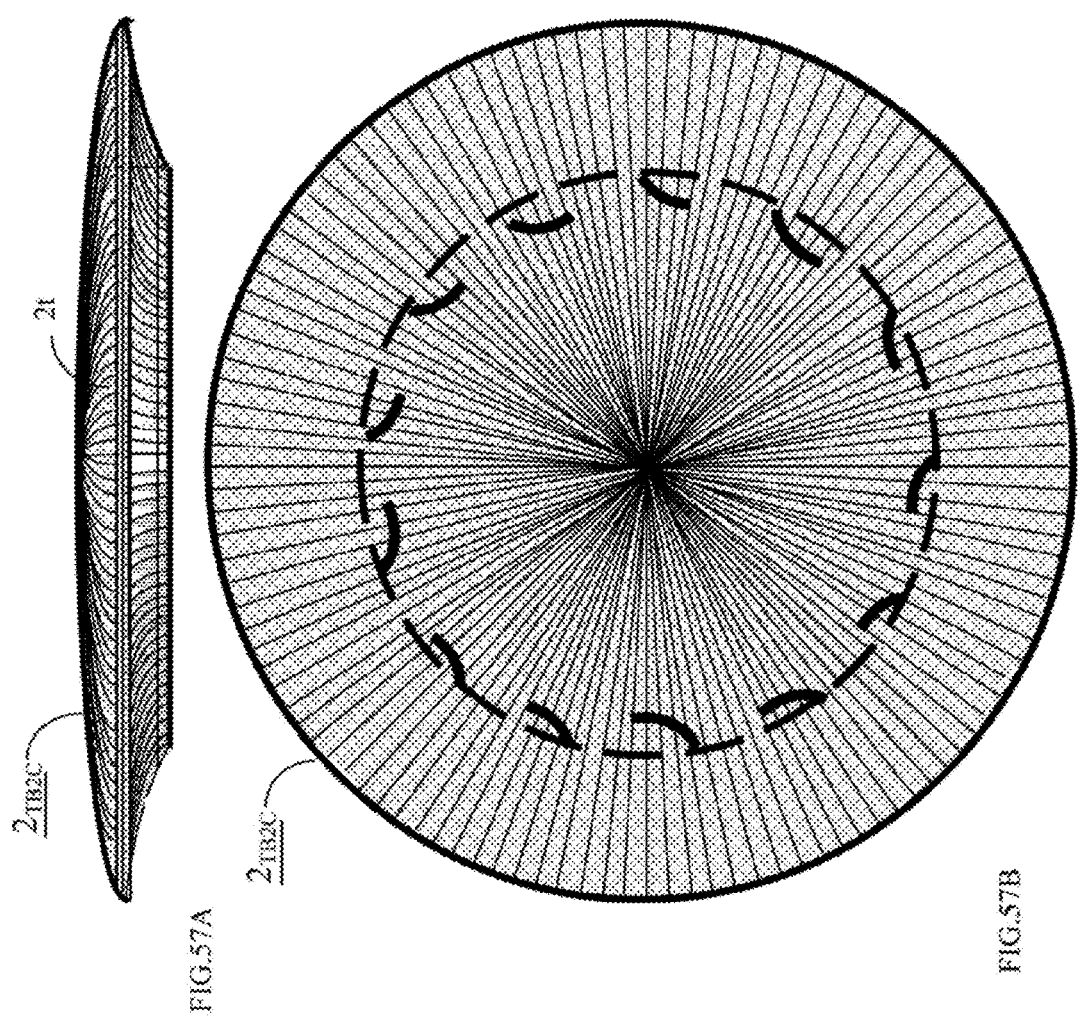

FIG. 56A and FIG. 56B are the turning direction disc $2_{TB2L}$ having both Tarngs 1st force and 2nd force with turbulent-free long-drive disc. FIG. 57A and FIG. 57B are the Mining direction disc $2_{TB2C}$ having both Tarngs 1st force and 2nd force with turbulent-free conventional disc.

FIG. 58A and FIG. 58B are the hybrid ring 28 of the golf disc 2 and golf ring. The hybrid ring 28 is the middle portion of the golf disc 2 to be removed. The disc ring 28 can hang up at the top of the tree, etc. It can fly into the tree and hide in the tree to monitor the activities under the tree, etc. As shown in FIG. 58A, FIG. 58B, FIG. 59A, and FIG. 59B, the half-moon boomerang 28R is the right half of the disc 28. As shown in FIG. 58A, FIG. 58B, FIG. 60A, and FIG. 60B, the half-moon boomerang 28L is the left half of the disc 2. As shown in FIG. 59A, FIG. 59B, FIG. 61A, and FIG. 61B, the boomerang 28 is the same as the half-moon boomerang 28R with the triangle shape.

Figure 62A:
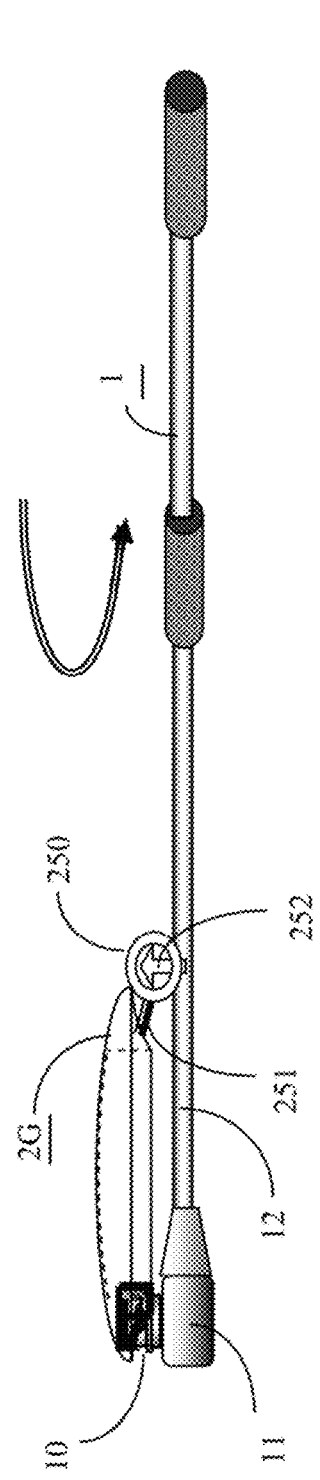
Figure 62B:
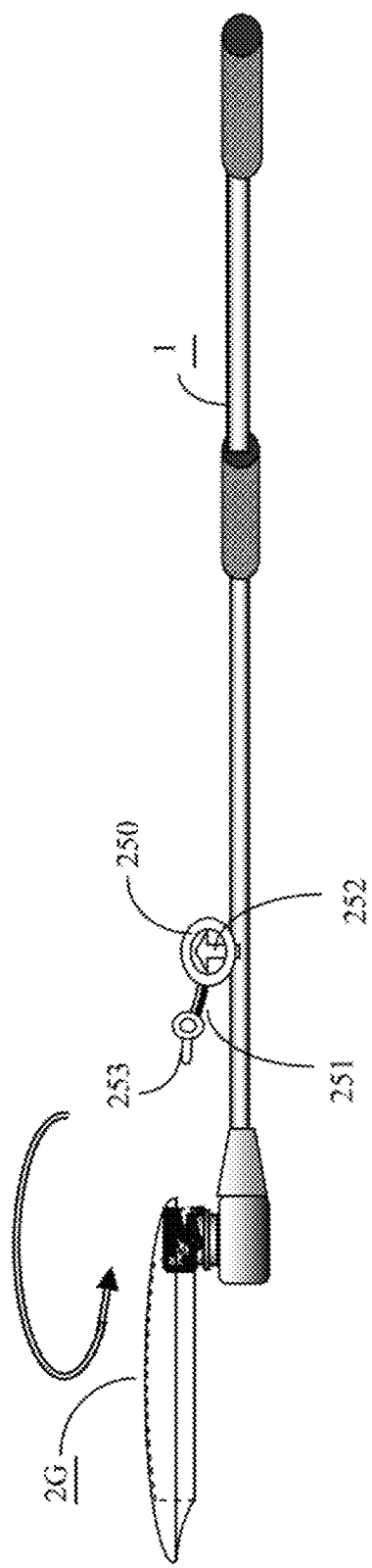

In the battlefield, during the silent attack, the ultra-long-drive disc golf has the very important applications such as scout and disc grenade, etc. As shown in FIG. 62A, the disc grenade 2G has the safety pin string 251 and the safety pull ring 252. The safety pull ring 252 is connected to the safety pin 253 of the disc grenade 2G. During the silent attack, the infantry mounts the grenade disc 2G on the disclub head 10 first. Then the infantry hooks the safety pull ring 252 on the hook 250. The hook 250 is fixed on the club 12. Swiveling the club 1, the disc 2G rotates and the safety pull ring 252 pulls the safety pin string 251 to pull out the safety pin 253 as show is in FIG. 62B.

For the silence attack, as shown in FIG. 63, the ultra-long-drive disc technology can be applied to the rifle 1G to replace the gun-fired grenade. As shown in FIG. 64A, an operational apparatus comprises the flying rotating apparatus 2G having the dynamite in the flying rotating apparatus to be grenade. As shown in FIG. 64A, the dynamite 268 of the disc grenade is stored in the triangle zone of the disc rim. As shown in FIG. 64B, on the surface of the grenade disc 2G, there are the deep notches 267, As the dynamite 268 explodes, the disc 2G breaks into pieces corresponding to the deep notches 267.

Figure 65A:
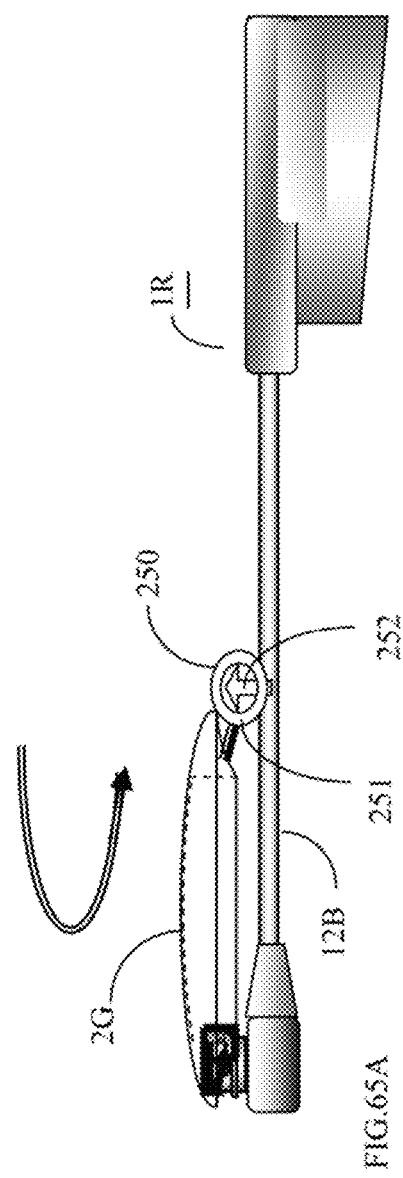
Figure 65B:
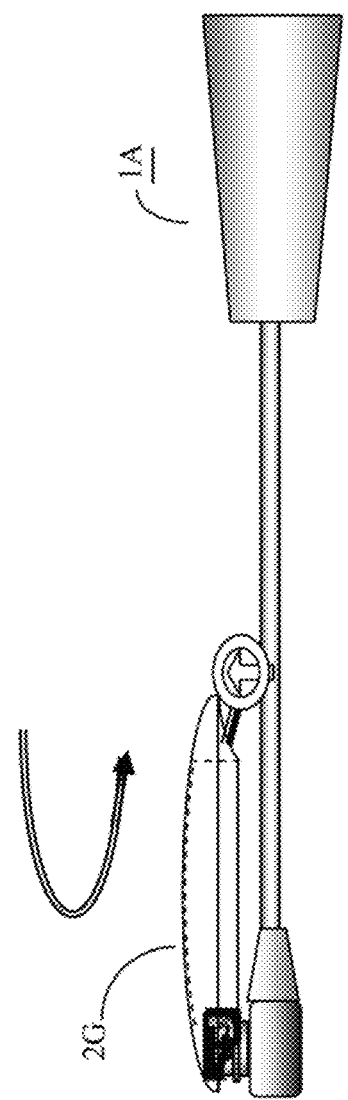

In the future battlefield, there is the robot warrior. In the silent attack, as shown in FIG. 65A, the arm 1R of the robot warrior may be armed with the barrel 12B. The robot warrior swivels the arm having barrel 12B, the disc grenade 2G will be launched to fly. As shown in FIG. 65B, even for the wounded soldier, as his amputee 1A is installed with the club of the long-drive disclub, the wounded soldier still can launch the disc grenade in the silent attack.

Figure 66B:
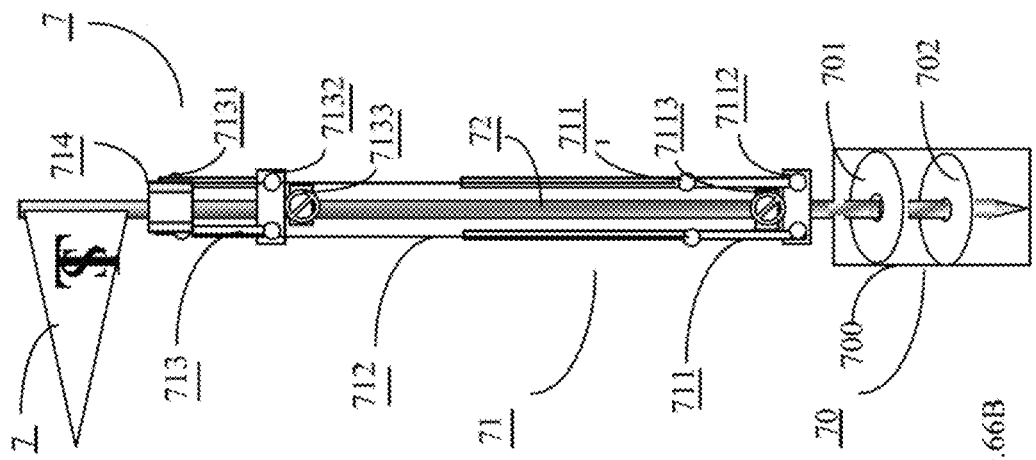
Figure 66A:
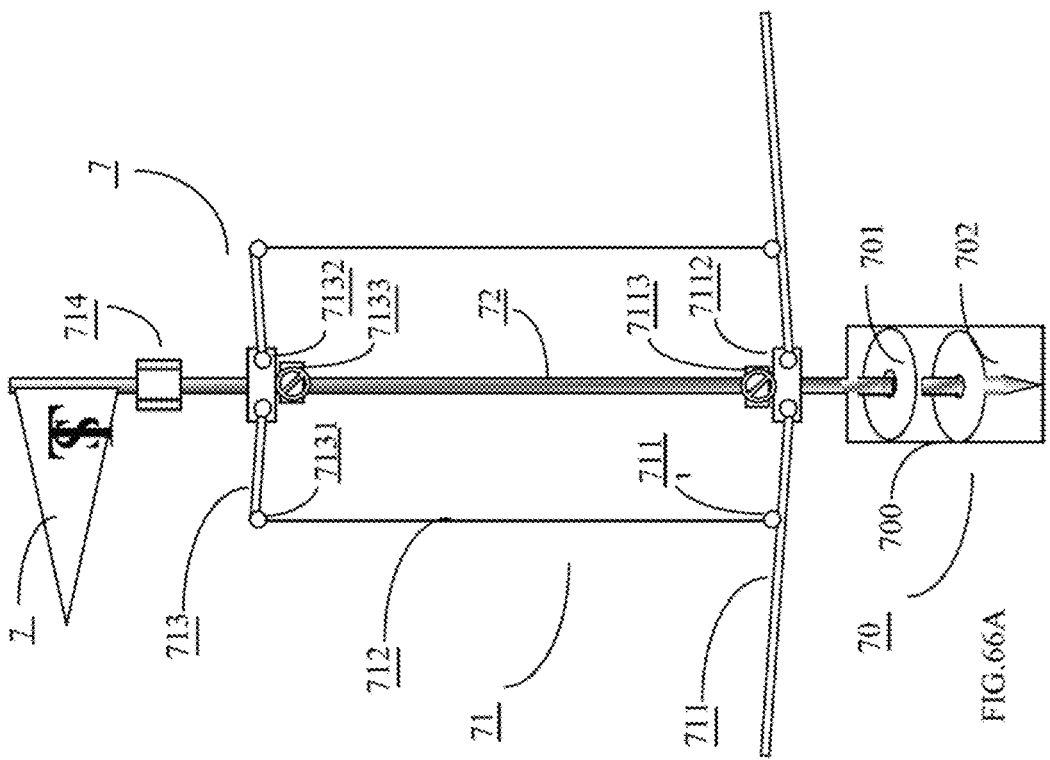
Figure 67B:
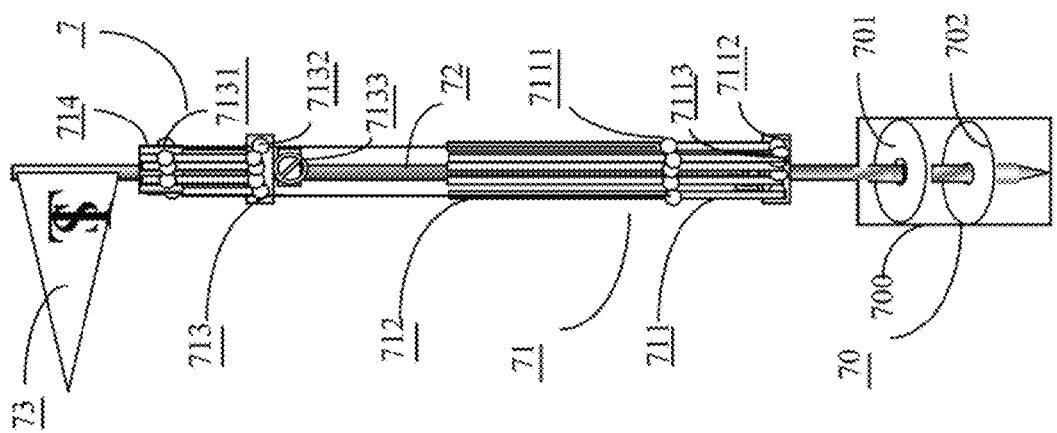
Figure 67A:
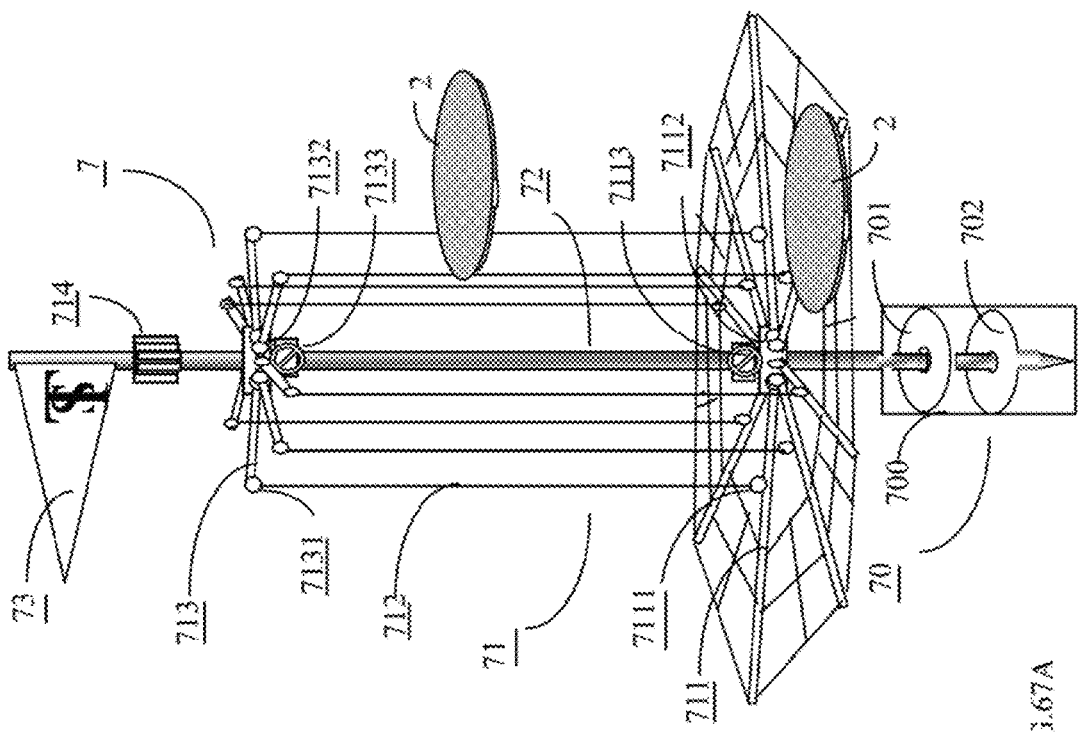

As shown in FIG. 67A, and FIG. 67B, an operational apparatus has the flying apparatus 2 hitting on a flagpole having the inverted umbrella basket. The disc 2 is collected by the inverted umbrella basket 71 as shown in FIG. 67A. The inverted umbrella basket 71 has the net connected to sticks to be collapse as an umbrella does as shown in FIG. 67B. As shown in FIG. 66A, FIG. 66B, FIG. 67A, and FIG. 67B, to be compatible and adaptable with the existed golf ball courses, we want to minimize the investment and modification of the existed golf courses. Therefore, the flagpole of the existed golf courses is modified to be the inverted umbrella type flagpole 7 having vertical-string hanging basket. Both the golf ball and golf disc can share the same Greens to putt the ball into the hole 70 and/or disc into the basket 71. The most important is the vertical-string hanging characteristics of the inverted umbrella vertical-string hanging basket. It makes the disc have the same target cross-section for the different flying height. Furthermore, under the hitting force of the disc, the re-bouncing disc falls into the basket due to the vertical string deformation to be the inclining string. Furthermore, the links of the basket rise up to catch the disc to have the active soft-grasp of the disc.

To simplify the discussion and make it easy to understand, as shown in FIG. 66A and FIG. 66B, we illustrate the inverted umbrella type flagpole 7 with the 2-dimensional case first. As shown by the FIG. 66A and FIG. 66B, the disc basket 71 of the inverted umbrella type flagpole 7 is a foldable umbrella. As shown in FIG. 67A, the only difference is that the strings 712 need to serve as the buffer to absorb the impact force of the flying golf discs 2. As shown in FIG. 66A, the flagpole 72 is inserted in the putting hole 70. The putting hole 70 has upper clamping plates 701 and lower clamping plate 702 to hold the flagpole 72.

The inverted umbrella basket 71 is to collect the flying disc and hold in the basket. In the inverted umbrella basket 71, there ate two fixed clamps 7113 and 7133. There are two floating sliders 7112 and 7132 having the limited range of swing angle for the links 711 and 713. There are hanged upper links 713 and low links 711. The flexible string 712 connects the hinges 7131 of the upper link 713 with the hinges 7111 of the lower link 711.

Since the link portion of 711 outside the hinge 7111 is longer and heavier than the link portion 711 inside the hinge 7111 does. The link 711 has the tendency to rotate. It forces the floating sliders 7112 moving upward until the floating sliders 7112 hitting against the fixed clamps 7113. The weight of the link 711 pulls the string 712 downward. The string 712 pulls the link 713 downward to its limit of the swing that the floating slider 7132 hits against the fixed clamp 7133.

As the Greens is served for the disc golf, the inverted umbrella type pole can stay as it is. However, as shown in FIG. 66B, as the Greens is for the golf ball and the flagpole is needed to remove from the hole, the inverted umbrella basket 71 needs to collapse first. With the inverted umbrella basket 71 collapsing capability, the disc golf, and ball golf can play together as the hybrid golf.

As shown in FIG. 66B, moving the upper links 713 and clamping the uplinks 713 with clamping lock 714, the strings 712 pull the links 711 upward. The links 711 are attached to the pole that the inverted umbrella basket 71 collapses. The pole 7 is reduced to be a normal flagpole. The Flag 73 hangs at the top of the pole 72. Then, the pole 72 can be pulled out of the hole 70 and the golfer can putt the ball to roll into the hole 70. Therefore, we have the disc golf and ball golf sharing the same golf course.

FIG. 67A and FIG. 67B show the complete inverted umbrella flagpole 7. There are nets connected among the links 711. As shown in FIG. 67A, in disc golf game, the disc 2 flies hitting on the strings 712 then falls on the net of the basket 71. As shown in FIG. 67B, in the ball golf game, the links 713 are locked with the clamping lock 714, The links 711 and the net of the basket are also collapsed. The inverted umbrella type basket 71 is converted to be a flagpole as flagpole 72 does. The ball golf and disc golf can share the same course.

As shown in FIG. 68A, an operational apparatus, the flying rotating apparatus 2 is harvested and collected with unidirectional flexible stick means 81. The unidirectional flexible stick 81 is mounted on the peripheral of a rotating drum 82. As the rotating drum 82 moves forward and rotates backward, the flying rotating apparatus 2 being picked up and delivered to storage 899. Being similar to the golf ball, the golf disc needs practice in sport venue before starting the formal game in the course. We need to share the sport venue for both golf ball and golf disc. As shown in FIG. 68A, the hybrid harvest machine 8 needs to collect both golf ball 90 and golf disc 2. The rotator 82 rotates backward as shown by the arrow 82r as the hybrid machine 8 moves forward as shown by the arrow 82f.

As shown in FIG. 68C, the flexible stick 81 is in one direction to be rigid and another direction to be flexible. As shown in FIG. 68B, in the rotator 82, the golf ball-pickup mechanism and golf disc-pickup mechanism are aligned alternatively. The plates 820 and 821 are bending outward to have the golf ball 90 to squeeze in between the plates. As the rotator 82 rotates at the upper position, the pronged fork 890 prongs the golf ball out the plates 820 and 821 as shown FIG. 68A and FIG. 68B.

As shown in FIG. 68A, the disc 2 is transferred upward and backward then the disc 2 falls on the ball-blocking-stick-passing filter 891. The golf balls 90 are blocked by the ball-blocking-stick-passing filter 891. However, the flexible stick 81 will pass the slot of the ball-blocking-stick-passing filter 891. As the flexible stick 81 hits the guiding plate 895, the flexible stick 81 will be bended and guided by the guiding plate 895.

The disc falls into the long disc collect box 899. As shown in FIG. 68E, the ball-passing-disc-blocking filter 899 has the disc 2 and ball 90 separate function. On the wall 892 of the long collect box of ball-passing-disc-blocking filter 899, there are the slots having space which can pass the golf balls. Therefore, the disc 2 and ball 90 are separated.

After the ball and disc are collected from the sport venue, the ball and disc are delivered to the vending machine to have the recycle usage. As shown in FIG. 69, the disc 2 rolls through the narrow slot 91. Then the discs lie on the transporting belt 92. The height limiter 93 is to keep the disc 2 from stacking up. After the limiter 93, the discs are aligned one-by-one and are fed into the collector 95 with the rollers 910 and 941. The sensor senses and counter counts the number of the discs in the pile. After the number of discs in the pile has reached the set number, the pile of disc will be removed from collector 95 to the sale window 952 of the vending machine to be ready for renting.

As shown in FIG. 70, an operational apparatus, the flying rotating apparatus 2 is transmitted from a harvest means 8 to vending machine $9_A$. The rotating apparatus 2 is fed in a transferring coil means 97. As the transferring coil means 97 rotates, the flying rotating apparatus 2 is delivered to outlet. As shown in FIG. 70, it shows the alternative and simple design of the hybrid vending machine 9A. The hybrid ball and disc vending machine 9A is constituted of the ball vending machine and the disc vending machine. The ball goes through the tunnel system 96 and fails down into the bucket 906. The sensor senses and counter counts the number of the balls 90 falling into the bucket 906, etc.

As shown in FIG. 70, the disc 2 rolls through the narrow slot 91. Then the discs are inserted on the transporting coil system 97. As one disc 2 is inserted, the transporting coil 97 rotates to move the disc 2 one pitch forward to clean up the space for the next disc to be inserted. The disc 2 moves through the transporting coil 97 and falls into the bucket 907. The sensor senses and the counter counts the member of the discs 2 falling into the bucket 907, etc.

As shown in FIG. 71A. FIG. 71B, an operational apparatus, as the head 10s of the tightening apparatus is standard, the discap 20 is calibrated by the head 10s being standard.

As the discap 20s of tightening apparatus is standard, the head is calibrated by the discap 20s being standard. To make the interchange between the discs 2 and disclubs 1, we need to have the standard for the set of discs 2 and disclubs 1. As shown in FIG. 71A, it is the standard calibration machine for the disc 2. The arm 12s is a standard length. The disclub head 10s is the standard disclub 1s having very hard surface treatment. The calibrated disc 2 is mounted on the standard disclub head 10s first. Then push the disc 2 with hand, the torque/force measurement tool 125 will continue increasing then suddenly decreases. The maximum torque or force is read by the torque/force measurement tool 125 being the calibrated value. Comparing the maximum read value with the table as shown FIG. 71C, the corresponding number of the disc 2 is the disc number of the disc set.

Similarly, as shown in FIG. 71B, it is the standard calibration machine for the disclub 1. The arm 12s is a standard length. The fitting cap 20s is the standard fitting cap having very hard surface treatment. The calibrated disclub 1 is mounted on the standard fitting cap 20s first. Then push the disclub 1 with hand, the torque/force measurement tool 125 will continue increasing then suddenly decreases. The maximum torque/force is read by measurement tool 125 to be the calibrated value. Comparing the maximum read value with the table as shown FIG. 71C, the corresponding number of the disclub 1 is the disclub number of the disclub set.

As shown in FIG. 72A, an operational apparatus comprises a disc retriever means 18 Or 28. The disc retriever means 18 is mounted on extended poles means 1R. As shown in FIG. 72B, the retriever means 28 is free rotationally attached the middle of the disc 2R. The disc retriever means 28 is pulled by a string means 31 to grasp a lost disc 2. To retrieve the disc being trapped on the tree and falling in the pond, as shown in FIG. 72A, it needs to use the disclub retriever 1R. As shown in FIG. 72A and FIG. 72B, the retrieve disc 2R is mounted on the disclub retriever 1R. The disclub retriever 1R has the extended poles 126. There are extended screw 16. Releasing the screw 16, the extended poles 126 can be pulled out to reach the disc being trapped in the tree. The fork 17 is to take/remove the disc or ring on the tree. The retrieving triangle 18 is to retrieve the disc falling in the pond. The retrieving triangle 18 has the same triangle shape of the retriever 28 as shown in FIG. 72B and FIG. 72C. As shown in FIG. 72A, FIG. 72B, FIG. 72C and FIG. 72D, the retriever 28 is rotational mounted on the bearing of stud 30H.

As shown in FIG. 72D, the retriever 28 is rotationally mounted to the bearing 300 of the stud $30_H$. The retrieve disc 2R carries the retriever 28 to fly far away, falls and sinks into the water. The LED $2_L$ shines the light to search underwater object. The video camera $2_V$ takes the underwater image. Pulling the string 31, the retriever 28 catches the lost disc under the water and carry the lost disc back.

As shown in FIG. 73A, an operational apparatus comprises a trolley means 65. The trolley means 65 comprising a frame box 6501 and patch bags 6512 with an option of cover baggage means 650. The patch bags 6512 are attached to the frame box 6501. The disclubs 1 are put inside the frame box 651. The discs 2 are inserted inside the patch bags 6512. To carry the discs 2 and disclubs 1 for the disclub golf, as shown in FIG. 73A and FIG. 73B, the disclub golf trolley 65 carries both discs 2 and disclubs 1. The discs 2 might be carried with the disclub cover bag 650. The cover bag 650 can serve as the disc bag as shown in FIG. 73A or serve as the disclub cover 650 as Shown in FIG. 73B. The cover bag 650 can be operated either to be an independent separate bag or hinged to the frame box 651 with the hinge 6501. There are many patch bags 6512 on the wall of the frame box 651. The discs 2 are inserted inside the patch bags 6512. The disclubs 1 are put inside the frame box 651. There are wheels 6510 and a stand 6511 beneath the frame box 651. Pulling the bar 655, the disclub golf trolley 65 is pulled to go as dally does. Releasing the bar 655, the disclub golf trolley 65 stands on the wheels 6510 and stand 6511.

As shown in FIG. 73A and FIG. 73B, there ate cover sheets 652 and 653. Open the cover sheets 652 and 653 as shown in FIG. 73A, the disc 2 is accessible for the disclub golfer to select the discs 2. Pulling the cover sheets 652 and 653, all the discs 2 are covered and under protection by the cover sheets 652 and 653. In the open flat golf course, we can use the open operation mode for convenience as shown in FIG. 73A. In the rugged bush disc golf course, we can use the closed carrier mode during movement as shown in FIG. 3B. The cover sheets 652 and 653 might be zipped to the frame box 651 with the zippers 6521 and 6531.

While the invention has been particularly shown and described with reference to the preferred embodiments thereof, it will be understood by those skilled in be art that various changes in form and details may be made therein without departing from the spirit and scope of the invention. It is noted that this disc club golf design can be easily modified to be the left-handed ultra-long-drive disc and disclub with the right-hand screws changing to be the left-hand screws. Furthermore, it is noted that the discap and head positions can be interchangeable for disclub and disc. In other words, even in the previous description, all the discussion is based on the alignment of the head 10 is on disclub 1 and the discap 20 is on disc 2. However, the alignment of the fitting discap is on disclub as shown in FIG. 71B and the head is on disc is also workable. The same principles and methodologies, etc are applicable to both cases. All the innovations made for the disc of disclub golf can be applied to the conventional disc of disc golf, too.

We claim:
1. A disclub golf Phonefly system comprising:
   a flying rotating apparatus comprising a circularly symmetrical disc with a top and a bottom side, wherein said bottom side has a concave central portion having a plurality of unidirectional radial lines located at the interior wall of said concave central portion for modulating pressure distributed on said flying rotating apparatus, and wherein said top side comprises a plurality of radial lines;
   a swiveling disclub means comprising a pole means and a disclub head means; said disclub head means being mounted at one end of said pole means;
   a head means and a cap means for coupling said flying rotating apparatus and said swiveling disclub means; said head means comprises head screw means and a head cam lock means; said cap means comprises cap screw means and a cap cam lock means; wherein said head means and said cap means being coupled with said head screw means and said cap screw means by rotating of said cap screw means onto said head screw means and locked with said head cam lock and cap cam lock;
   said head means and said cap means being mounted on said flying rotating apparatus and said swiveling disclub means separately;
   a phone means attached on said flying rotating apparatus; said phone comprising a camera for taking at least one picture and a transmitter for sending said at least one picture over a wireless network;

a watch means having a receiver for receiving said at least one picture taken by said camera and a displaying interface for viewing said at least one picture;

said phone means and said watch means being connected wirelessly via said wireless network; and one or more solar cells attaching on said top side of said flying rotating apparatus for converting solar energy to supply electricity to said phone means.

2. The disclub golf Phonefly system of claim 1, further comprising:

a string means attached to said bottom side of said flying rotating apparatus and said swiveling disclub means.

3. The disclub golf Phonefly system of claim 1, further comprising:

a flagpole means comprising inverted umbrella basket having net connected to sticks to be collapsed as an umbrella for collecting said flying rotation apparatus.

* * * * *